United States Patent
Hsu et al.

(10) Patent No.: US 11,366,294 B2
(45) Date of Patent: Jun. 21, 2022

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Po-Lun Hsu, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 151 days.

(21) Appl. No.: 16/557,692

(22) Filed: Aug. 30, 2019

(65) Prior Publication Data

US 2021/0018724 A1    Jan. 21, 2021

(30) Foreign Application Priority Data

Jul. 17, 2019 (TW) ................. 10812524.1

(51) Int. Cl.
*G02B 13/00* (2006.01)
*G02B 7/04* (2021.01)
(Continued)

(52) U.S. Cl.
CPC ............. *G02B 13/004* (2013.01); *G02B 3/14* (2013.01); *G02B 7/04* (2013.01); *G02B 9/34* (2013.01); *G02B 27/64* (2013.01)

(58) Field of Classification Search
CPC ... G02B 9/04; G02B 9/06; G02B 9/10; G02B 13/003; G02B 13/004; G02B 15/142; G02B 15/1421; G02B 15/1425; G02B 7/04; G02B 3/14; G02B 9/34; G02B 27/64; G02B 7/08; G02B 9/64; G02B 13/0045; G02B 13/009
See application file for complete search history.

(56) References Cited

U.S. PATENT DOCUMENTS

| 10,175,493 B1 | 1/2019 | Chen et al. |
| 10,422,931 B2 | 9/2019 | Hseih et al. |

(Continued)

FOREIGN PATENT DOCUMENTS

| CN | 107065152 A | 8/2017 |
| CN | 207318763 U | 5/2018 |

(Continued)

OTHER PUBLICATIONS

Indian Office Action issued in corresponding application No. 201934038769, dated Mar. 19, 2021.
(Continued)

*Primary Examiner* — Joseph P Martinez
(74) *Attorney, Agent, or Firm* — Maschoff Brennan

(57) ABSTRACT

An optical imaging lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. At least one lens surface of at least one lens element in the imaging lens system is aspheric and has at least one inflection point. The imaging lens system has a total of at least four lens elements.

10 Claims, 36 Drawing Sheets

(51) Int. Cl.
*G02B 3/14* (2006.01)
*G02B 9/34* (2006.01)
*G02B 27/64* (2006.01)

(56) References Cited

U.S. PATENT DOCUMENTS

| | | |
|---|---|---|
| 2015/0219880 A1 | 8/2015 | Chang et al. |
| 2015/0285962 A1 | 10/2015 | Phair et al. |
| 2015/0286036 A1* | 10/2015 | Kondo ............... G02B 13/0045 359/714 |
| 2016/0033690 A1 | 2/2016 | Henriksen |
| 2016/0363742 A1 | 12/2016 | Ohno |
| 2017/0054883 A1 | 2/2017 | Sharma et al. |
| 2017/0160442 A1 | 6/2017 | Phair et al. |
| 2018/0275320 A1 | 9/2018 | Hsieh et al. |
| 2019/0056568 A1 | 2/2019 | Huang |
| 2019/0094494 A1 | 3/2019 | Hsu et al. |
| 2019/0158750 A1 | 5/2019 | Kim et al. |
| 2019/0170914 A1 | 6/2019 | Fuller et al. |
| 2019/0384040 A1 | 12/2019 | Tseng et al. |
| 2021/0173126 A1 | 6/2021 | Lee et al. |
| 2021/0223442 A1 | 7/2021 | Kunick et al. |

FOREIGN PATENT DOCUMENTS

| | | |
|---|---|---|
| CN | 207502823 U | 6/2018 |
| CN | 207718066 U | 8/2018 |
| CN | 108490631 A | 9/2018 |
| CN | 108508622 A | 9/2018 |
| CN | 108627951 A | 10/2018 |
| CN | 108803016 A | 11/2018 |
| CN | 109324388 A | 2/2019 |
| CN | 109471251 A | 3/2019 |
| CN | 109782380 A | 5/2019 |
| CN | 109782423 A | 5/2019 |
| CN | 109782519 A | 5/2019 |
| CN | 109870750 A | 6/2019 |
| CN | 109870865 A | 6/2019 |
| CN | 109884778 A | 6/2019 |
| CN | 209167649 U | 7/2019 |
| CN | 209215612 U | 8/2019 |
| CN | 209215712 U | 8/2019 |
| CN | 110221418 A | 9/2019 |
| KR | 100835108 B | 6/2008 |
| TW | 201835627 A | 10/2018 |
| TW | 201915532 A | 4/2019 |
| WO | 2019/002509 A1 | 1/2019 |
| WO | 2019/205789 A1 | 10/2019 |
| WO | 2020/039047 A1 | 2/2020 |
| WO | 2020/122594 A1 | 6/2020 |
| WO | 2020/145637 A1 | 7/2020 |

OTHER PUBLICATIONS

TW Office Action in Application No. 108125241 dated Nov. 22, 2019.
CN Office Action dated Sep. 3, 2021 as received in Application No. 201910697968.7.

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 108125241, filed on Jul. 17, 2019, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of technology, photographing modules have been widely applied to different kinds of electronic devices, and both optical image stabilization and auto focus have been the indispensable techniques for the photographing modules to realize high image quality. Conventionally, the photographing modules usually achieve auto-focusing and optical image stabilizing effects by changing the distance between the optical system and the image surface. However, due to physical structure limitations, it is difficult to reduce the size of the photographing modules, and always comes with difficult assembly processes. Accordingly, in order to meet the requirements of compact size and high image quality of the photographing modules, it's essential to provide a lens module featuring compact size, easy assembly and high image quality.

SUMMARY

According to one aspect of the present disclosure, an optical imaging lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. Each of all lens elements in the imaging lens system has an object-side surface facing toward the object side and an image-side surface facing toward the image side.

At least one lens surface of at least one lens element in the imaging lens system is aspheric and has at least one inflection point. The imaging lens system has a total of at least four lens elements. The lens elements of the first lens group are closer to the object side than other lens elements in the imaging lens system, and the lens elements of the second lens group are closer to the image side than other lens elements in the imaging lens system.

When an axial distance between the image-side first lens element and the image-side second lens element is DLr1Lr2, a central thickness of the image-side first lens element is CTLr1, a curvature radius of the object-side surface of the image-side second lens element is RLr2f, a curvature radius of the image-side surface of the image-side second lens element is RLr2r, and an f-number of the optical imaging lens assembly is Fno, the following conditions are satisfied:

$$0.60 < DLr1Lr2/CTLr1;$$

$$|RLr2f/RLr2r| < 4.5; \text{ and}$$

$$0.80 < Fno < 3.0.$$

According to another aspect of the present disclosure, an optical imaging lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. Each of all lens elements in the imaging lens system has an object-side surface facing toward the object side and an image-side surface facing toward the image side.

At least one lens surface of at least one lens element in the imaging lens system is aspheric and has at least one inflection point. The imaging lens system has a total of at least six lens elements. The lens elements of the first lens group are closer to the object side than other lens elements in the imaging lens system, and the lens elements of the second lens group are closer to the image side than other lens elements in the imaging lens system. Each of at least three lens elements in the imaging lens system has an Abbe number smaller than 50.0.

According to another aspect of the present disclosure, an optical imaging lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. Each of all lens elements in the imaging lens system has an object-side surface facing toward the object side and an image-side surface facing toward the image side.

At least one lens surface of at least one lens element in the imaging lens system is aspheric and has at least one inflection point. The imaging lens system has a total of at least seven lens elements. The lens elements of the first lens group are closer to the object side than other lens elements in the imaging lens system, and the lens elements of the second lens group are closer to the image side than other lens elements in the imaging lens system.

According to another aspect of the present disclosure, an image capturing unit includes one of the aforementioned optical imaging lens assemblies and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
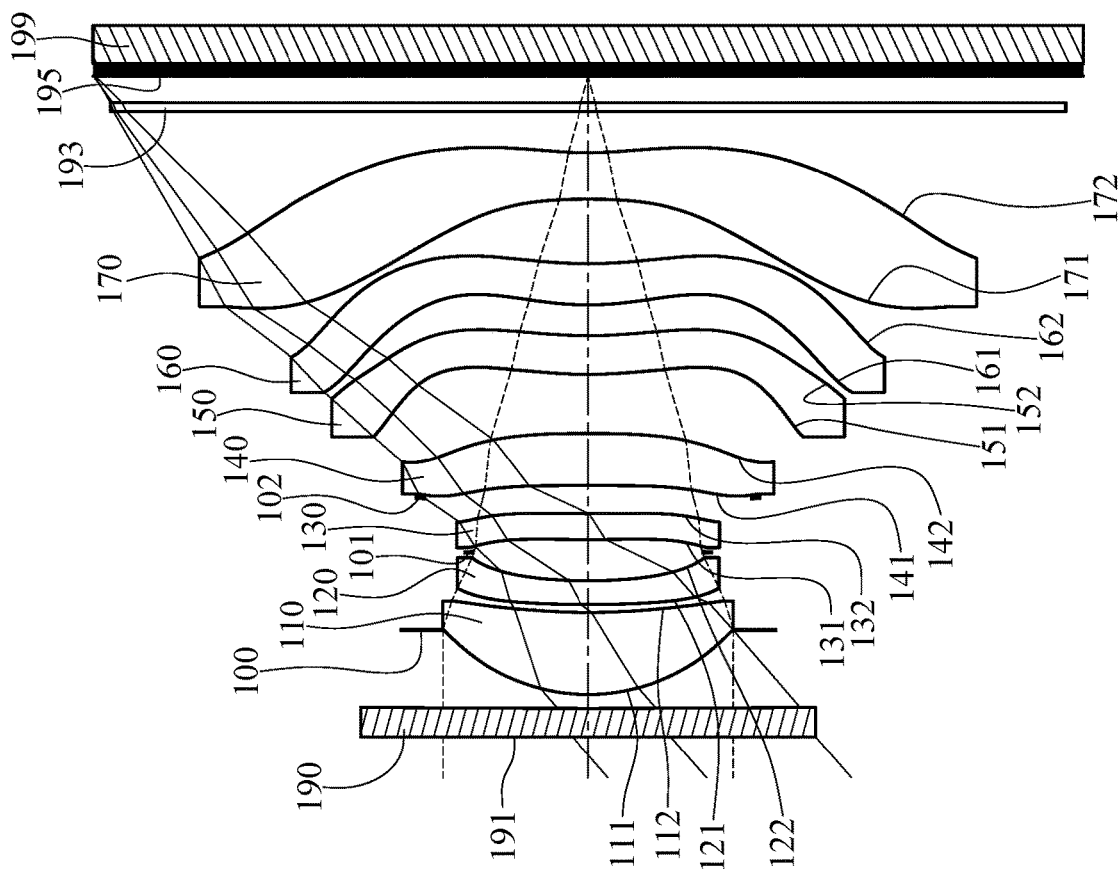
FIG. 1 is a schematic view of an image capturing unit in Mode 1 according to the 1st embodiment of the present disclosure.

An optical imaging lens assembly includes a focus tunable component and an imaging lens system. According to the present disclosure, the optical imaging lens assembly can auto focus on imaged objects in accordance with object distances or ambient temperatures of various conditions. In specific, the focal length of the optical imaging lens assembly is adjustable by the action of the focus tunable component, so that the images of captured scenes can be accurately and clearly focused on the image sensor of the image capturing unit including the optical imaging lens assembly. Furthermore, the focus tunable component can be a liquid lens set, a liquid crystal lens set, a positive lens element, a negative lens element or other optical components featuring focus tuning function. In addition, the liquid lens set can include a transparent substrate and a liquid material. The focus tunable component can change the focal length of the optical imaging lens assembly by an external control unit (e.g., circuit or mechanical stress control mechanism) so as to achieve compactness and short-object-distance auto focus. In addition, the optical imaging lens assembly can also achieve optical image stabilization or optical zoom by changing the focal length of the focus tunable component.

In the interest of better clarity and conciseness of the present disclosure, hereinafter, the imaging lens system includes, in order from an object side to an image side, a first lens group and a second lens group. The first lens group includes, in order from the object side to the image side, an object-side first lens element and an object-side second lens element. The second lens group includes, in order from the image side to the object side (i.e., opposite to a direction from the object side to the image side), an image-side first lens element and an image-side second lens element. Each of all lens elements in the imaging lens system has an object-side surface facing toward the object side and an image-side surface facing toward the image side. Additionally, the lens elements of the first lens group are closer to the object side than the other lens elements in the imaging lens system are to the object side, and the lens elements of the second lens group are closer to the image side than the other lens elements in the imaging lens system are to the image side. That is, the object-side first lens element and the object-side second lens element of the first lens group are two lens elements closest to the object side in the imaging lens system, and the image-side first lens element and the image-side second lens element of the second lens group are two lens elements closest to the image side in the imaging lens system.

According to the present disclosure, the imaging lens system has a total of at least four lens elements. Therefore, it is favorable for the imaging lens system to have a sufficient number of lens elements to correct aberrations, thereby providing high image quality. Moreover, the imaging lens system can have a total of at least six lens elements. Therefore, it is favorable for further correcting aberrations so as to provide better image quality. Moreover, the imaging lens system can have a total of at least seven lens elements.

The object-side first lens element can have positive refractive power. Therefore, it is favorable for reducing the size of the imaging lens system. The object-side surface of the object-side first lens element can be convex in a paraxial region thereof. Therefore, it is favorable for light to travel in the imaging lens system evenly. The image-side surface of the object-side first lens element can be concave in a paraxial region thereof. Therefore, it is favorable for adjusting the travelling direction of light so as to correct aberrations such as astigmatism.

The object-side second lens element can have negative refractive power. Therefore, it is favorable for correcting aberrations such as spherical aberration generated due to the miniaturization of the imaging lens system. The image-side surface of the object-side second lens element can be concave in a paraxial region thereof. Therefore, it is favorable for adjusting the refractive power of the object-side second lens element so as to correct aberrations.

The image-side second lens element can have positive refractive power. Therefore, it is favorable for dispersing the positive refractive power required for achieving compactness so as to reduce sensitivity caused by single lens elements.

The image-side first lens element can have negative refractive power. Therefore, it is favorable for balancing the refractive power distribution at the image side of the imaging lens system so as to correct aberrations. The image-side surface of the image-side first lens element can be concave in a paraxial region thereof. Therefore, it is favorable for adjusting the refractive power of the image-side first lens element and also controlling the back focal length in a proper range.

Figure 33:
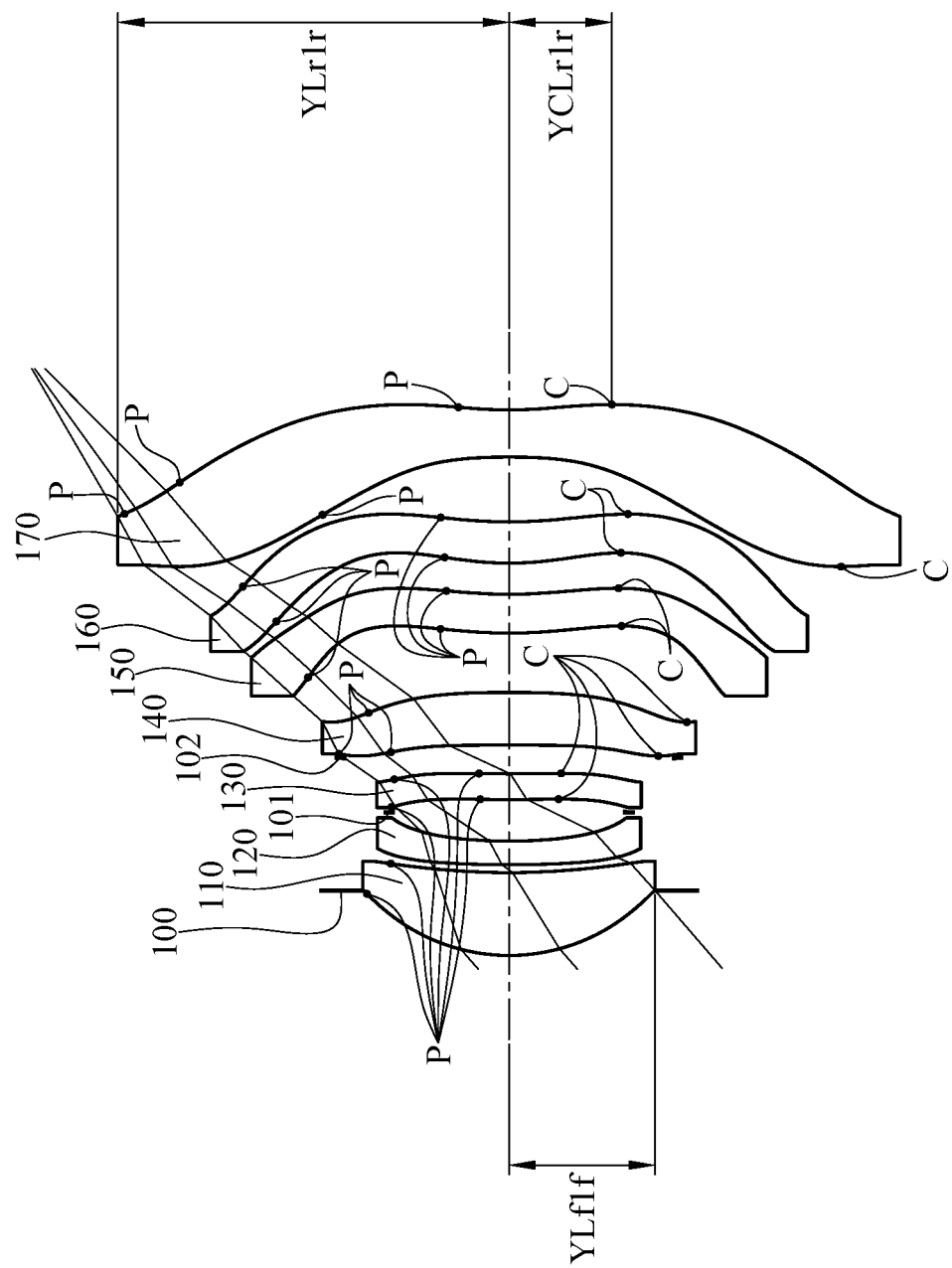
FIG. 33 shows a schematic view of YLf1f, YLr1r, YCLr1r and inflection points and critical points of some lens elements according to Mode 1 of the 1st embodiment of the present disclosure.

At least one of the object-side surface and the image-side surface of at least one lens element in the imaging lens system is aspheric and has at least one inflection point. Therefore, it is favorable for increasing the shape variation of the lens surface(s) so as to reduce the size and improve image quality of the optical imaging lens assembly. Moreover, at least one of the object-side surface and the image-side surface of each of at least two lens elements in the imaging lens system can be aspheric and have at least one inflection point. Moreover, at least one of the object-side surface and the image-side surface of each of at least three lens elements in the imaging lens system can be aspheric and have at least one inflection point. Moreover, at least one of the object-side surface and the image-side surface of each of at least four lens elements in the imaging lens system can be aspheric and have at least one inflection point. Moreover, at least one of the object-side surface and the image-side surface of at least one lens element of the second lens group can be aspheric and have at least one inflection point. Therefore, lens element(s) at the image side of the imaging lens system having one or more inflection points is favorable for improving peripheral image quality. Moreover, at least one of the object-side surface and the image-side surface of each of at least two lens elements of the second lens group can be aspheric and have at least one inflection point. In some configurations, the imaging lens system can have a total of five or more lens elements, and the second lens group can include three or more lens elements closest to the image side in the imaging lens system. Moreover, at least one of the object-side surface and the image-side surface of each of at least three lens elements of the second lens group can be aspheric and have at least one inflection point. Moreover, at least one of the object-side surface and the image-side surface of each of at least four lens elements of the second lens group can be aspheric and have at least one inflection point. Moreover, each of the object-side surface and the image-side surface of any lens element in the imaging lens system can be aspheric and have at least one inflection point. Therefore, it is favorable for adjusting the shape of lens surfaces so as to further correct aberrations. Please refer to FIG. 33, which shows inflection points P of the first lens element 110, the third lens element 130, the fourth lens element 140, the fifth lens element 150, the sixth lens element 160 and the seventh lens element 170 according to Mode 1 of the 1st embodiment of the present disclosure, wherein the first lens element 110 is the object-side first lens element, the second lens element 120 is the object-side second lens element, the sixth lens element 160 is the image-side second lens element, and the seventh lens element 170 is the image-side first lens element.

At least one of the object-side surface and the image-side surface of at least one lens element in the imaging lens system can have at least one critical point in an off-axis region thereof. Therefore, it is favorable for further increasing the shape variation of the lens surface(s) so as to reduce the size of the imaging lens system and improve image quality on the periphery of the image surface. Moreover, at least one of the object-side surface and the image-side surface of each of at least two lens elements in the imaging lens system can have at least one critical point in an off-axis region thereof. Moreover, at least one of the object-side surface and the image-side surface of each of at least three lens elements in the imaging lens system can have at least one critical point in an off-axis region thereof. Moreover, at least one of the object-side surface and the image-side surface of at least one lens element of the second lens group can have at least one critical point in an off-axis region thereof. Therefore, lens element(s) at the image side of the imaging lens system having one or more critical points is favorable for correcting off-axis aberrations and increasing illuminance on the periphery of the image surface. Moreover, at least one of the object-side surface and the image-side surface of at least two lens elements of the second lens group can have at least one critical point in an off-axis region thereof. In some configurations where the imaging lens system has a total of five or more lens elements, the second lens group can include three or more lens elements closest to the image side in the imaging lens system, and at least one of the object-side surface and the image-side surface of each of at least three lens elements of the second lens group can have at least one critical point in an off-axis region thereof. Moreover, at least one of the object-side surface of the image-side second lens element and the image-side surface of the image-side second lens element can have at least one critical point in an off-axis region thereof. Therefore, it is favorable for correcting aberrations on the periphery of the image surface and adjusting the outer diameter of the image side of the imaging lens system. Moreover, the object-side surface of the image-side second lens element can have at least one critical point in an off-axis region thereof. Therefore, it is favorable for adjusting the angle of incidence at the periphery of the image-side second lens element so as to reduce surface reflection. Moreover, the object-side surface of the image-side first lens element can have at least one critical point in an off-axis region thereof. Therefore, it is favorable for reducing aberrations such as off-axis field curvature. Moreover, the image-side surface of the image-side first lens element can have at least one convex critical point in an off-axis region thereof. Therefore, it is favorable for adjusting the incident direction of light on the image surface so as to increase illuminance on the periphery of the image surface. Moreover, each of the object-side surface and the image-side surface of any lens element in the imaging lens system can have at least one critical point in an off-axis region thereof. Therefore, it is favorable for adjusting the shape of lens surfaces so as to further correct aberrations and reduce the outer diameter of the lens element. Please refer to FIG. 33, which shows a schematic view of critical points C of the third lens element 130, the fourth lens element 140, the fifth lens element 150, the sixth lens element 160 and the seventh lens element 170 according to Mode 1 of the 1st embodiment of the present disclosure.

When an axial distance between the image-side first lens element and the image-side second lens element is DLr1Lr2, and a central thickness of the image-side first lens element is CTLr1, the following condition can be satisfied: $0.60 < DLr1Lr2/CTLr1$. Therefore, it is favorable for adjusting the distribution of lens elements at the image side of the imaging lens system, thereby reducing the total track length. Moreover, the following condition can also be satisfied: $0.70 < DLr1Lr2/CTLr1 < 5.0$. Moreover, the following condition can also be satisfied: $0.80 < DLr1Lr2/CTLr1 < 3.0$. Moreover, the following condition can also be satisfied: $1.0 < DLr1Lr2/CTLr1 < 2.0$.

When a curvature radius of the object-side surface of the image-side second lens element is RLr2f, and a curvature radius of the image-side surface of the image-side second lens element is RLr2r, the following condition can be satisfied: $|RLr2f/RLr2r| < 4.5$. Therefore, it is favorable for adjusting the surface shape of the image-side second lens element so as to correct astigmatism and off-axis aberrations. Moreover, the following condition can also be satisfied: $|RLr2f/RLr2r| < 3.0$. Moreover, the following condition can also be satisfied: $|RLr2f/RLr2r| < 1.5$.

When an f-number of the optical imaging lens assembly is Fno, the following condition can be satisfied: $0.80 < Fno < 3.0$. Therefore, it is favorable for the optical imaging lens assembly to have a proper size of aperture stop for various applications. Moreover, the following condition can also be satisfied: $1.0 < Fno < 2.5$. Moreover, the following condition can also be satisfied: $1.2 < Fno < 2.0$.

According to the present disclosure, each of at least three lens elements in the imaging lens system can have an Abbe number smaller than 50.0. Therefore, a proper material selection of the lens elements is favorable for correcting aberrations such as chromatic aberration. Moreover, each of at least three lens elements in the imaging lens system can have an Abbe number smaller than 45.0. Moreover, each of at least three lens elements in the imaging lens system can have an Abbe number smaller than 40.0.

When half of a maximum field of view of the optical imaging lens assembly is HFOV, the following condition can be satisfied: $15.0 \,[\text{deg.}] < HFOV < 90.0 \,[\text{deg.}]$. Therefore, it is favorable for the field of view to be adjusted into a proper range for various applications. Moreover, the following condition can also be satisfied: $30.0 \,[\text{deg.}] < HFOV < 55.0 \,[\text{deg.}]$. Therefore, it is favorable for the optical imaging lens assembly to have a wide field of view, and it is also favorable for preventing distortion caused by an overly wide field of view. Moreover, the following condition can also be satisfied: $35.0 \,[\text{deg.}] < HFOV < 45.0 \,[\text{deg.}]$.

When a focal length of the optical imaging lens assembly is f, and a focal length of the focus tunable component is ft, the following condition can be satisfied: $|RLr2f/RLr2r| < 3.0$. Therefore, it is favorable for adjusting the refractive power of the focus tunable component so as to prevent additional aberrations generated during the focus tuning process. Moreover, the following condition can also be satisfied: $|f/ft| < 0.20$. Moreover, the following condition can also be satisfied: $|f/ft| < 0.10$. Moreover, the following condition can also be satisfied: $|f/ft| < 0.05$.

Figure 34:
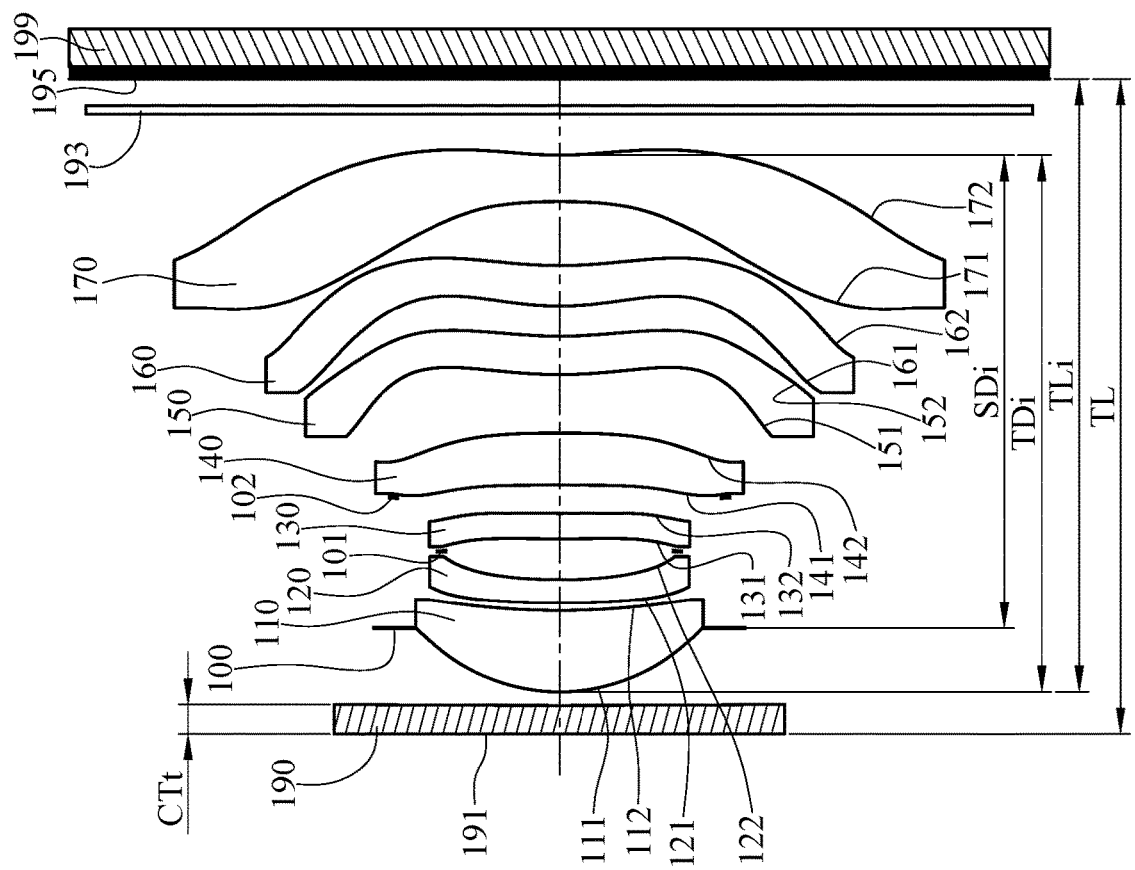
FIG. 34 shows a schematic view of CTt, TL, SDi, TDi and TLi according to Mode 1 of the 1st embodiment of the present disclosure.

When a central thickness of the focus tunable component is CTt, the following condition can be satisfied: $0.10 \,[\text{mm}] < CTt < 1.00 \,[\text{mm}]$. Therefore, it is favorable for adjusting the thickness of the focus tunable component so as to prevent the same from occupying too much space and ensure the tunable range of the focal length. Moreover, the following condition can also be satisfied: $0.15 \,[\text{mm}] < CTt < 0.85 \,[\text{mm}]$. Please refer to FIG. 34, which shows a schematic view of CTt according to Mode 1 of the 1st embodiment of the present disclosure.

When a curvature radius of the image-side surface of the image-side first lens element is RLr1r, and a maximum image height of the optical imaging lens assembly (half of a diagonal length of an effective photosensitive area of an image sensor) is ImgH, the following condition can be satisfied: $RLr1r/ImgH < 1.0$. Therefore, it is favorable for adjusting the incident angle of light on the image surface so as to be collaborative with the image sensor and to increase illuminance on the image surface.

Figure 35:
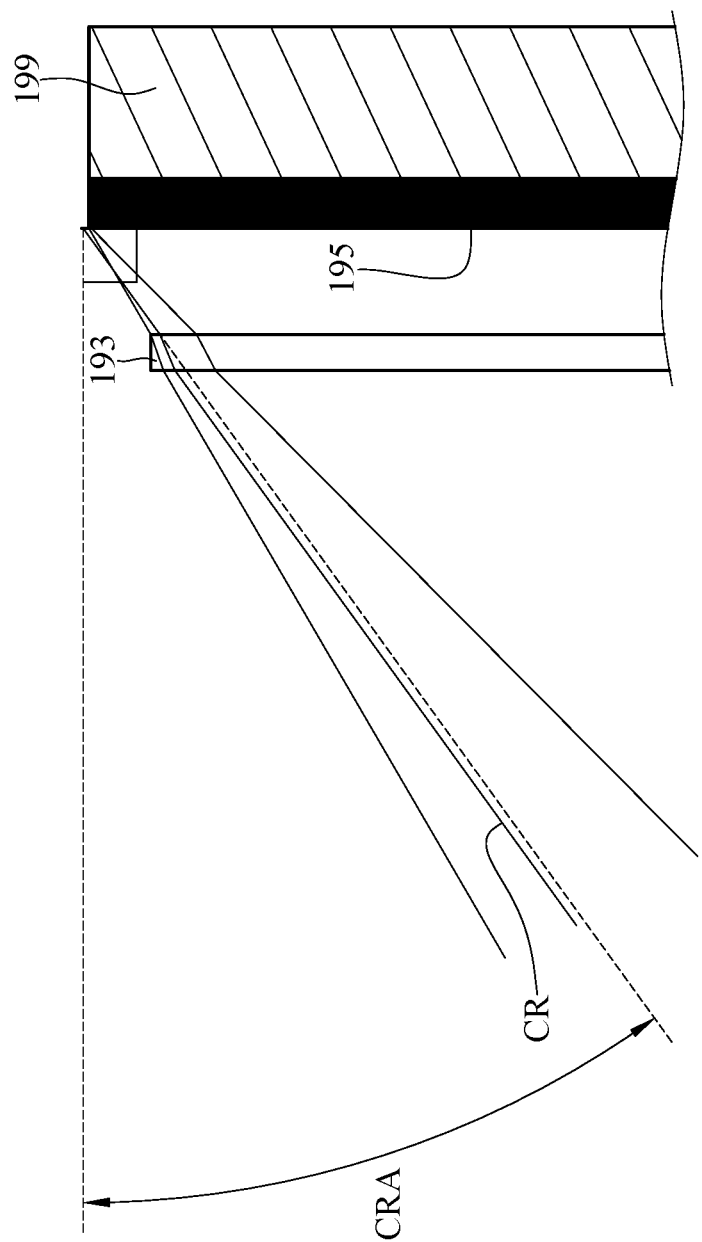
FIG. 35 shows a schematic view of CRA according to Mode 1 of the 1st embodiment of the present disclosure.

When a chief ray angle at a maximum image height position of the optical imaging lens assembly is CRA, the following condition can be satisfied: $25.0 \,[\text{deg.}] < CRA < 50.0 \,[\text{deg.}]$. Therefore, it is favorable for adjusting the incident angle of light on the image surface so as to improve response efficiency of the image sensor. Moreover, the following condition can also be satisfied: $30.0 \,[\text{deg.}] < CRA < 45.0 \,[\text{deg.}]$. Please refer to FIG. 35, which shows a schematic view of CRA according to Mode 1 of the 1st embodiment of the present disclosure, wherein a chief ray CR is projected on the image surface 195 at the maximum image height position, and the angle between a normal line of the image surface 195 and the chief ray CR is CRA.

When an axial distance between an object-side surface of the focus tunable component and the image surface is TL, the following condition can be satisfied: 3.50 [mm]<TL<10.00 [mm]. Therefore, it is favorable for the optical imaging lens assembly to have a total track length within a proper range to be applicable to various applications. Please refer to FIG. 34, which shows a schematic view of TL according to Mode 1 of the 1st embodiment of the present disclosure.

According to the present disclosure, the focus tunable component can be located on the object side of the imaging lens system; that is, the focus tunable component can be located between an imaged object and the imaging lens system. Therefore, it is favorable for the optical imaging lens assembly to be easily assembled.

According to the present disclosure, the optical imaging lens assembly further includes an aperture stop, and the aperture stop can be disposed between the object-side first lens element and the imaged object. Therefore, it is favorable for reducing the total track length of the optical imaging lens assembly and adjusting the field of view.

When an axial distance between the aperture stop and the image-side surface of the image-side first lens element is SDi, and an axial distance between the object-side surface of the object-side first lens element and the image-side surface of the image-side first lens element is TDi, the following condition can be satisfied: 0.60<SDi/TDi<1.1. Therefore, it is favorable for adjusting the position of the aperture stop so as to achieve a balance between the total track length and field of view of the optical imaging lens assembly. Moreover, the following condition can also be satisfied: 0.80<SDi/TDi<1.0. Please refer to FIG. 34, which shows a schematic view of SDi and TDi according to Mode 1 of the 1st embodiment of the present disclosure.

When a focal length of the imaging lens system is fi, and the focal length of the focus tunable component is ft, the following condition can be satisfied: |fi/ft|<1.00. Therefore, it is favorable for adjusting the refractive power arrangement between the focus tunable component and the imaging lens system so as to reduce sensitivity and achieve compactness. Moreover, the following condition can also be satisfied: |fi/ft|<0.25. Therefore, it is favorable for reducing aberrations generated during the focus tuning process. Moreover, the following condition can also be satisfied: |fi/ft|<0.10. Moreover, the following condition can also be satisfied: |fi/ft|<0.05.

When the focal length of the focus tunable component is ft, the following condition can be satisfied: 15.0 [mm]<|ft|. Therefore, it is favorable for preventing overly strong refractive power of the focus tunable component so as to reduce sensitivity and aberrations. Moreover, the following condition can also be satisfied: 25.0 [mm]<|ft|. Moreover, the following condition can also be satisfied: 40.0 [mm]<|ft|. Moreover, the following condition can also be satisfied: 80.0 [mm]<|ft|.

When a vertical distance between a non-axial critical point on the image-side surface of the image-side first lens element and an optical axis is YCLr1r, and the axial distance between the object-side surface of the object-side first lens element and the image-side surface of the image-side first lens element is TDi, the image-side surface of the image-side first lens element can have at least one convex critical point in an off-axis region thereof satisfying the following condition: 0.10<YCLr1r/TDi<0.50. Therefore, it is favorable for adjusting the position of the critical point and the arrangement of lens elements so as to further reduce the size of the imaging lens system. Please refer to FIG. 33, which shows a schematic view of YCLr1r according to Mode 1 of the 1st embodiment of the present disclosure.

When an axial distance between the object-side surface of the object-side first lens element and the image surface is TLi, and the focal length of the imaging lens system is fi, the following condition can be satisfied: 0.50<TLi/fi<2.0. Therefore, it is favorable for obtaining a balance between the total track length and the field of view. Moreover, the following condition can also be satisfied: 1.0<TLi/fi<1.5. Please refer to FIG. 34, which shows a schematic view of TLi according to Mode 1 of the 1st embodiment of the present disclosure.

When a sum of axial distances between each of all adjacent lens elements in the imaging lens system is ΣATi, and a sum of central thicknesses of all lens elements in the imaging lens system is ΣCTi, the following condition can be satisfied: 0.10<ΣATi/ΣCTi<1.0. Therefore, it is favorable for adjusting the arrangement of lens elements so as to reduce the size of the imaging lens system. Moreover, the following condition can also be satisfied: 0.15<ΣATi/ΣCTi<0.90.

When the axial distance between the object-side surface of the focus tunable component and the image surface is TL, and the maximum image height of the optical imaging lens assembly is ImgH, the following condition can be satisfied: 1.0<TL/ImgH<2.0. Therefore, it is favorable for obtaining a balance between the reduction of the total track length and the enlargement of the image surface.

When a maximum value among refractive indices of all lens elements in the imaging lens system is Nimax, the following condition can be satisfied: 1.66<Nimax<1.75. Therefore, using materials having high refractive index is favorable for further reducing the size of the imaging lens system and correcting aberrations.

When a minimum value among Abbe numbers of all lens elements in the imaging lens system is Vimin, the following condition can be satisfied: 10.0<Vimin<20.0. Therefore, using materials having small Abbe number is favorable for correcting aberrations such as chromatic aberration.

When the axial distance between the object-side surface of the object-side first lens element and the image-side surface of the image-side first lens element is TDi, and the central thickness of the focus tunable component is CTt, the following condition can be satisfied: 3.00<TDi/CTt<45.0. Therefore, it is favorable for adjusting the arrangement of the focus tunable component and the imaging lens system so as to reduce the size of the optical imaging lens assembly. Moreover, the following condition can also be satisfied: 5.00<TDi/CTt<30.0. Moreover, the following condition can also be satisfied: 7.00<TDi/CTt<20.0.

When the focal length of the optical imaging lens assembly is f, the focal length of the focus tunable component is ft, and an axial distance between the imaged object and a surface of the optical imaging lens assembly closest to the object side is TOB, the following condition can be satisfied: |f/TOB−f/ft|<1.00E-1. Therefore, it is favorable for adjusting the object distance and refractive power changes of the focus tunable component so as to better stabilize the focus tuning process. Moreover, the following condition can also be satisfied: |f/TOB−f/ft|<5.00E-2. Moreover, the following condition can also be satisfied: |f/TOB−f/ft|<1.00E-2.

When the axial distance between the object-side surface of the object-side first lens element and the image surface is TLi, and an entrance pupil diameter of the imaging lens system is EPDi, the following condition can be satisfied: $1.0 < TLi/EPDi < 3.0$. Therefore, it is favorable for obtaining a balance between the size of the imaging lens system and the diameter of the aperture stop.

When the focal length of the imaging lens system is fi, and a focal length of a seventh lens element (i.e., an object-side seventh lens element) counting from the object side to the image side in the imaging lens system is fLf7, the following condition can be satisfied: $0.40 < |fi/fLf7| < 1.50$. Therefore, it is favorable for adjusting the refractive power of the object-side seventh lens element so as to correct aberrations. For example, in the case of the imaging lens system having a total of seven lens elements, the object-side seventh lens element is the image-side first lens element. In the case of the imaging lens system having a total of eight lens elements, the object-side seventh lens element is the image-side second lens element. The rest (i.e., examples of the imaging lens system having more than eight lens elements in total) can be deduced in the same manner.

When a maximum effective radius of the image-side surface of the seventh lens element (i.e., the image-side surface of the object-side seventh lens element) counting from the object side to the image side in the imaging lens system is YLf7r, and an axial distance between the object-side surface of the object-side first lens element and the image-side surface of the object-side seventh lens element is DLf1fLf7r, the following condition can be satisfied: $0.50 < YLf7r/DLf1fLf7r < 0.95$. Therefore, it is favorable for adjusting the size distribution of lens elements from the object-side first lens element through the object-side seventh lens element of the imaging lens system so that the optical imaging lens assembly has a proper size, aperture diameter and field of view.

When a maximum effective radius of the object-side surface of the object-side first lens element is YLf1f, and a maximum effective radius of the image-side surface of the image-side first lens element is YLr1r, the following condition can be satisfied: $1.50 < YLr1r/YLf1f < 5.00$. Therefore, it is favorable for adjusting the outer diameter of the imaging lens system so as to obtain a proper size distribution. Moreover, the following condition can also be satisfied: $1.80 < YLr1r/YLf1f < 3.50$. Please refer to FIG. 33, which shows a schematic view of YLf1f and YLr1r according to Mode 1 of the 1st embodiment of the present disclosure.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the object-side first lens element can provide a longer distance between an exit pupil of the imaging lens system and the image surface to produce a telecentric effect, and thereby improves the image-sensing efficiency of an image sensor (for example, CCD or CMOS). A middle stop disposed between the object-side first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
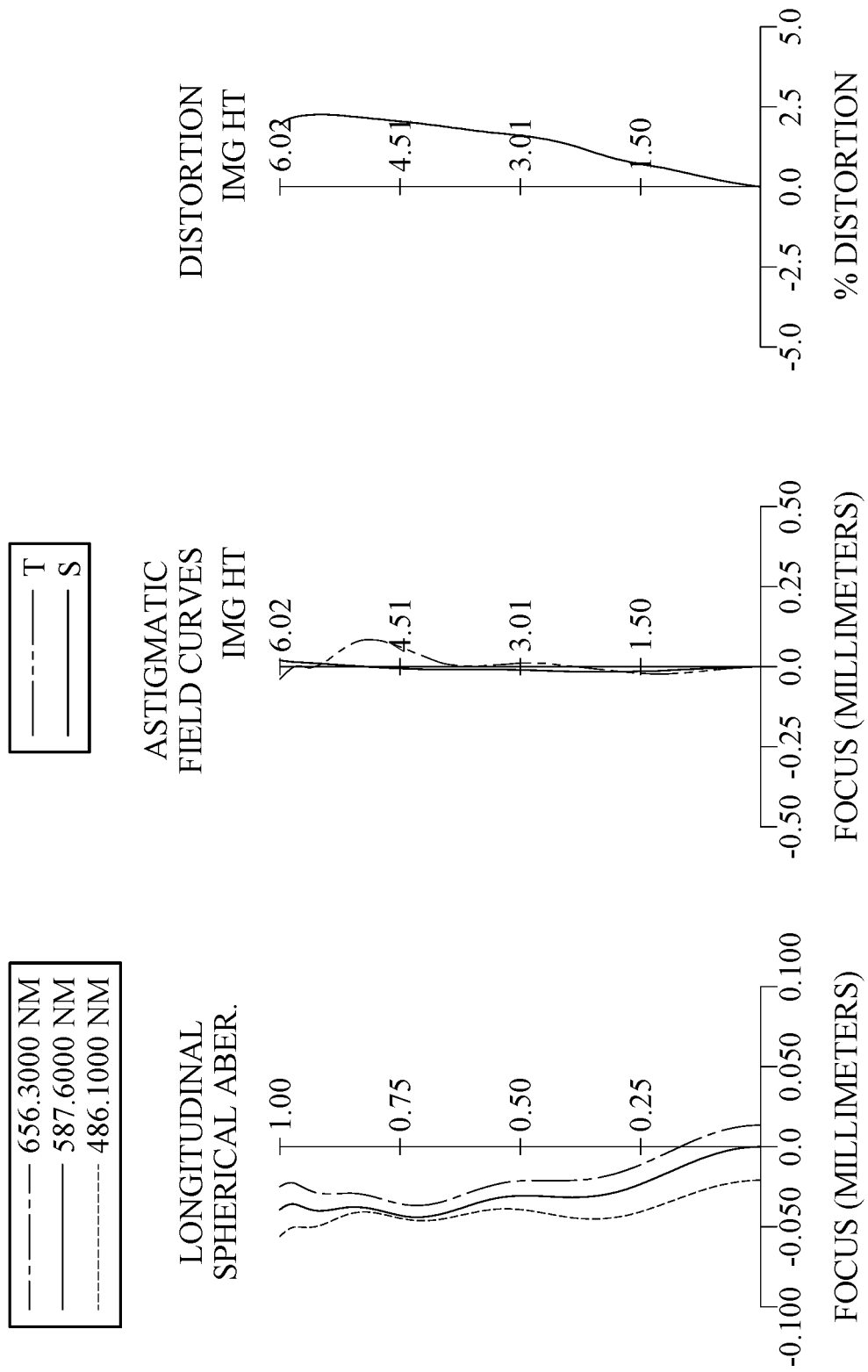
FIG. 2 shows spherical aberration curves, astigmatic field curves and a distortion curve of the image capturing unit in Mode 1 according to the 1st embodiment.
Figure 3:
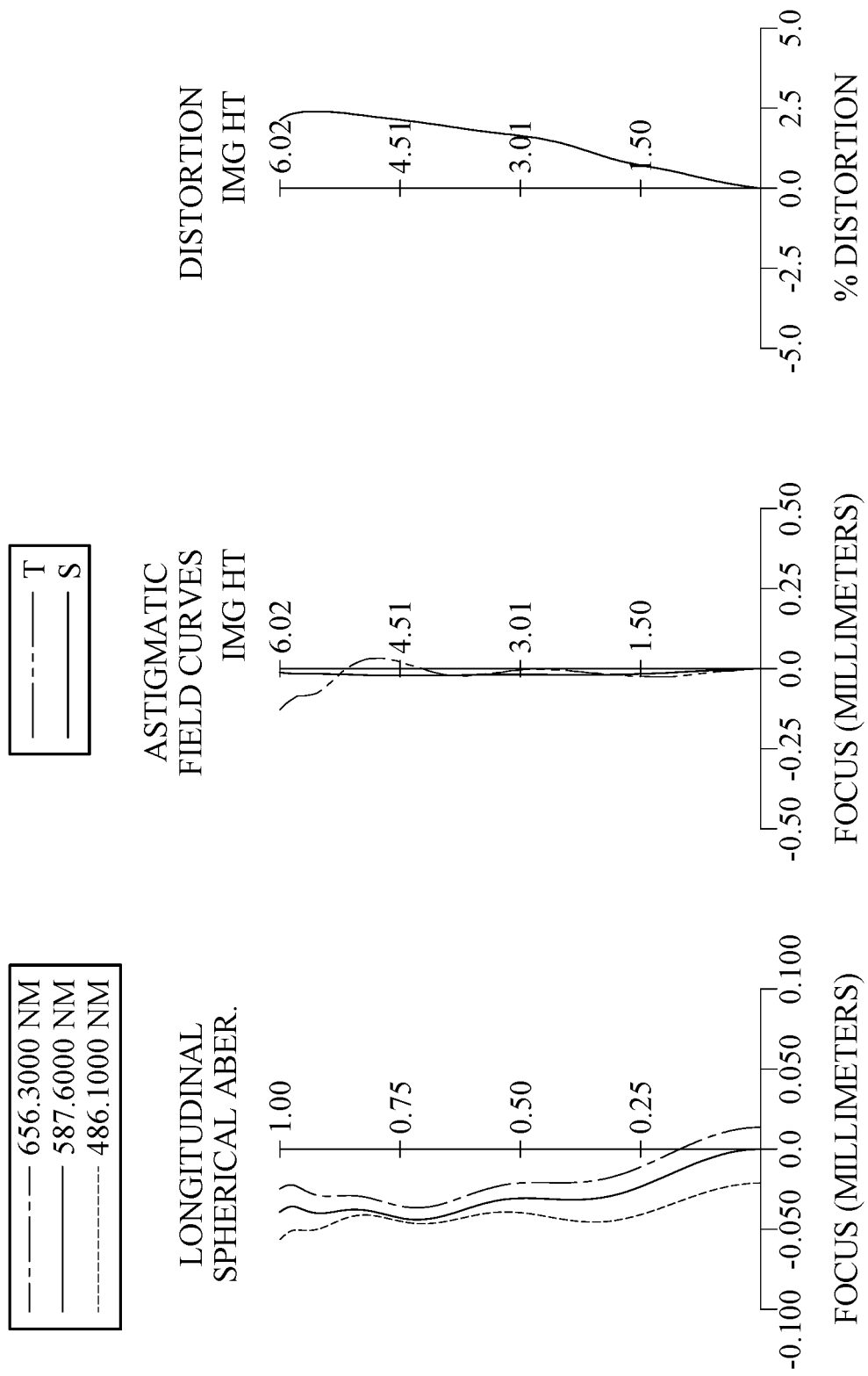
FIG. 3 shows spherical aberration curves, astigmatic field curves and a distortion curve of the image capturing unit in Mode 2 according to the 1st embodiment.
Figure 4:
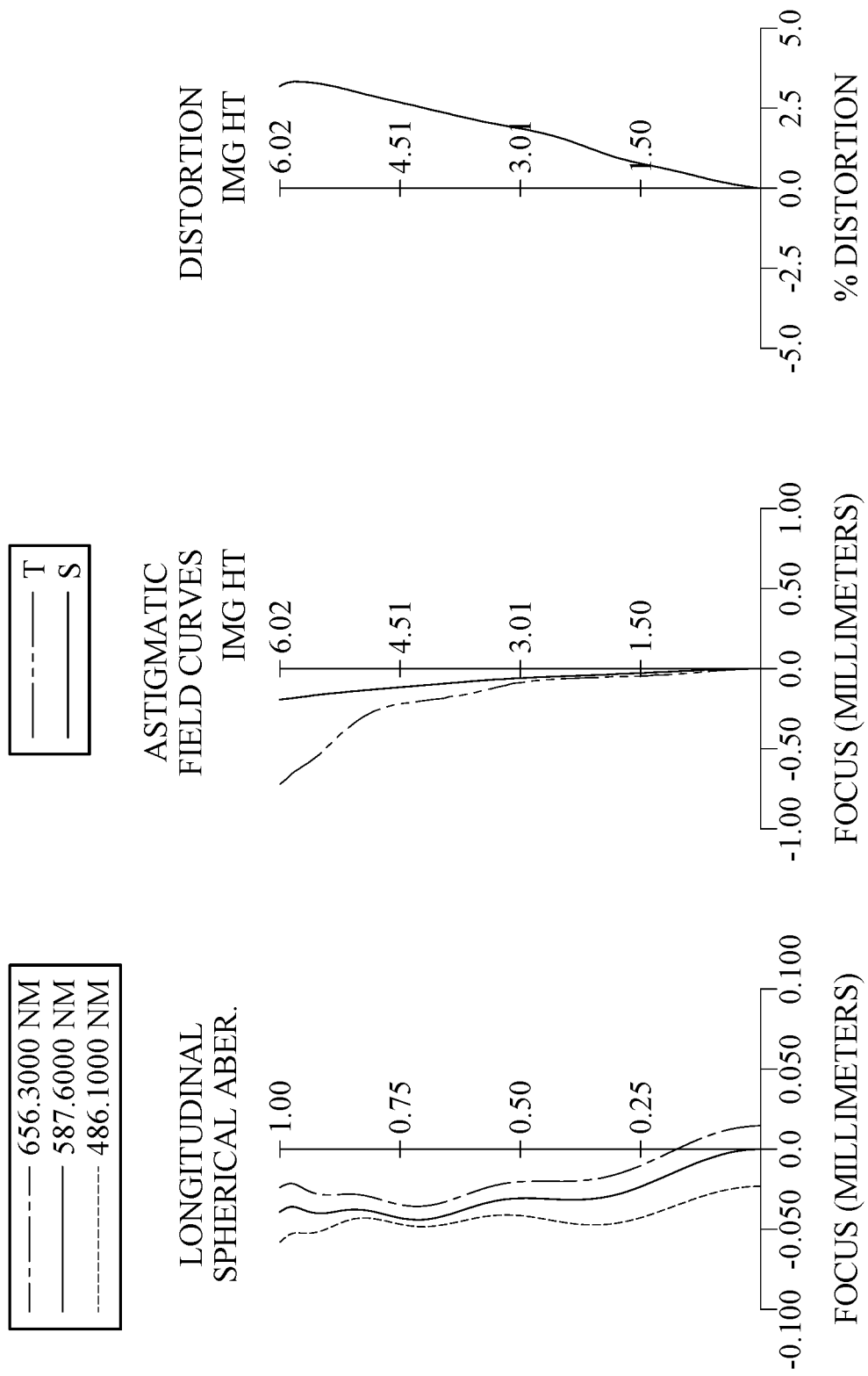
FIG. 4 shows spherical aberration curves, astigmatic field curves and a distortion curve of the image capturing unit in Mode 3 according to the 1st embodiment.

FIG. 1 is a schematic view of an image capturing unit in Mode 1 according to the 1st embodiment of the present disclosure. FIG. 2 shows spherical aberration curves, astigmatic field curves and a distortion curve of the image capturing unit in Mode 1 according to the 1st embodiment. FIG. 3 shows spherical aberration curves, astigmatic field curves and a distortion curve of the image capturing unit in Mode 2 according to the 1st embodiment. FIG. 4 shows spherical aberration curves, astigmatic field curves and a distortion curve of the image capturing unit in Mode 3 according to the 1st embodiment. In FIG. 1, the image capturing unit includes the optical imaging lens assembly (its reference numeral is omitted) of the present disclosure and an image sensor 199. The optical imaging lens assembly includes a focus tunable component 190, an aperture stop 100, an imaging lens system (its reference numeral is omitted), a stop 101, a stop 102, a filter 193 and an image surface 195. The imaging lens system includes a first lens element 110, a second lens element 120, a third lens element 130, a fourth lens element 140, a fifth lens element 150, a sixth lens element 160 and a seventh lens element 170. Further, the aforementioned components of the optical imaging lens assembly are arranged in order from an object side to an image side as follows: the focus tunable component 190, the aperture stop 100, the first lens element 110, the second lens element 120, the stop 101, the third lens element 130, the stop 102, the fourth lens element 140, the fifth lens element 150, the sixth lens element 160, the seventh lens element 170, the filter 193 and the image surface 195. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 110) and an object-side second lens element (the second lens element 120), and the second lens group includes, in order from the image side to the object side, an image-side first lens element (the seventh lens element 170) and an image-side second lens element (the sixth lens element 160). The imaging lens system includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one inflection point. The image-side surface 112 of the first lens element 110 has at least one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point. The image-side surface 132 of the third lens element 130 has at least one inflection point. The object-side surface 131 of the third lens element 130 has at least one critical point in an off-axis region thereof. The image-side surface 132 of the third lens element 130 has at least one critical point in an off-axis region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point. The image-side surface 142 of the fourth lens element 140 has at least one inflection point. The object-side surface 141 of the fourth lens element 140 has at least one critical point in an off-axis region thereof. The image-side surface 142 of the fourth lens element 140 has at least one critical point in an off-axis region thereof.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point. The object-side surface 151 of the fifth lens element 150 has at least one critical point in an off-axis region thereof. The image-side surface 152 of the fifth lens element 150 has at least one critical point in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point. The object-side surface 161 of the sixth lens element 160 has at least one critical point in an off-axis region thereof. The image-side surface 162 of the sixth lens element 160 has at least one critical point in an off-axis region thereof.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one inflection point. The image-side surface 172 of the seventh lens element 170 has at least one inflection point. The object-side surface 171 of the seventh lens element 170 has at least one critical point in an off-axis region thereof. The image-side surface 172 of the seventh lens element 170 has at least one critical point in an off-axis region thereof.

The filter 193 is made of glass material and located between the seventh lens element 170 and the image surface 195, and will not affect the focal length of the optical imaging lens assembly. The image sensor 199 is disposed on or near the image surface 195 of the optical imaging lens assembly.

Figure 36:
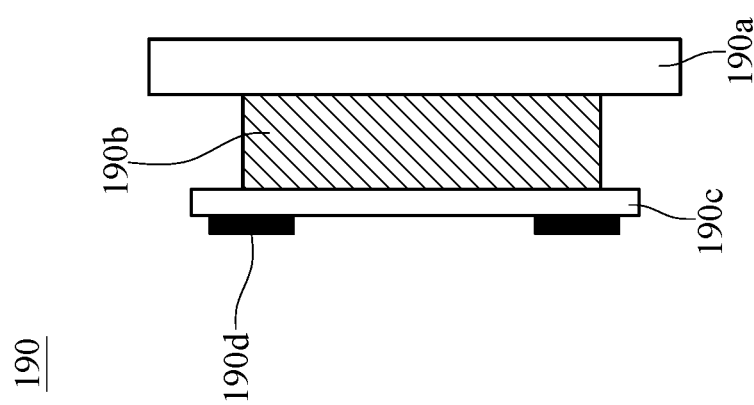
FIG. 36 is a schematic view of the focus tunable component being a liquid lens set according to the 1st embodiment of the present disclosure.
Figure 37:
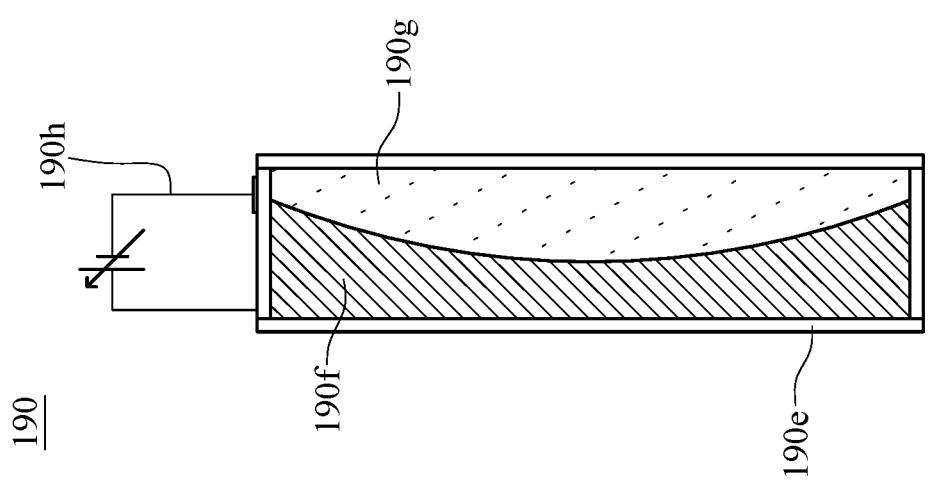
FIG. 37 is a schematic view of the focus tunable component being another liquid lens set according to the 1st embodiment of the present disclosure.
Figure 38:
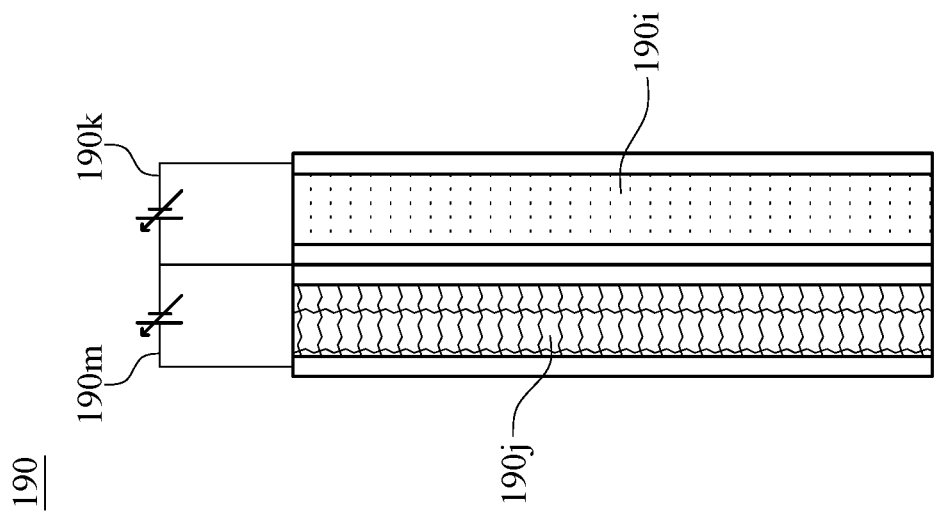
FIG. 38 is a schematic view of the focus tunable component being a liquid crystal lens set according to the 1st embodiment of the present disclosure.

The focus tunable component 190 is disposed on the object side of the imaging lens system, and the focus tunable component 190 is configured for tuning its focal length in accordance with object distances or ambient temperatures of various conditions so as to adjust the focal length of the optical imaging lens assembly. In this embodiment, the focus tunable component 190 can be a liquid lens set, a liquid crystal lens set, a positive lens element, a negative lens element or other optical components featuring focus tuning function, and the focus tunable component 190 can change the focal length of the optical imaging lens assembly by an external control unit (e.g., circuit or mechanical stress control mechanism). In detail, please refer to FIG. 36, FIG. 37 and FIG. 38. FIG. 36 is a schematic view of the focus tunable component being a liquid lens set according to the 1st embodiment of the present disclosure. FIG. 37 is a schematic view of the focus tunable component being another liquid lens set according to the 1st embodiment of the present disclosure. FIG. 38 is a schematic view of the focus tunable component being a liquid crystal lens set according to the 1st embodiment of the present disclosure. In FIG. 36, the focus tunable component 190 is a liquid lens set which includes a transparent substrate 190a, a liquid material 190b, a flexible membrane 190c and a piezo film 190d. The transparent substrate 190a can be made of glass material or plastic material, the liquid material 190b is filled in between the transparent substrate 190a and the flexible membrane 190c, and the flexible membrane 190c is connected to the piezo film 190d. When a voltage is applied across the piezo film 190d, the shape of the flexible membrane 190c changes and thus the focal length of the focus tunable component 190 changes, thereby changing the focal length of the optical imaging lens assembly. In FIG. 37, the focus tunable component 190 is another liquid lens set which includes a transparent substrate 190e, a first liquid material 190f, a second liquid material 190g and a controlling circuit 190h. The first liquid material 190f and the second liquid material 190g are filled in the transparent substrate 190e, and the first liquid material 190f and the second liquid material 190g are mutually insoluble. The shape of the contact surface between the first liquid material 190f and the second liquid material 190g changes when a voltage is applied thereacross, and thus the focal length of the focus tunable component 190 changes, thereby changing the focal length of the optical imaging lens assembly. In FIG. 38, the focus tunable component 190 is a liquid crystal lens set which includes two liquid crystal lens elements 190i, 190j and two controlling circuits 190k, 190m. Each of the liquid crystal lens elements 190i, 190j includes a transparent substrate (its reference numeral is omitted) and a liquid crystal material (its reference numeral is omitted) filled in the transparent substrate. The liquid crystal lens elements 190i, 190j are connected to each other and respectively connected to the controlling circuits 190k, 190m. The focal length of the liquid crystal lens elements 190i, 190j changes when a voltage is applied thereacross, thereby changing the focal length of the focus tunable component 190.

The equation of the aspheric surface profiles of the aforementioned lens elements of the 1st embodiment is expressed as follows:

$$X(Y) = (Y^2/R)/(1 + \operatorname{sqrt}(1 - (1+k)\times(Y/R)^2)) + \sum_{i}(Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical imaging lens assembly of the image capturing unit according to the 1st embodiment, a focal length of the optical imaging lens assembly is f, an f-number of the optical imaging lens assembly is Fno, half of a maximum field of view of the optical imaging lens assembly is HFOV, an axial distance between an imaged object and a surface of the optical imaging lens assembly closest to the object side is TOB, a central thickness of the focus tunable component 190 is CTt, a focal length of the focus tunable component 190 is ft, and a focal length of the imaging lens system is fi. With different focusing conditions, the aforementioned parameters have different values. In this embodiment, three of various modes of the optical imaging lens assembly are provided according to different focusing conditions.

In Mode 1 of the optical imaging lens assembly, the abovementioned parameters have the following values: f=6.80 millimeters (mm), Fno=1.93, HFOV=41.1 degrees (deg.), TOB=∞ (infinity), CTt=0.350 mm, ft=−1000.00 mm, and fi=6.72 mm.

When an axial distance between an object-side surface of the object-side first lens element and an image-side surface of the image-side first lens element is TDi, and the central thickness of the focus tunable component 190 is CTt, the following condition is satisfied: TDi/CTt=18.86. In this embodiment, the object-side surface of the object-side first lens element is the object-side surface 111 of the first lens element 110, and the image-side surface of the image-side first lens element is the image-side surface 172 of the seventh lens element 170, so TDi is an axial distance between the object-side surface 111 of the first lens element 110 and the image-side surface 172 of the seventh lens element 170.

When an axial distance between an object-side surface 191 of the focus tunable component 190 and the image surface 195 is TL, the following condition is satisfied: TL=8.05 [mm].

When the axial distance between the object-side surface 191 of the focus tunable component 190 and the image surface 195 is TL, and a maximum image height of the optical imaging lens assembly is ImgH, the following condition is satisfied: TL/ImgH=1.34.

When a curvature radius of the image-side surface of the image-side first lens element is RLr1r, and the maximum image height of the optical imaging lens assembly is ImgH, the following condition is satisfied: RLr1r/ImgH=0.78. In this embodiment, the image-side surface of the image-side first lens element is the image-side surface 172 of the seventh lens element 170, so RLr1r is a curvature radius of the image-side surface 172 of the seventh lens element 170.

When the focal length of the optical imaging lens assembly is f, and the focal length of the focus tunable component 190 is ft, the following condition is satisfied: |f/ft|=6.80E-03.

When the focal length of the optical imaging lens assembly is f, the focal length of the focus tunable component 190 is ft, and the axial distance between the imaged object and the surface of the optical imaging lens assembly closest to the object side is TOB, the following condition is satisfied: |f/TOB−f/ft|=6.80E-03. In this embodiment, the surface of the optical imaging lens assembly closest to the object side is the object-side surface 191 of the focus tunable component 190, so TOB is an axial distance between the imaged object and the object-side surface 191 of the focus tunable component 190.

When the focal length of the imaging lens system is fi, and the focal length of the focus tunable component 190 is ft, the following condition is satisfied: |fi/ft|=6.72E-03.

When the focal length of the focus tunable component 190 is ft, the following condition is satisfied: |ft|=1000.00 [mm].

When a chief ray angle at a maximum image height position of the optical imaging lens assembly is CRA, the following condition is satisfied: CRA=35.9 [deg.].

When a maximum effective radius of an image-side surface of a seventh lens element (an image-side surface of an object-side seventh lens element) counting from the object side to the image side is YLf7r, and an axial distance between the object-side surface of the object-side first lens element and the image-side surface of the object-side seventh lens element is DLf1fLf7r, the following condition is satisfied: YLf7r/DLf1fLf7r=0.72. In this embodiment, the object-side surface of the object-side first lens element is the object-side surface 111 of the first lens element 110, and the image-side surface of the object-side seventh lens element is the image-side surface 172 of the seventh lens element 170, so YLf7r is a maximum effective radius of the image-side surface 172 of the seventh lens element 170, and DLf1fLf7r is an axial distance between the object-side surface 111 of the first lens element 110 and the image-side surface 172 of the seventh lens element 170.

When a maximum effective radius of the object-side surface of the object-side first lens element is YLf1f, and a maximum effective radius of the image-side surface of the image-side first lens element is YLr1r, the following condition is satisfied: YLr1r/YLf1f=2.68. In this embodiment, the object-side surface of the object-side first lens element is the object-side surface 111 of the first lens element 110, and the image-side surface of the image-side first lens element is the image-side surface 172 of the seventh lens element 170, so YLf1f is a maximum effective radius of the object-side surface 111 of the first lens element 110, and YLr1r is a maximum effective radius of the image-side surface 172 of the seventh lens element 170.

When a maximum value among refractive indices of all lens elements in the imaging lens system is Nimax, the following condition is satisfied: Nimax=1.686. In this embodiment, among the first through seventh lens elements (110-170), a refractive index of the second lens element 120 and a refractive index of the third lens element 130 are the same and both larger than the refractive indices of the other lens elements, and Nimax is equal to the refractive index of the second lens element 120 and the refractive index of the third lens element 130.

When a minimum value among Abbe numbers of all lens elements in the imaging lens system is Vimin, the following condition is satisfied: Vimin=18.4. In this embodiment, among the first through seventh lens elements (110-170), an Abbe number of the second lens element 120 and an Abbe number of the third lens element 130 are the same and both smaller than the Abbe numbers of the other lens elements, and Vim in is equal to the Abbe number of the second lens element 120 and the Abbe number of the third lens element 130.

When a sum of axial distances between each of all adjacent lens elements in the imaging lens system is $\Sigma ATi$, and a sum of central thicknesses of all lens elements in the imaging lens system is $\Sigma CTi$, the following condition is satisfied: $\Sigma ATi/\Sigma CTi$=0.75. In this embodiment, an axial distance between two adjacent lens elements is an air gap in a paraxial region between the two adjacent lens elements; $\Sigma ATi$ is a sum of an axial distance between the first lens element 110 and the second lens element 120, an axial distance between the second lens element 120 and the third lens element 130, an axial distance between the third lens element 130 and the fourth lens element 140, an axial distance between the fourth lens element 140 and the fifth lens element 150, an axial distance between the fifth lens element 150 and the sixth lens element 160, and an axial distance between the sixth lens element 160 and the seventh lens element 170; $\Sigma CTi$ is a sum of the central thicknesses of the first lens element 110, the second lens element 120, the third lens element 130, the fourth lens element 140, the fifth lens element 150, the sixth lens element 160 and the seventh lens element 170.

When an axial distance between the image-side first lens element and the image-side second lens element is DLr1Lr2, and a central thickness of the image-side first lens element is CTLr1, the following condition is satisfied: DLr1Lr2/CTLr1=1.38. In this embodiment, the image-side first lens element is the seventh lens element 170, and the image-side second lens element is the sixth lens element 160, so DLr1Lr2 is the axial distance between the sixth lens element 160 and the seventh lens element 170, and CTLr1 is the central thickness of the seventh lens element 170.

When an axial distance between the aperture stop 100 and the image-side surface of the image-side first lens element is SDi, and the axial distance between the object-side surface of the object-side first lens element and the image-side surface of the image-side first lens element is TDi, the following condition is satisfied: SDi/TDi=0.88. In this embodiment, the image-side surface of the image-side first lens element is the image-side surface 172 of the seventh lens element 170, so SDi is an axial distance between the aperture stop 100 and the image-side surface 172 of the seventh lens element 170.

When an axial distance between the object-side surface of the object-side first lens element and the image surface 195 is TLi, and an entrance pupil diameter of the imaging lens system is EPDi, the following condition is satisfied: TLi/EPDi=2.13. In this embodiment, the object-side surface of the object-side first lens element is the object-side surface 111 of the first lens element 110, so TLi is an axial distance between the object-side surface 111 of the first lens element 110 and the image surface 195.

When the axial distance between the object-side surface of the object-side first lens element and the image surface 195 is TLi, and the focal length of the imaging lens system is fi, the following condition is satisfied: TLi/fi=1.12.

When a curvature radius of an object-side surface of the image-side second lens element is RLr2f, and a curvature radius of an image-side surface of the image-side second lens element is RLr2r, the following condition is satisfied: |RLr2f/RLr2r|=0.65. In this embodiment, the object-side surface of the image-side second lens element is the object-side surface 161 of the sixth lens element 160, and the image-side surface of the image-side second lens element is the image-side surface 162 of the sixth lens element 160, so RLr2f is a curvature radius of the object-side surface 161 of the sixth lens element 160, and RLr2r is a curvature radius of the image-side surface 162 of the sixth lens element 160.

When the focal length of the imaging lens system is fi, and a focal length of the seventh lens element (i.e., the object-side seventh lens element) counting from the object side to the image side in the imaging lens system is fLf7, the following condition is satisfied: |fi/fLf7|=1.18. In this embodiment, the object-side seventh lens element is the seventh lens element 170, so fLf7 is a focal length of the seventh lens element 170.

When a number of lens elements in the imaging lens system is LNi, the following condition is satisfied: LNi=7.

When a vertical distance between a non-axial critical point on the image-side surface of the image-side first lens element and the optical axis is YCLr1r, and the axial distance between the object-side surface of the object-side first lens element and the image-side surface of the image-side first lens element is TDi, the following condition is satisfied: YCLr1r/TDi=0.19. In this embodiment, the image-side surface of the image-side first lens element is the image-side surface 172 of the seventh lens element 170, so YCLr1r is a vertical distance between the non-axial critical point on the image-side surface 172 of the seventh lens element 170 and the optical axis.

The detailed optical data of the 1st embodiment are shown in Table 1 and the aspheric surface data are shown in Table 2 below.

TABLE 1

1st Embodiment

| Surface # | | Curvature Radius | | Thickness | Material | Index | Abbe # | Focal Length |
|---|---|---|---|---|---|---|---|---|
| 0 | Object | Plano | | TOB | | | | |
| 1 | Focus Tunable Component | | | CTt | | | | ft |
| 2 | | | | 0.950 | | | | |
| 3 | Ape. Stop | Plano | | −0.783 | | | | |
| 4 | Lens 1 | 2.343 | (ASP) | 1.002 | Plastic | 1.537 | 59.5 | 5.76 |
| 5 | | 8.207 | (ASP) | 0.096 | | | | |
| 6 | Lens 2 | 14.879 | (ASP) | 0.285 | Plastic | 1.686 | 18.4 | −16.51 |
| 7 | | 6.381 | (ASP) | 0.349 | | | | |
| 8 | Stop | Plano | | 0.155 | | | | |
| 9 | Lens 3 | 21.218 | (ASP) | 0.311 | Plastic | 1.686 | 18.4 | −239.74 |
| 10 | | 18.682 | (ASP) | 0.194 | | | | |
| 11 | Stop | Plano | | 0.153 | | | | |
| 12 | Lens 4 | −195.695 | (ASP) | 0.638 | Plastic | 1.537 | 59.5 | 32.82 |
| 13 | | −16.188 | (ASP) | 0.718 | | | | |
| 14 | Lens 5 | 5.864 | (ASP) | 0.470 | Plastic | 1.566 | 37.4 | 338.69 |
| 15 | | 5.874 | (ASP) | 0.376 | | | | |
| 16 | Lens 6 | 3.625 | (ASP) | 0.500 | Plastic | 1.537 | 59.5 | 17.61 |
| 17 | | 5.594 | (ASP) | 0.784 | | | | |
| 18 | Lens 7 | −9.089 | (ASP) | 0.570 | Plastic | 1.537 | 59.5 | −5.67 |
| 19 | | 4.685 | (ASP) | 0.500 | | | | |
| 20 | Filter | Plano | | 0.110 | Glass | 1.517 | 64.2 | — |
| 21 | | Plano | | 0.324 | | | | |
| 22 | Image | Plano | | — | | | | |

Note:
Reference wavelength is 587.6 nm (d-line).
An effective radius of the stop 101 (Surface 8) is 1.405 mm.
An effective radius of the stop 102 (Surface 11) is 1.994 mm.

TABLE 2

Aspheric Coefficients

| Surface # | 4 | 5 | 6 | 7 | 9 |
|---|---|---|---|---|---|
| k = | −4.8172E−01 | −1.4767E+01 | 2.4775E+01 | 1.4318E+01 | −8.4866E+01 |
| A4 = | 3.7907E−03 | −1.0084E−02 | −4.4192E−03 | 2.2632E−03 | −3.0016E−02 |
| A6 = | 4.5444E−03 | 1.3147E−02 | 1.7579E−02 | 1.7755E−02 | −5.2609E−03 |
| A8 = | −4.9119E−03 | −1.0432E−02 | −1.1252E−02 | −1.7955E−02 | 6.7743E−03 |
| A10 = | 3.9882E−03 | 5.1642E−03 | 5.1372E−03 | 1.2780E−02 | −7.0957E−03 |

TABLE 2-continued

| Aspheric Coefficients | | | | | |
|---|---|---|---|---|---|
| A12 = | −1.8420E−03 | −1.2884E−03 | −1.1040E−03 | −4.8823E−03 | 3.0773E−03 |
| A14 = | 4.5511E−04 | 1.1097E−04 | 9.6438E−05 | 8.6001E−04 | −3.8943E−04 |
| A16 = | −4.8012E−05 | — | — | — | — |

| Surface # | 10 | 12 | 13 | 14 | 15 |
|---|---|---|---|---|---|
| k = | −6.9450E+01 | −9.9000E+01 | −7.0637E+01 | −5.5683E−02 | −1.4033E+01 |
| A4 = | −3.1986E−02 | −1.5372E−02 | −2.3864E−02 | −1.6983E−02 | −2.0557E−02 |
| A6 = | −2.5253E−03 | −1.9176E−02 | −2.1167E−03 | −3.4892E−03 | 3.6696E−03 |
| A8 = | 4.8631E−03 | 3.0038E−02 | 3.3380E−03 | 1.4339E−03 | −2.8221E−03 |
| A10 = | −5.2260E−03 | −2.5664E−02 | −1.6390E−03 | −9.2503E−04 | 1.1203E−03 |
| A12 = | 2.5168E−03 | 1.2355E−02 | 3.5885E−04 | 3.6827E−04 | −2.7522E−04 |
| A14 = | −3.5384E−04 | −3.1922E−03 | −1.5069E−06 | −9.1785E−05 | 4.3181E−05 |
| A16 = | — | 4.1851E−04 | −7.8186E−06 | 1.3120E−05 | −4.0399E−06 |
| A18 = | — | −2.2035E−05 | 6.2870E−07 | −9.4345E−07 | 2.0178E−07 |
| A20 = | — | — | — | 2.6226E−08 | −4.1151E−09 |

| Surface # | 16 | 17 | 18 | 19 |
|---|---|---|---|---|
| k = | −1.3737E+00 | −3.1267E+01 | 1.8683E+00 | −6.3955E−01 |
| A4 = | −3.6903E−02 | 3.4763E−03 | −6.2408E−02 | −6.1128E−02 |
| A6 = | −1.2007E−06 | −1.2068E−02 | 1.9735E−02 | 1.6078E−02 |
| A8 = | −9.9767E−05 | 3.9067E−03 | −3.5069E−03 | −2.8877E−03 |
| A10 = | −4.4012E−06 | −7.0627E−04 | 4.0253E−04 | 3.3120E−04 |
| A12 = | 4.9771E−05 | 8.0174E−05 | −3.0043E−05 | −2.4180E−05 |
| A14 = | −1.3853E−05 | −5.9267E−06 | 1.4442E−06 | 1.1124E−06 |
| A16 = | 1.5816E−06 | 2.7651E−07 | −4.3102E−08 | −3.1039E−08 |
| A18 = | −8.3148E−08 | −7.1592E−09 | 7.2628E−10 | 4.7734E−10 |
| A20 = | 1.6542E−09 | 7.4101E−11 | −5.2778E−12 | −3.0921E−12 |

In Table 1, the curvature radius, the thickness and the focal length are shown in millimeters (mm). Surface numbers 0-22 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order.

The rest optical data of the optical imaging lens assembly, including in Mode 2 and Mode 3, are disclosed in Table 3 below. Also, the definitions of the parameters shown in Table 3 are consistent with those stated in Mode 1. Moreover, the tables presented below for each embodiment are the corresponding schematic parameter and aberration curves, and the definitions of the tables are the same as Table 1 to Table 3 of the 1st embodiment. Therefore, an explanation in this regard will not be provided again.

2nd Embodiment

Figure 5:
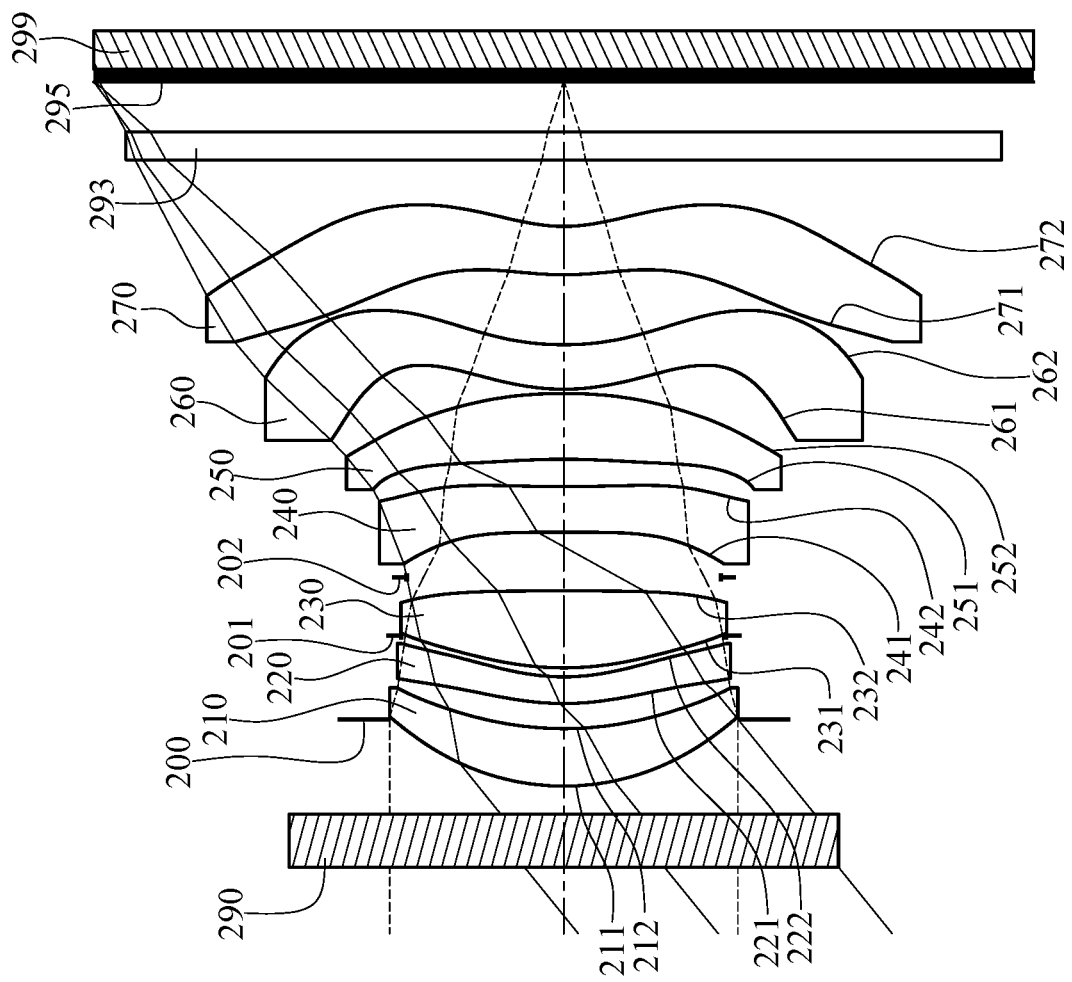
FIG. 5 is a schematic view of an image capturing unit in Mode 1 according to the 2nd embodiment of the present disclosure.
Figure 6:
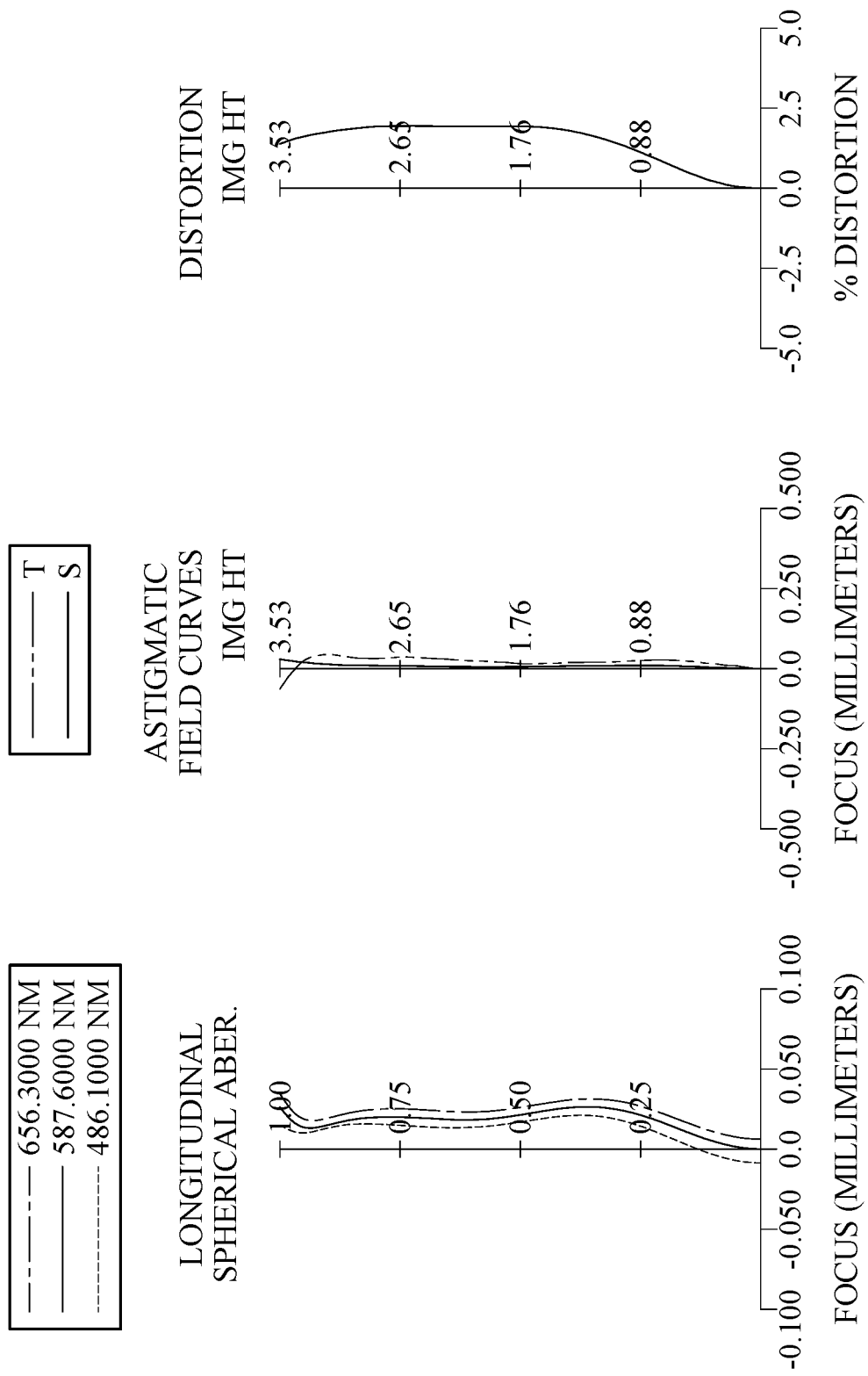
FIG. 6 shows spherical aberration curves, astigmatic field curves and a distortion curve of the image capturing unit in Mode 1 according to the 2nd embodiment.
Figure 7:
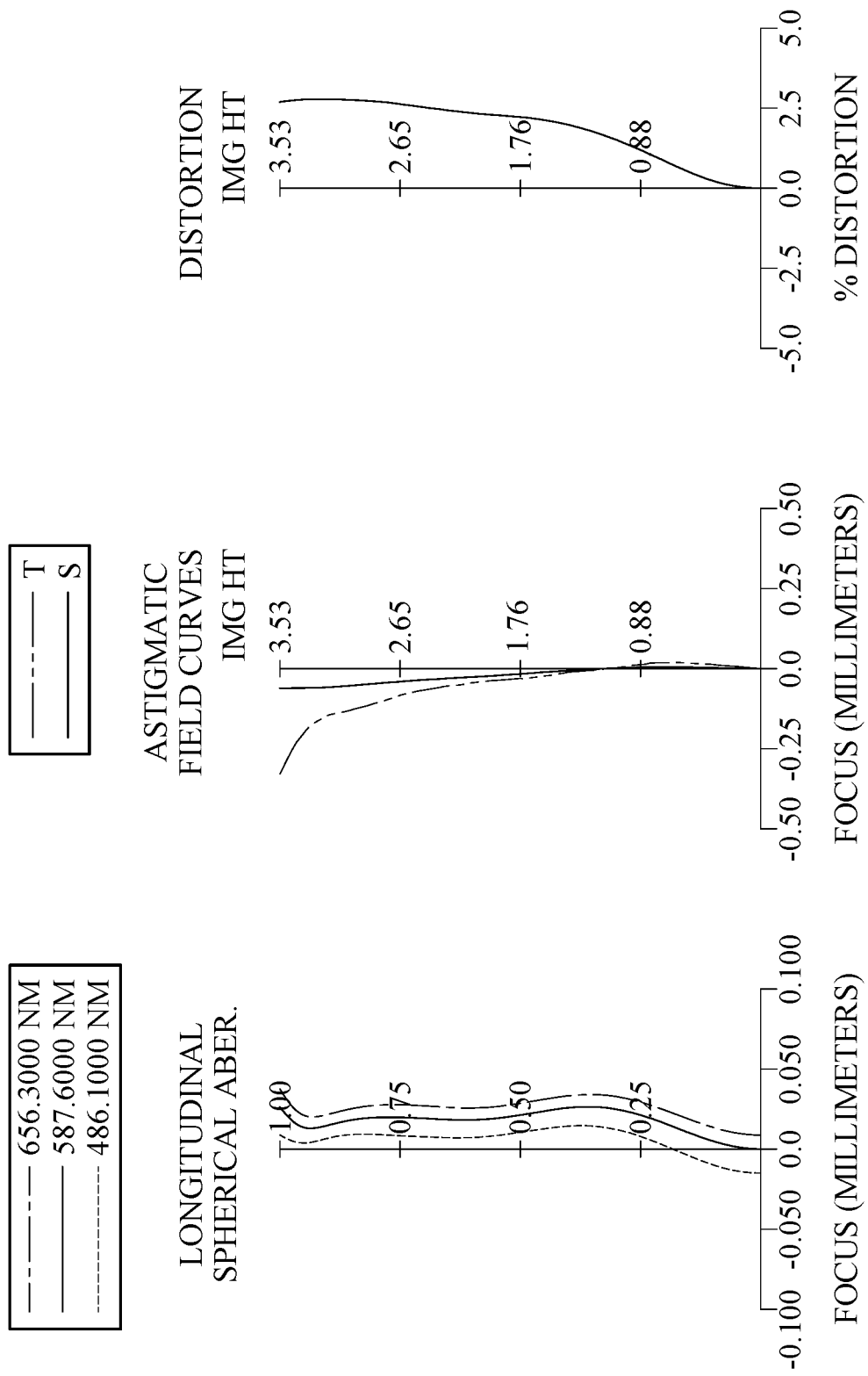
FIG. 7 shows spherical aberration curves, astigmatic field curves and a distortion curve of the image capturing unit in Mode 2 according to the 2nd embodiment.

FIG. 5 is a schematic view of an image capturing unit in Mode 1 according to the 2nd embodiment of the present disclosure. FIG. 6 shows spherical aberration curves, astigmatic field curves and a distortion curve of the image capturing unit in Mode 1 according to the 2nd embodiment. FIG. 7 shows spherical aberration curves, astigmatic field curves and a distortion curve of the image capturing unit in Mode 2 according to the 2nd embodiment. In FIG. 5, the image capturing unit includes the optical imaging lens assembly (its reference numeral is omitted) of the present disclosure and an image sensor 299. The optical imaging lens assembly includes a focus tunable component 290, an aperture stop 200, an imaging lens system (its reference numeral is omitted), a stop 201, a stop 202, a filter 293 and

TABLE 3

| 1st Embodiment | | | | | |
|---|---|---|---|---|---|
| | Mode 1 | Mode 2 | Mode 3 | | |
| f [mm] | 6.80 | 6.72 | 6.31 | fi [mm] | 6.72 |
| Fno | 1.93 | 1.93 | 1.93 | Nimax | 1.686 |
| HFOV [deg.] | 41.1 | 41.0 | 40.6 | Vimin | 18.4 |
| TOB [mm] | ∞ | 1000.000 | 150.000 | ΣATi/ΣCTi | 0.75 |
| CTt [mm] | 0.350 | 0.350 | 0.350 | DLr1Lr2/CTLr1 | 1.38 |
| ft [mm] | −1000.00 | ∞ | 176.67 | SDi/TDi | 0.88 |
| TDi/CTt | 18.86 | 18.86 | 18.86 | TLi/EPDi | 2.13 |
| TL [mm] | 8.05 | 8.05 | 8.05 | TLi/fi | 1.12 |
| TL/ImgH | 1.34 | 1.34 | 1.34 | |RLr2f/RLr2r| | 0.65 |
| RLr1r/ImgH | 0.78 | 0.78 | 0.78 | |fi/fLf7| | 1.18 |
| |f/ft| | 6.80E−03 | 0.00E+00 | 3.57E−02 | LNi | 7 |
| |f/TOB − f/ft| | 6.80E−03 | 6.72E−03 | 6.35E−03 | YCLr1r/TDi | 0.19 |
| |fi/ft| | 6.72E−03 | 0.00E+00 | 3.81E−02 | — | — |
| |ft| [mm] | 1000.00 | ∞ | 176.67 | — | — |
| CRA [deg.] | 35.9 | 35.9 | 35.9 | — | — |
| YLf7r/DLf1fLf7r | 0.72 | 0.71 | 0.71 | — | — |
| YLr1r/YLf1f | 2.68 | 2.67 | 2.64 | — | — | an image surface 295. The imaging lens system includes a first lens element 210, a second lens element 220, a third lens element 230, a fourth lens element 240, a fifth lens element 250, a sixth lens element 260 and a seventh lens element 270. Further, the aforementioned components of the optical imaging lens assembly are arranged in order from an object side to an image side as follows: the focus tunable component 290, the aperture stop 200, the first lens element 210, the second lens element 220, the stop 201, the third lens element 230, the stop 202, the fourth lens element 240, the fifth lens element 250, the sixth lens element 260, the seventh lens element 270, the filter 293 and the image surface 295. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 210) and an object-side second lens element (the second lens element 220), and the second lens group includes, in order from the image side to the object side, an image-side first lens element (the seventh lens element 270) and an image-side second lens element (the sixth lens element 260). The imaging lens system includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point. The image-side surface 222 of the second lens element 220 has at least one inflection point.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one inflection point. The image-side surface 242 of the fourth lens element 240 has at least one critical point in an off-axis region thereof.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point. The object-side surface 261 of the sixth lens element 260 has at least one critical point in an off-axis region thereof. The image-side surface 262 of the sixth lens element 260 has at least one critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has at least one inflection point. The image-side surface 272 of the seventh lens element 270 has at least one inflection point. The object-side surface 271 of the seventh lens element 270 has at least one critical point in an off-axis region thereof. The image-side surface 272 of the seventh lens element 270 has at least one critical point in an off-axis region thereof.

The filter 293 is made of glass material and located between the seventh lens element 270 and the image surface 295, and will not affect the focal length of the optical imaging lens assembly. The image sensor 299 is disposed on or near the image surface 295 of the optical imaging lens assembly.

The focus tunable component 290 is disposed on the object side of the imaging lens system, and the focus tunable component 290 is configured for tuning its focal length in accordance with object distances or ambient temperatures of various conditions so as to adjust the focal length of the optical imaging lens assembly. In this embodiment, the focus tunable component 290 can be a liquid lens set, a liquid crystal lens set, a positive lens element, a negative lens element or other optical components featuring focus tuning function.

In this embodiment, two of various modes of the optical imaging lens assembly are provided according to different focusing conditions. The detailed optical data of the 2nd embodiment are shown in Table 4 and the aspheric surface data are shown in Table 5 below.

TABLE 4

2nd Embodiment

| Surface # | | Curvature Radius | Thickness | Material | Index | Abbe # | Focal Length |
|---|---|---|---|---|---|---|---|
| 0 | Object | Plano | | TOB | | | |
| 1 | Focus Tunable Component | | CTt | | | | ft |
| 2 | | | 0.713 | | | | |
| 3 | Ape. Stop | Plano | −0.503 | | | | |

TABLE 4-continued

| 2nd Embodiment | | | | | | | | |
|---|---|---|---|---|---|---|---|---|
| Surface # | | Curvature Radius | | Thickness | Material | Index | Abbe # | Focal Length |
| 4 | Lens 1 | 1.849 | (ASP) | 0.432 | Plastic | 1.545 | 56.1 | 10.33 |
| 5 | | 2.526 | (ASP) | 0.189 | | | | |
| 6 | Lens 2 | 2.061 | (ASP) | 0.200 | Plastic | 1.679 | 18.4 | −13.04 |
| 7 | | 1.606 | (ASP) | 0.310 | | | | |
| 8 | Stop | Plano | | −0.242 | | | | |
| 9 | Lens 3 | 2.316 | (ASP) | 0.578 | Plastic | 1.544 | 56.0 | 4.21 |
| 10 | | −170.756 | (ASP) | 0.102 | | | | |
| 11 | Stop | Plano | | 0.340 | | | | |
| 12 | Lens 4 | −64.313 | (ASP) | 0.342 | Plastic | 1.686 | 18.4 | −12.52 |
| 13 | | 9.935 | (ASP) | 0.206 | | | | |
| 14 | Lens 5 | −5.404 | (ASP) | 0.494 | Plastic | 1.587 | 28.3 | 20.99 |
| 15 | | −3.884 | (ASP) | 0.032 | | | | |
| 16 | Lens 6 | 1.697 | (ASP) | 0.334 | Plastic | 1.544 | 56.0 | 11.49 |
| 17 | | 2.167 | (ASP) | 0.526 | | | | |
| 18 | Lens 7 | 2.233 | (ASP) | 0.364 | Plastic | 1.544 | 56.0 | −5.65 |
| 19 | | 1.219 | (ASP) | 0.500 | | | | |
| 20 | Filter | Plano | | 0.210 | Glass | 1.517 | 64.2 | — |
| 21 | | Plano | | 0.375 | | | | |
| 22 | Image | Plano | | — | | | | |

Note:
Reference wavelength is 587.6 nm (d-line).
An effective radius of the stop 201 (Surface 8) is 1.220 mm.
An effective radius of the stop 202 (Surface 11) is 1.180 mm.

TABLE 5

| Aspheric Coefficients | | | | | |
|---|---|---|---|---|---|
| Surface # | 4 | 5 | 6 | 7 | 9 |
| k = | −5.4088E−01 | 6.5512E−01 | −1.8187E+00 | −3.8590E+00 | −4.0009E−01 |
| A4 = | 8.9212E−03 | −1.4240E−02 | −1.0299E−01 | −4.7577E−02 | −3.0162E−02 |
| A6 = | 1.1885E−02 | 1.5062E−03 | 2.4305E−02 | −5.5731E−03 | 2.0363E−02 |
| A8 = | −1.6907E−02 | −1.2851E−02 | −2.6889E−02 | −1.0010E−01 | −1.4583E−01 |
| A10 = | 1.0956E−02 | 6.6237E−03 | 2.8588E−02 | 1.6766E−01 | 1.9972E−01 |
| A12 = | −2.9049E−03 | — | −7.7460E−03 | −8.8262E−02 | −1.0572E−01 |
| A14 = | — | — | — | 1.5269E−02 | 2.0402E−02 |

| Surface # | 10 | 12 | 13 | 14 | 15 |
|---|---|---|---|---|---|
| k = | 9.9000E+01 | 9.3200E+01 | 2.6656E+01 | 3.5816E+00 | −7.4493E−01 |
| A4 = | −3.3296E−02 | −1.2597E−01 | −7.1997E−02 | 7.1369E−02 | −1.1663E−01 |
| A6 = | −9.0549E−04 | 2.6713E−02 | 3.4538E−02 | 9.0195E−02 | 1.6699E−01 |
| A8 = | −4.8960E−04 | −1.3251E−01 | −1.1466E−01 | −3.1574E−01 | −1.2852E−01 |
| A10 = | −3.8048E−03 | 2.3100E−01 | 1.1205E−01 | 4.5160E−01 | 6.0460E−02 |
| A12 = | 2.2124E−03 | −1.7919E−01 | −4.2397E−02 | −4.8100E−01 | −2.3631E−02 |
| A14 = | — | 7.2983E−02 | 5.7653E−03 | 3.6590E−01 | 8.3366E−03 |
| A16 = | — | −1.3228E−02 | — | −1.7828E−01 | −1.8826E−03 |
| A18 = | — | — | — | 4.9144E−02 | 1.7552E−04 |
| A20 = | — | — | — | −5.8451E−03 | — |

| Surface # | 16 | 17 | 18 | 19 |
|---|---|---|---|---|
| k = | −6.5856E+00 | −1.1672E+00 | −1.5777E+01 | −5.9152E+00 |
| A4 = | 4.0593E−02 | 7.8214E−02 | −2.6443E−01 | −1.7237E−01 |
| A6 = | −1.2042E−01 | −2.0123E−01 | 1.4486E−01 | 9.7234E−02 |
| A8 = | 4.6232E−02 | 1.5352E−01 | −4.6370E−02 | −4.1509E−02 |
| A10 = | 1.1218E−02 | −7.8208E−02 | 9.3801E−03 | 1.1987E−02 |
| A12 = | −3.5298E−02 | 2.8389E−02 | −9.6765E−04 | −2.3288E−03 |
| A14 = | 2.6488E−02 | −7.1795E−03 | −1.4701E−05 | 3.1071E−04 |
| A16 = | −1.0120E−02 | 1.1884E−03 | 1.5346E−05 | −2.7729E−05 |
| A18 = | 1.9684E−03 | −1.1465E−04 | −1.4884E−06 | 1.4780E−06 |
| A20 = | −1.5215E−04 | 4.8473E−06 | 4.7447E−08 | −3.4895E−08 |

In the 2nd embodiment, the equation of the aspheric surface profiles of the aforementioned lens elements is the same as the equation of the 1st embodiment. Also, the rest optical data of the optical imaging lens assembly are disclosed in Table 6 below. Moreover, the definitions of these parameters shown in Table 6 are the same as those stated in the 1st embodiment with corresponding values for the 2nd embodiment, so an explanation in this regard will not be provided again.

TABLE 6

2nd Embodiment

|  | Mode 1 | Mode 2 |  |  |
|---|---|---|---|---|
| f [mm] | 4.28 | 4.06 | fi [mm] | 4.28 |
| Fno | 1.64 | 1.64 | Nimax | 1.686 |
| HFOV [deg.] | 39.0 | 38.4 | Vimin | 18.4 |
| TOB [mm] | ∞ | 100.000 | ΣATi/ΣCTi | 0.53 |
| CTt [mm] | 0.400 | 0.400 | DLr1Lr2/CTLr1 | 1.45 |
| ft [mm] | ∞ | 100.89 | SDi/TDi | 0.88 |
| TDi/CTt | 10.52 | 10.52 | TLi/EPDi | 2.03 |
| TL [mm] | 5.90 | 5.90 | TLi/fi | 1.24 |
| TL/ImgH | 1.67 | 1.67 | |RLr2f/RLr2r| | 0.78 |
| RLr1r/ImgH | 0.35 | 0.35 | |fi/fLf7| | 0.76 |
| |f/ft| | 0.00E+00 | 4.02E−02 | LNi | 7 |
| |f/TOB-f/ft| | 0.00E+00 | 3.56E−04 | YCLr1r/TDi | 0.26 |
| |fi/ft| | 0.00E+00 | 4.24E−02 | — | — |
| |ft| [mm] | ∞ | 100.89 | — | — |
| CRA [deg.] | 36.3 | 36.3 | — | — |
| YLf7r/DLf1fLf7r | 0.64 | 0.63 | — | — |
| YLr1r/YLf1f | 2.05 | 2.02 | — | — |

3rd Embodiment

Figure 8:
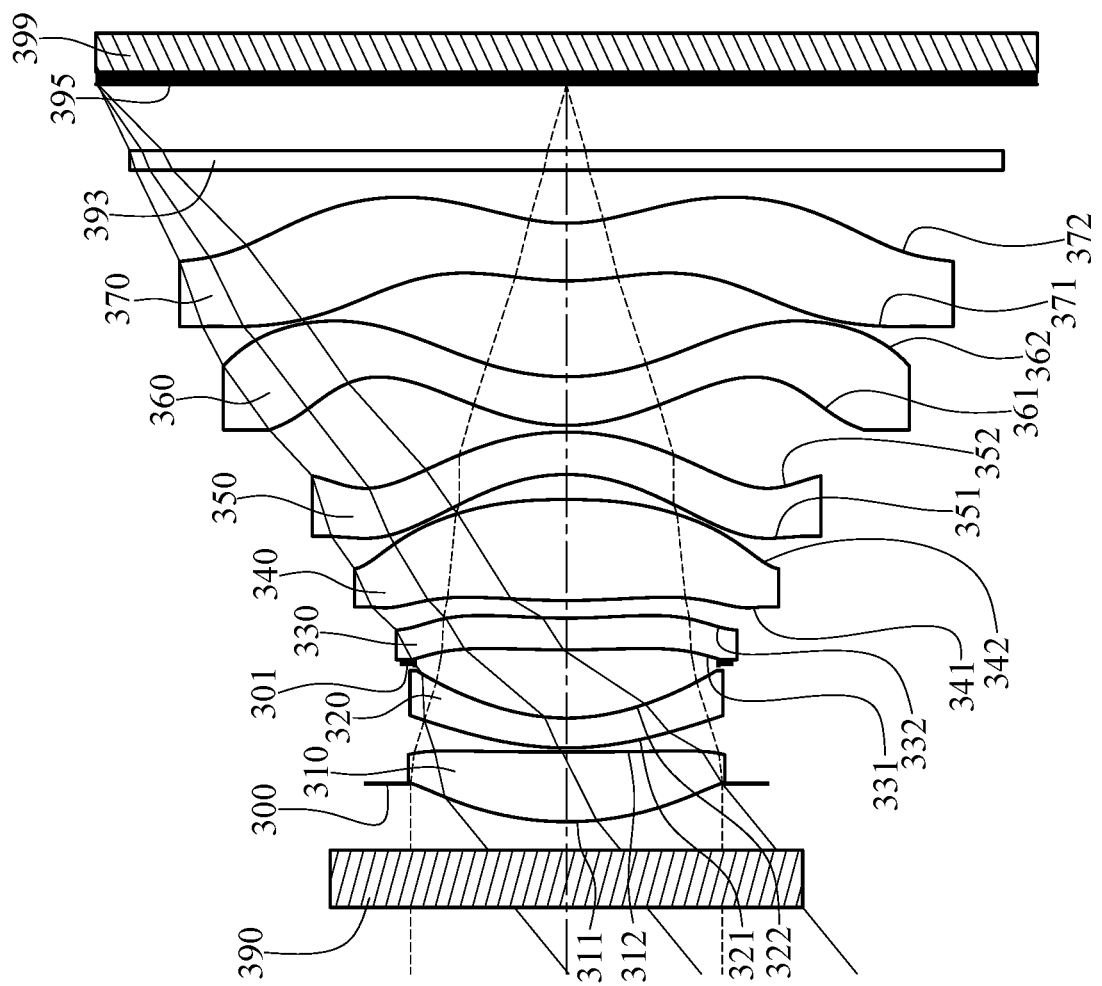
FIG. 8 is a schematic view of an image capturing unit in Mode 1 according to the 3rd embodiment of the present disclosure.
Figure 9:
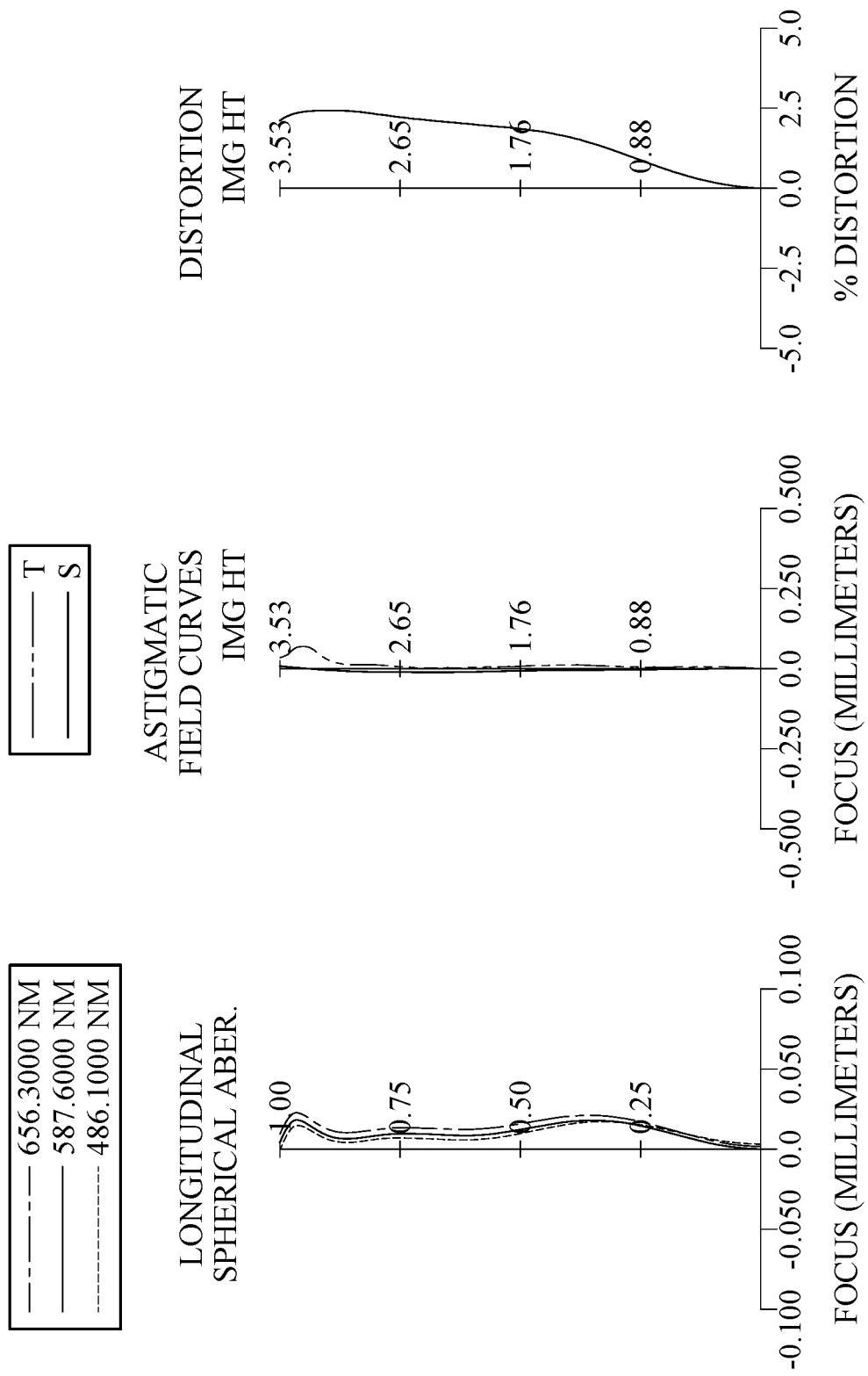
FIG. 9 shows spherical aberration curves, astigmatic field curves and a distortion curve of the image capturing unit in Mode 1 according to the 3rd embodiment.
Figure 10:
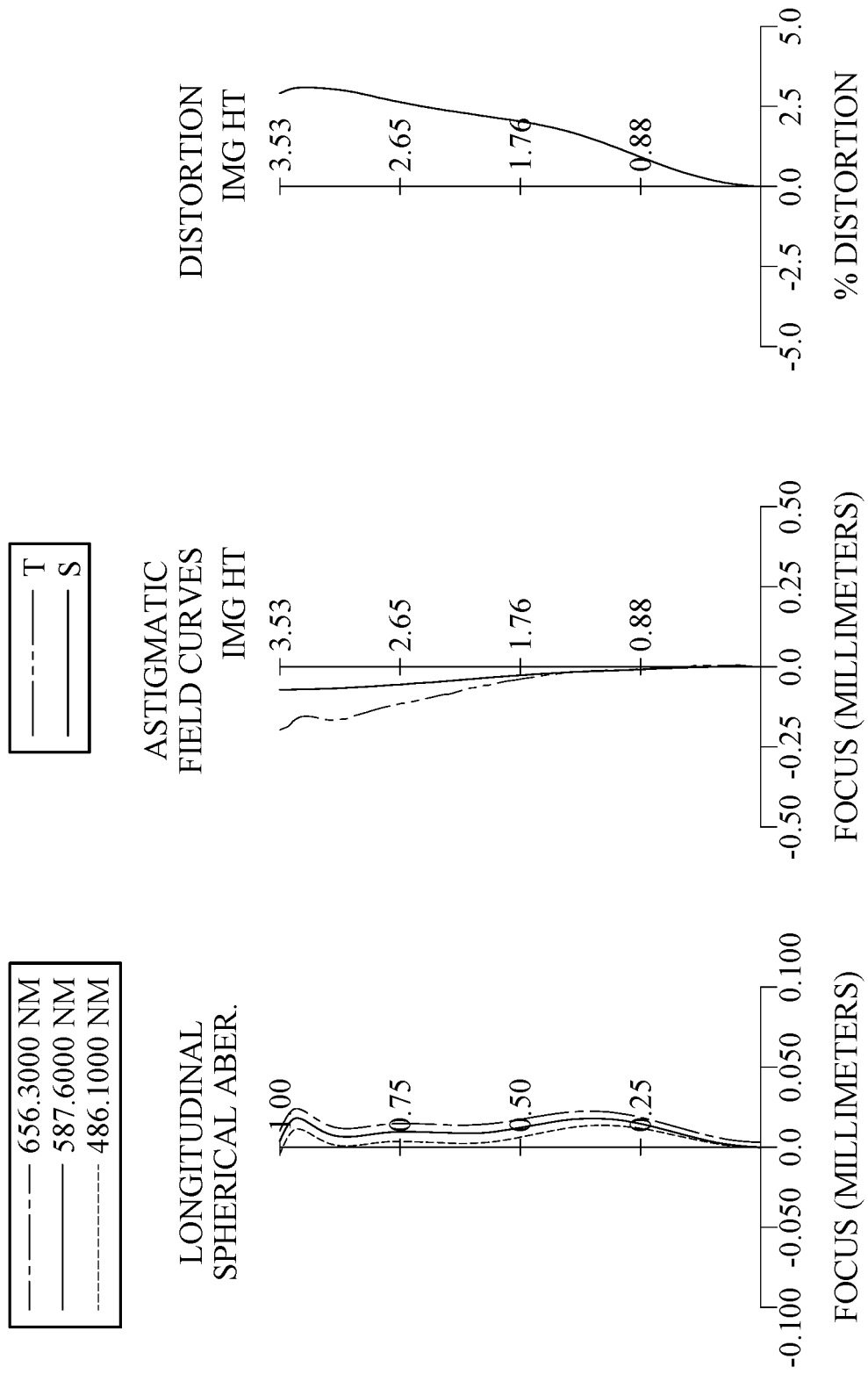
FIG. 10 shows spherical aberration curves, astigmatic field curves and a distortion curve of the image capturing unit in Mode 2 according to the 3rd embodiment.

FIG. 8 is a schematic view of an image capturing unit in Mode 1 according to the 3rd embodiment of the present disclosure. FIG. 9 shows spherical aberration curves, astigmatic field curves and a distortion curve of the image capturing unit in Mode 1 according to the 3rd embodiment. FIG. 10 shows spherical aberration curves, astigmatic field curves and a distortion curve of the image capturing unit in Mode 2 according to the 3rd embodiment. In FIG. 8, the image capturing unit includes the optical imaging lens assembly (its reference numeral is omitted) of the present disclosure and an image sensor 399. The optical imaging lens assembly includes a focus tunable component 390, an aperture stop 300, an imaging lens system (its reference numeral is omitted), a stop 301, a filter 393 and an image surface 395. The imaging lens system includes a first lens element 310, a second lens element 320, a third lens element 330, a fourth lens element 340, a fifth lens element 350, a sixth lens element 360 and a seventh lens element 370. Further, the aforementioned components of the optical imaging lens assembly are arranged in order from an object side to an image side as follows: the focus tunable component 390, the aperture stop 300, the first lens element 310, the second lens element 320, the stop 301, the third lens element 330, the fourth lens element 340, the fifth lens element 350, the sixth lens element 360, the seventh lens element 370, the filter 393 and the image surface 395. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 310) and an object-side second lens element (the second lens element 320), and the second lens group includes, in order from the image side to the object side, an image-side first lens element (the seventh lens element 370) and an image-side second lens element (the sixth lens element 360). The imaging lens system includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one inflection point. The image-side surface 312 of the first lens element 310 has at least one inflection point. The image-side surface 312 of the first lens element 310 has at least one critical point in an off-axis region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point. The image-side surface 332 of the third lens element 330 has at least one inflection point. The object-side surface 331 of the third lens element 330 has at least one critical point in an off-axis region thereof. The image-side surface 332 of the third lens element 330 has at least one critical point in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one inflection point. The object-side surface 341 of the fourth lens element 340 has at least one critical point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point. The object-side surface 351 of the fifth lens element 350 has at least one critical point in an off-axis region thereof. The image-side surface 352 of the fifth lens element 350 has at least one critical point in an off-axis region thereof.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point. The object-side surface 361 of the sixth lens element 360 has at least one critical point in an off-axis region thereof. The image-side surface 362 of the sixth lens element 360 has at least one critical point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has at least one inflection point. The image-side surface 372 of the seventh lens element 370 has at least one inflection point. The object-side surface 371 of the seventh lens element 370 has at least one critical point in an off-axis region thereof. The image-side surface 372 of the seventh lens element 370 has at least one critical point in an off-axis region thereof.

The filter 393 is made of glass material and located between the seventh lens element 370 and the image surface 395, and will not affect the focal length of the optical imaging lens assembly. The image sensor 399 is disposed on or near the image surface 395 of the optical imaging lens assembly.

The focus tunable component 390 is disposed on the object side of the imaging lens system, and the focus tunable component 390 is configured for tuning its focal length in accordance with object distances or ambient temperatures of various conditions so as to adjust the focal length of the optical imaging lens assembly. In this embodiment, the focus tunable component 390 can be a liquid lens set, a liquid crystal lens set, a positive lens element, a negative lens element or other optical components featuring focus tuning function.

In this embodiment, two of various modes of the optical imaging lens assembly are provided according to different focusing conditions. The detailed optical data of the 3rd embodiment are shown in Table 7 and the aspheric surface data are shown in Table 8 below.

TABLE 7

3rd Embodiment

| Surface # | | Curvature Radius | | Thickness | Material | Index | Abbe # | Focal Length |
|---|---|---|---|---|---|---|---|---|
| 0 | Object | Plano | | TOB | | | | |
| 1 | Focus Tunable Component | | | CTt | | | | ft |
| 2 | | | | 0.500 | | | | |
| 3 | Ape. Stop | Plano | | −0.286 | | | | |
| 4 | Lens 1 | 2.304 | (ASP) | 0.525 | Plastic | 1.545 | 56.1 | 4.18 |
| 5 | | −192.308 | (ASP) | 0.030 | | | | |
| 6 | Lens 2 | 2.351 | (ASP) | 0.224 | Plastic | 1.669 | 19.5 | −8.01 |
| 7 | | 1.572 | (ASP) | 0.410 | | | | |
| 8 | Stop | Plano | | 0.103 | | | | |
| 9 | Lens 3 | 8.547 | (ASP) | 0.238 | Plastic | 1.544 | 56.0 | −20.84 |
| 10 | | 4.826 | (ASP) | 0.133 | | | | |
| 11 | Lens 4 | 5.751 | (ASP) | 0.759 | Plastic | 1.544 | 56.0 | 5.13 |
| 12 | | −5.178 | (ASP) | 0.188 | | | | |
| 13 | Lens 5 | −1.355 | (ASP) | 0.319 | Plastic | 1.639 | 23.2 | −9.05 |
| 14 | | −1.933 | (ASP) | 0.050 | | | | |
| 15 | Lens 6 | 1.377 | (ASP) | 0.366 | Plastic | 1.544 | 56.0 | 7.64 |
| 16 | | 1.866 | (ASP) | 0.720 | | | | |
| 17 | Lens 7 | 2.088 | (ASP) | 0.433 | Plastic | 1.534 | 55.9 | −8.10 |
| 18 | | 1.306 | (ASP) | 0.400 | | | | |
| 19 | Filter | Plano | | 0.145 | Glass | 1.517 | 64.2 | — |
| 20 | | Plano | | 0.499 | | | | |
| 21 | Image | Plano | | — | | | | |

Note:
Reference wavelength is 587.6 nm (d-line).
An effective radius of the stop 301 (Surface 8) is 1.140 mm.

TABLE 8

Aspheric Coefficients

| Surface # | 4 | 5 | 6 | 7 | 9 |
|---|---|---|---|---|---|
| k = | 3.1908E−01 | −9.0000E+01 | −1.1998E+01 | −2.9482E+00 | 2.8387E+01 |
| A4 = | −4.8792E−03 | 7.2662E−02 | 9.5108E−02 | −5.2054E−03 | −1.0076E−01 |
| A6 = | 5.9224E−03 | −1.5276E−01 | −1.4985E−01 | 4.0392E−02 | 5.8063E−02 |
| A8 = | −1.6688E−02 | 1.9310E−01 | 1.6425E−01 | −4.8644E−02 | −1.1975E−01 |
| A10 = | 6.8263E−03 | −1.6852E−01 | −1.2573E−01 | 3.4295E−02 | 9.9659E−02 |
| A12 = | 3.8123E−04 | 7.9198E−02 | 5.8172E−02 | −9.6745E−03 | −4.4440E−02 |
| A14 = | −2.2679E−03 | −1.6334E−02 | −1.1820E−02 | 3.9251E−04 | 1.1300E−02 |

TABLE 8-continued

| Surface # | 10 | 11 | 12 | 13 | 14 |
|---|---|---|---|---|---|
| k = | −8.9805E+01 | −6.4931E+00 | 6.9336E−02 | −2.4542E+00 | −6.5154E−01 |
| A4 = | −6.4902E−02 | −9.6830E−02 | −1.7232E−01 | −1.0382E−01 | −6.0950E−02 |
| A6 = | −1.4596E−02 | 9.1190E−02 | 1.7674E−01 | 1.8573E−01 | 1.3444E−01 |
| A8 = | −1.5853E−02 | −1.2289E−01 | −1.0549E−01 | −1.4126E−01 | −1.1036E−01 |
| A10 = | −2.8305E−02 | 5.6436E−02 | 2.8260E−02 | 6.4773E−02 | 5.5553E−02 |
| A12 = | 4.8580E−02 | −1.6883E−03 | −3.3398E−03 | −1.4575E−02 | −1.4118E−02 |
| A14 = | −1.3650E−02 | −2.2568E−03 | 3.6027E−04 | 9.9099E−04 | 1.5829E−03 |
| A16 = | — | — | — | 5.9883E−05 | −5.3739E−05 |

| Surface # | 15 | 16 | 17 | 18 |
|---|---|---|---|---|
| k = | −4.6134E+00 | −6.0681E−01 | −1.2708E+01 | −5.4497E+00 |
| A4 = | 5.4163E−02 | 8.6177E−03 | −1.7101E−01 | −1.1717E−01 |
| A6 = | −7.6218E−02 | −6.1526E−02 | 5.4881E−02 | 4.8138E−02 |
| A8 = | 3.9457E−02 | 2.6701E−02 | −1.1231E−02 | −1.7034E−02 |
| A10 = | −2.0820E−02 | −6.6904E−03 | 3.6576E−03 | 4.9088E−03 |
| A12 = | 9.1513E−03 | 1.0018E−03 | −1.1631E−03 | −1.0792E−03 |
| A14 = | −2.8566E−03 | −5.9740E−05 | 2.2019E−04 | 1.6643E−04 |
| A16 = | 5.7088E−04 | −6.5034E−06 | −2.3220E−05 | −1.6244E−05 |
| A18 = | −6.3037E−05 | 1.3248E−06 | 1.2778E−06 | 8.8395E−07 |
| A20 = | 2.8659E−06 | −6.4444E−08 | −2.8722E−08 | −2.0335E−08 |

In the 3rd embodiment, the equation of the aspheric surface profiles of the aforementioned lens elements is the same as the equation of the 1st embodiment. Also, the rest optical data of the optical imaging lens assembly are disclosed in Table 9 below. Moreover, the definitions of these parameters shown in Table 9 are the same as those stated in the 1st embodiment with corresponding values for the 3rd embodiment, so an explanation in this regard will not be provided again.

TABLE 9

3rd Embodiment

| | Mode 1 | Mode 2 | | |
|---|---|---|---|---|
| f [mm] | 4.21 | 4.05 | fi [mm] | 4.21 |
| Fno | 1.80 | 1.80 | Nimax | 1.669 |
| HFOV [deg.] | 39.3 | 38.9 | Vimin | 19.5 |
| TOB [mm] | ∞ | 120.000 | ΣATi/ΣCTi | 0.57 |
| CTt [mm] | 0.430 | 0.430 | DLr1Lr2/CTLr1 | 1.66 |
| ft [mm] | ∞ | 120.68 | SDi/TDi | 0.94 |
| TDi/CTt | 10.46 | 10.46 | TLi/EPDi | 2.37 |
| TL [mm] | 6.19 | 6.19 | TLi/fi | 1.32 |
| TL/ImgH | 1.75 | 1.75 | |RLr2f/RLr2r| | 0.74 |
| RLr1r/ImgH | 0.37 | 0.37 | |fi/fLf7| | 0.52 |
| |f/ft| | 0.00E+00 | 3.36E−02 | LNi | 7 |
| |f/TOB-f/ft| | 0.00E+00 | 1.92E−04 | YCLr1r/TDi | 0.27 |
| |fi/ft| | 0.00E+00 | 3.49E−02 | — | — |
| |ft| [mm] | ∞ | 120.68 | — | — |
| CRA [deg.] | 34.4 | 34.4 | — | — |
| YLf7r/DLf1fLf7r | 0.65 | 0.64 | — | — |
| YLr1r/YLf1f | 2.48 | 2.45 | — | — |

4th Embodiment

Figure 11:
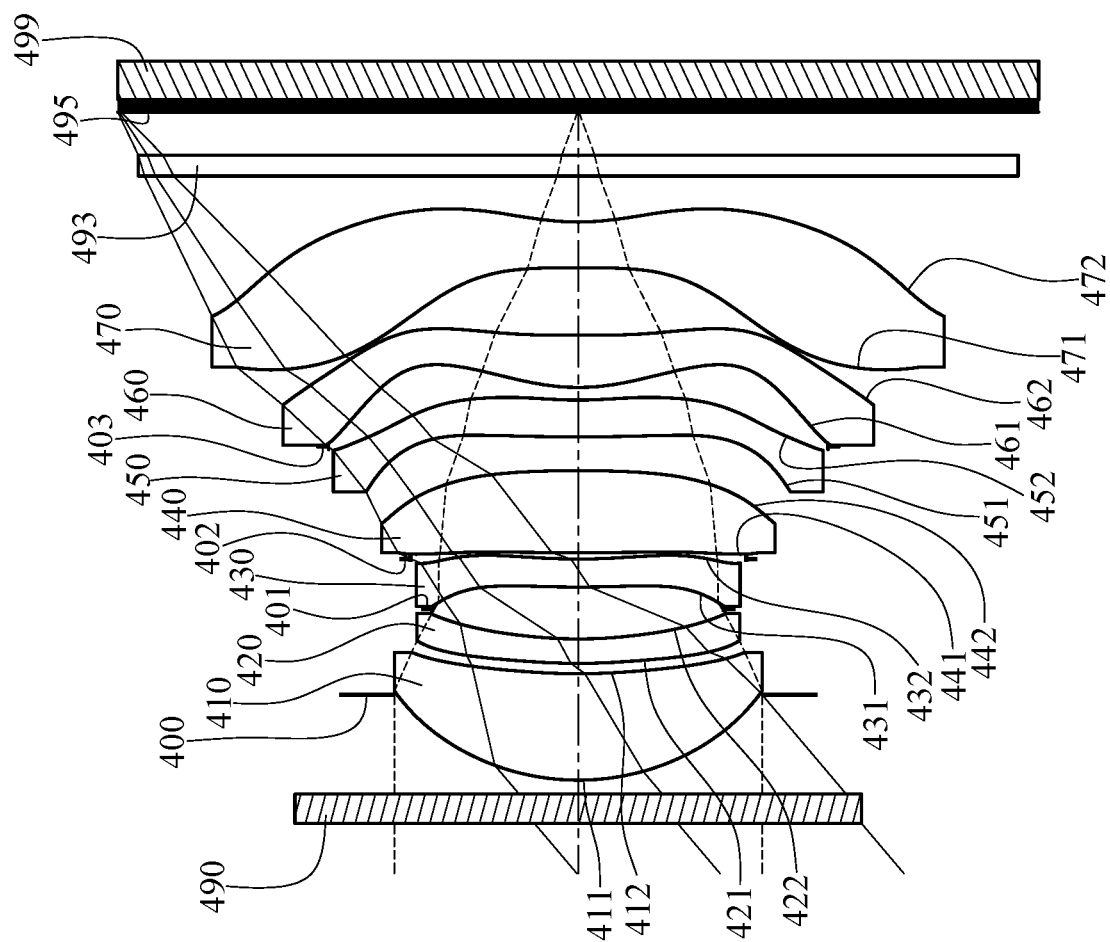
FIG. 11 is a schematic view of an image capturing unit in Mode 1 according to the 4th embodiment of the present disclosure.
Figure 12:
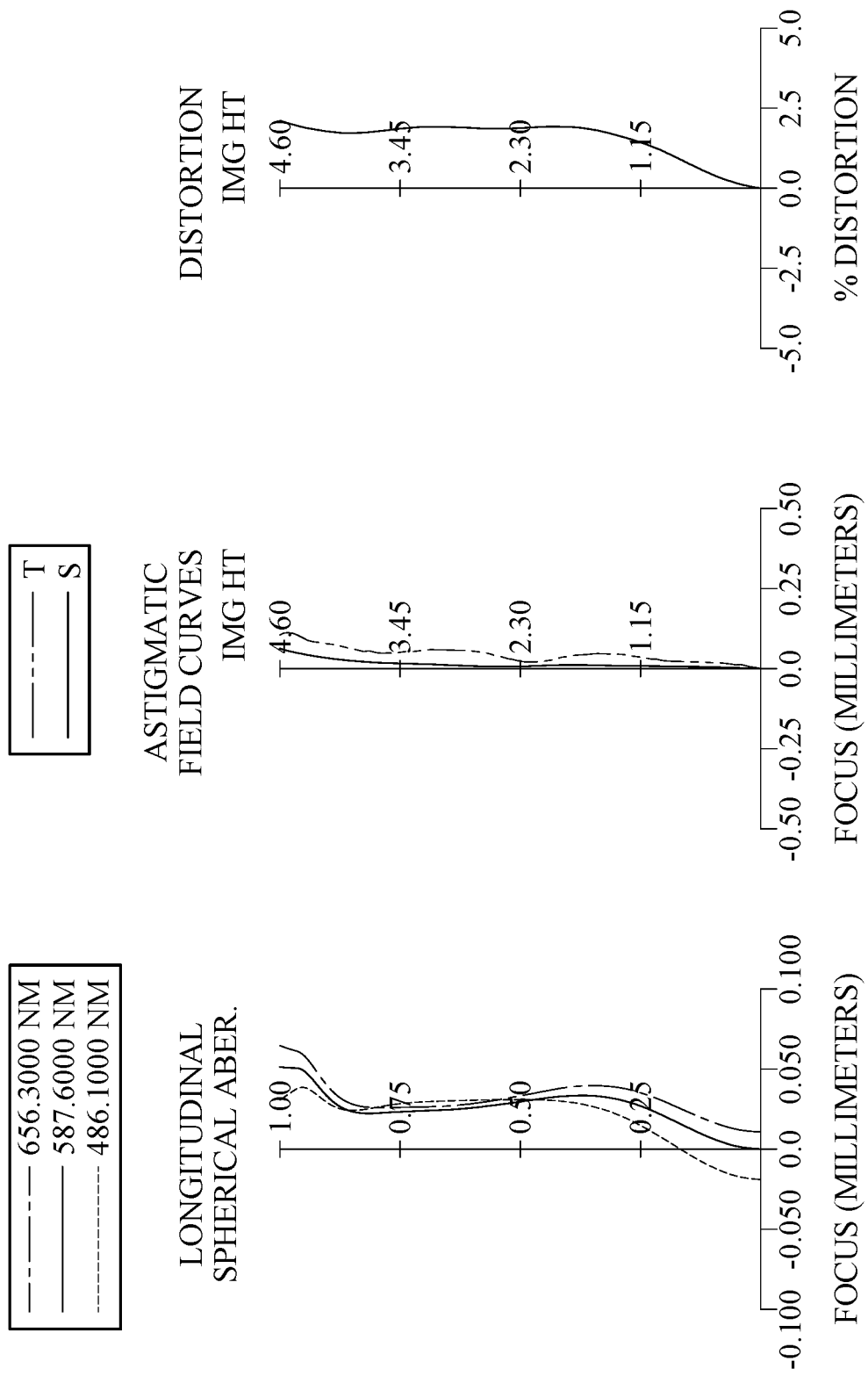
FIG. 12 shows spherical aberration curves, astigmatic field curves and a distortion curve of the image capturing unit in Mode 1 according to the 4th embodiment.
Figure 13:
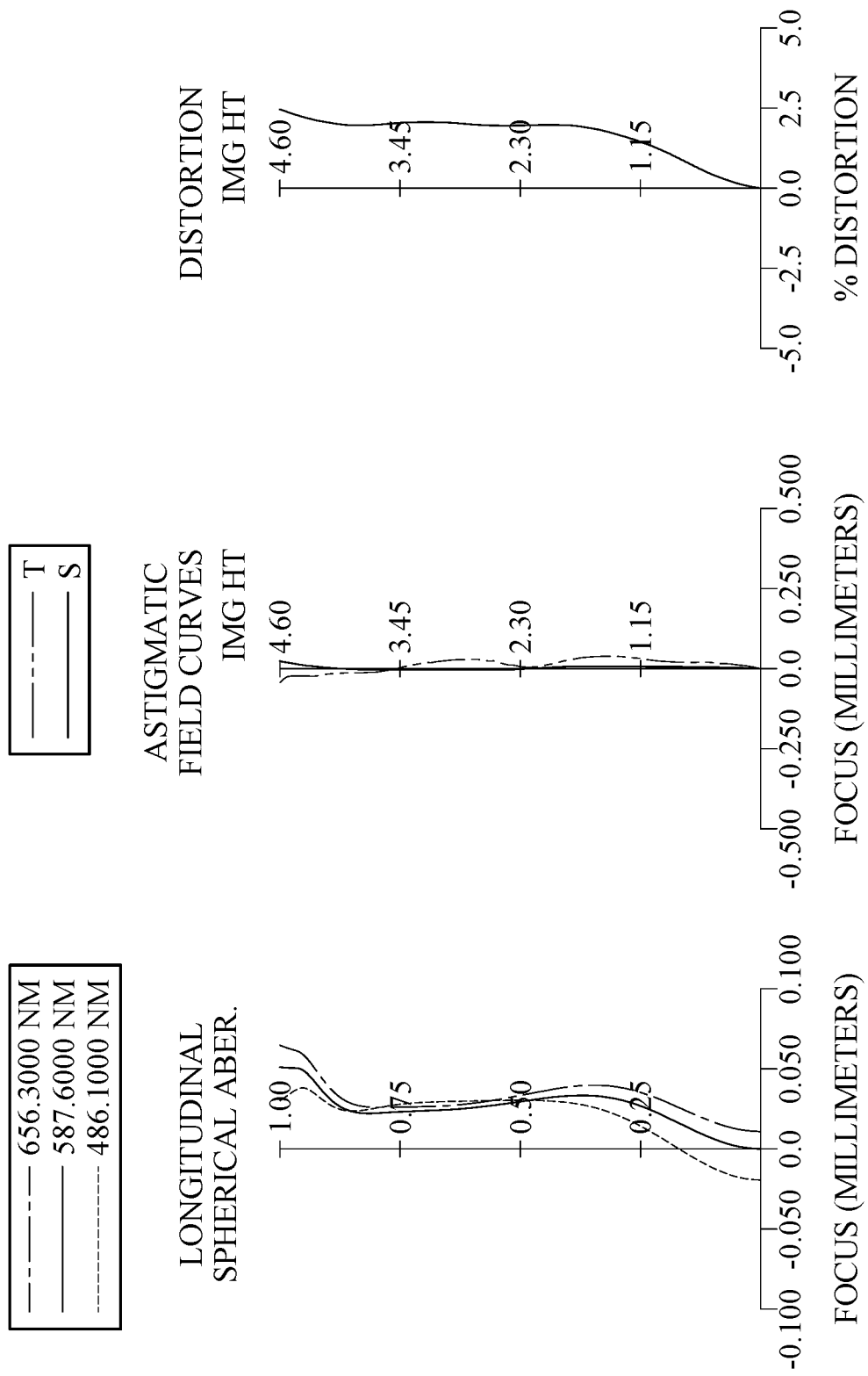
FIG. 13 shows spherical aberration curves, astigmatic field curves and a distortion curve of the image capturing unit in Mode 2 according to the 4th embodiment.
Figure 14:
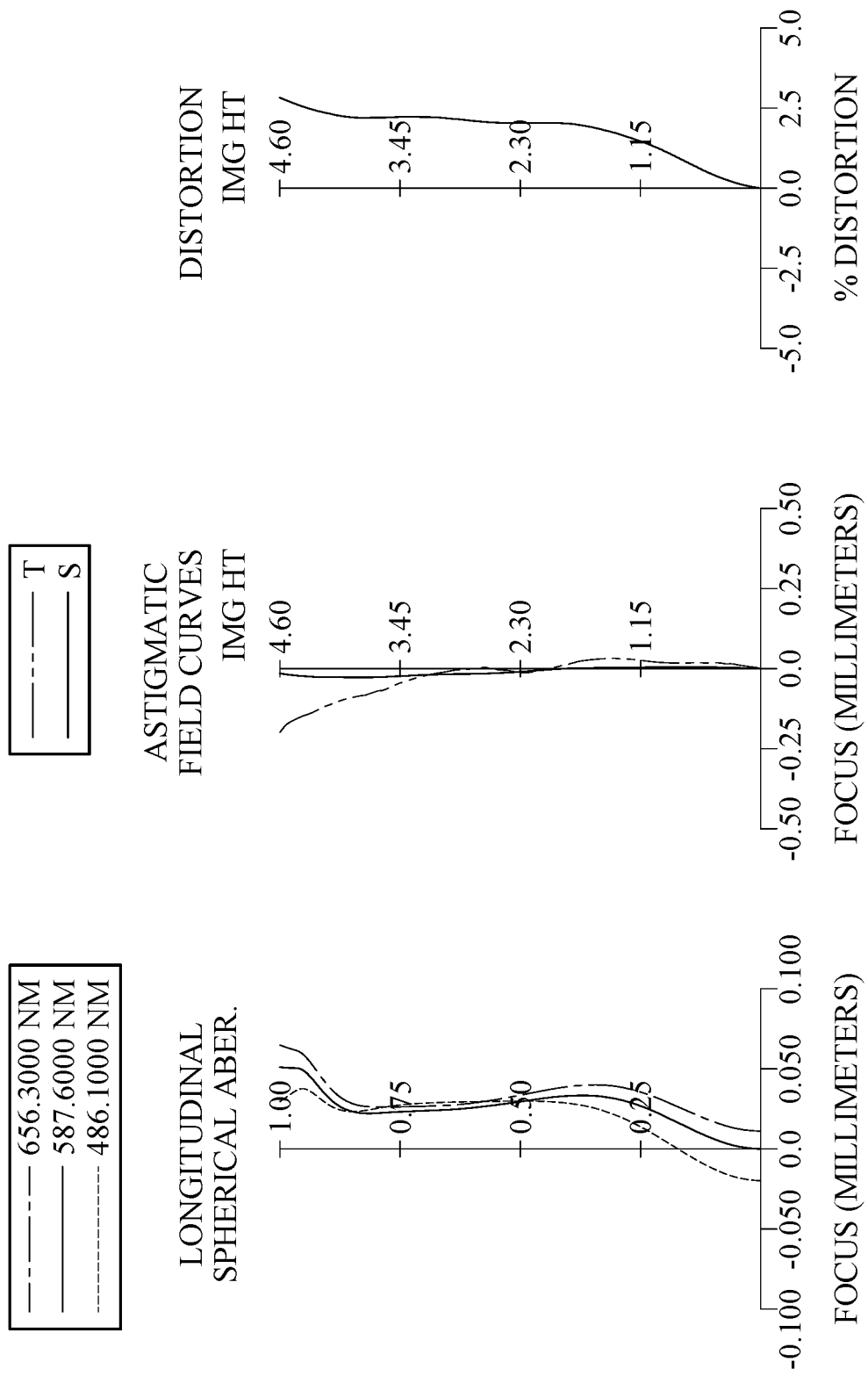
FIG. 14 shows spherical aberration curves, astigmatic field curves and a distortion curve of the image capturing unit in Mode 3 according to the 4th embodiment.

FIG. 11 is a schematic view of an image capturing unit in Mode 1 according to the 4th embodiment of the present disclosure. FIG. 12 shows spherical aberration curves, astigmatic field curves and a distortion curve of the image capturing unit in Mode 1 according to the 4th embodiment. FIG. 13 shows spherical aberration curves, astigmatic field curves and a distortion curve of the image capturing unit in Mode 2 according to the 4th embodiment. FIG. 14 shows spherical aberration curves, astigmatic field curves and a distortion curve of the image capturing unit in Mode 3 according to the 4th embodiment. In FIG. 11, the image capturing unit includes the optical imaging lens assembly (its reference numeral is omitted) of the present disclosure and an image sensor 499. The optical imaging lens assembly includes a focus tunable component 490, an aperture stop 400, an imaging lens system (its reference numeral is omitted), a stop 401, a stop 402, a stop 403, a filter 493 and an image surface 495. The imaging lens system includes a first lens element 410, a second lens element 420, a third lens element 430, a fourth lens element 440, a fifth lens element 450, a sixth lens element 460 and a seventh lens element 470. Further, the aforementioned components of the optical imaging lens assembly are arranged in order from an object side to an image side as follows: the focus tunable component 490, the aperture stop 400, the first lens element 410, the second lens element 420, the stop 401, the third lens element 430, the stop 402, the fourth lens element 440, the fifth lens element 450, the stop 403, the sixth lens element 460, the seventh lens element 470, the filter 493 and the image surface 495. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 410) and an object-side second lens element (the second lens element 420), and the second lens group includes, in order from the image side to the object side, an image-side first lens element (the seventh lens element 470) and an image-side second lens element (the sixth lens element 460). The optical imaging lens assembly includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being concave in a paraxial region thereof. The first lens element 410 is made of glass material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point. The image-side surface 432 of the third lens element 430 has at least one inflection point. The object-side surface 431 of the third lens element 430 has at least one critical point in an off-axis region thereof. The image-side surface 432 of the third lens element 430 has at least one critical point in an off-axis region thereof.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one inflection point. The image-side surface 442 of the fourth lens element 440 has at least one inflection point. The object-side surface 441 of the fourth lens element 440 has at least one critical point in an off-axis region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point. The object-side surface 451 of the fifth lens element 450 has at least one critical point in an off-axis region thereof. The image-side surface 452 of the fifth lens element 450 has at least one critical point in an off-axis region thereof.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point. The object-side surface 461 of the sixth lens element 460 has at least one critical point in an off-axis region thereof. The image-side surface 462 of the sixth lens element 460 has at least one critical point in an off-axis region thereof.

The seventh lens element 470 with negative refractive power has an object-side surface 471 being concave in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has at least one inflection point. The image-side surface 472 of the seventh lens element 470 has at least one inflection point. The object-side surface 471 of the seventh lens element 470 has at least one critical point in an off-axis region thereof. The image-side surface 472 of the seventh lens element 470 has at least one critical point in an off-axis region thereof.

The filter 493 is made of glass material and located between the seventh lens element 470 and the image surface 495, and will not affect the focal length of the optical imaging lens assembly. The image sensor 499 is disposed on or near the image surface 495 of the optical imaging lens assembly.

The focus tunable component 490 is disposed on the object side of the imaging lens system, and the focus tunable component 490 is configured for tuning its focal length in accordance with object distances or ambient temperatures of various conditions so as to adjust the focal length of the optical imaging lens assembly. In this embodiment, the focus tunable component 490 can be a liquid lens set, a liquid crystal lens set, a positive lens element, a negative lens element or other optical components featuring focus tuning function.

In this embodiment, three of various modes of the optical imaging lens assembly are provided according to different focusing conditions. The detailed optical data of the 4th embodiment are shown in Table 10 and the aspheric surface data are shown in Table 11 below.

TABLE 10

| 4th Embodiment | | | | | | | |
|---|---|---|---|---|---|---|---|
| Surface # | | Curvature Radius | Thickness | Material | Index | Abbe # | Focal Length |
| 0 | Object | Plano | TOB | | | | |
| 1 | Focus Tunable Component | | CTt | | | | ft |
| 2 | | | 0.996 | | | | |
| 3 | Ape. Stop | Plano | −0.856 | | | | |
| 4 | Lens 1 | 2.434 (ASP) | 1.066 | Glass | 1.593 | 67.0 | 6.23 |
| 5 | | 5.960 (ASP) | 0.104 | | | | |
| 6 | Lens 2 | 5.517 (ASP) | 0.245 | Plastic | 1.669 | 19.5 | −35.94 |
| 7 | | 4.408 (ASP) | 0.301 | | | | |
| 8 | Stop | Plano | 0.219 | | | | |
| 9 | Lens 3 | 9.427 (ASP) | 0.281 | Plastic | 1.679 | 18.4 | −26.88 |
| 10 | | 6.142 (ASP) | 0.002 | | | | |
| 11 | Stop | Plano | 0.062 | | | | |
| 12 | Lens 4 | 44.640 (ASP) | 0.822 | Plastic | 1.544 | 56.0 | 18.14 |
| 13 | | −12.589 (ASP) | 0.337 | | | | |
| 14 | Lens 5 | 13.009 (ASP) | 0.370 | Plastic | 1.566 | 37.4 | −10.07 |
| 15 | | 3.922 (ASP) | −0.471 | | | | |
| 16 | Stop | Plano | 0.597 | | | | |

TABLE 10-continued

4th Embodiment

| Surface # | | Curvature Radius | | Thickness | Material | Index | Abbe # | Focal Length |
|---|---|---|---|---|---|---|---|---|
| 17 | Lens 6 | 2.043 | (ASP) | 0.524 | Plastic | 1.544 | 56.0 | 3.72 |
| 18 | | −174.520 | (ASP) | 0.677 | | | | |
| 19 | Lens 7 | −23.337 | (ASP) | 0.457 | Plastic | 1.534 | 55.9 | −4.13 |
| 20 | | 2.451 | (ASP) | 0.462 | | | | |
| 21 | Filter | Plano | | 0.210 | Glass | 1.517 | 64.2 | — |
| 22 | | Plano | | 0.429 | | | | |
| 23 | Image | Plano | | — | | | | |

Note:
Reference wavelength is 587.6 nm (d-line).
An effective radius of the stop 401 (Surface 8) is 1.460 mm.
An effective radius of the stop 402 (Surface 11) is 1.680 mm.
An effective radius of the stop 403 (Surface 16) is 2.500 mm.

TABLE 11

Aspheric Coefficients

| Surface # | 4 | 5 | 6 | 7 | 9 |
|---|---|---|---|---|---|
| k = | −6.5794E−02 | −2.3250E+01 | −7.3652E+00 | 2.9788E+00 | −1.7825E+01 |
| A4 = | 1.1257E−04 | −1.6503E−02 | −4.8397E−02 | −3.0806E−02 | −5.1206E−02 |
| A6 = | 2.0726E−03 | 1.0802E−02 | 2.6228E−02 | 5.6140E−03 | −1.3969E−02 |
| A8 = | −1.1101E−03 | 2.2293E−03 | 1.4089E−02 | 3.5846E−02 | 1.5265E−02 |
| A10 = | 5.0898E−04 | −3.9404E−03 | −2.3890E−02 | −4.7399E−02 | −1.3641E−02 |
| A12 = | −1.1068E−04 | 1.5125E−03 | 1.3384E−02 | 2.8756E−02 | 4.9573E−03 |
| A14 = | 1.3675E−05 | −1.8962E−04 | −3.5758E−03 | −8.8579E−03 | −5.4266E−04 |
| A16 = | — | — | 3.8994E−04 | 1.1143E−03 | — |

| Surface # | 10 | 12 | 13 | 14 | 15 |
|---|---|---|---|---|---|
| k = | −2.1237E+00 | 9.9000E+01 | 1.9948E+01 | −2.3862E+01 | −6.5835E+00 |
| A4 = | −3.3508E−02 | 2.1323E−03 | −1.2354E−02 | −4.6468E−02 | −1.9982E−01 |
| A6 = | −1.1442E−02 | 3.7725E−03 | −6.9669E−03 | 5.9620E−02 | 1.6007E−01 |
| A8 = | −5.6770E−03 | −3.3768E−02 | −1.8497E−03 | −4.6530E−03 | −8.4599E−02 |
| A10 = | 7.8580E−03 | 3.3588E−02 | 3.1166E−03 | 1.6839E−02 | 2.7680E−02 |
| A12 = | −2.6628E−03 | −1.4515E−02 | −8.8708E−04 | −3.1929E−03 | −6.3047E−03 |
| A14 = | 4.0770E−04 | 3.0128E−03 | 2.6911E−05 | 2.9070E−04 | 1.1452E−03 |
| A16 = | — | −2.4396E−04 | 1.1528E−05 | −9.1062E−06 | −1.5972E−04 |
| A18 = | — | — | — | — | 1.3765E−05 |
| A20 = | — | — | — | — | −5.1144E−07 |

| Surface # | 17 | 18 | 19 | 20 |
|---|---|---|---|---|
| k = | −8.0341E−01 | −9.9000E+01 | 2.1620E+01 | −1.0084E+00 |
| A4 = | −9.3245E−02 | 1.1981E−01 | −8.7538E−02 | −1.1583E−01 |
| A6 = | 2.4841E−02 | −1.1983E−01 | 9.3797E−04 | 3.5465E−02 |
| A8 = | −1.1225E−02 | 6.3856E−02 | 8.7761E−03 | −8.5509E−03 |
| A10 = | 6.0059E−03 | −2.2411E−02 | −2.5274E−03 | 1.5533E−03 |
| A12 = | −3.0695E−03 | 5.0317E−03 | 3.5411E−04 | −2.0024E−04 |
| A14 = | 9.2448E−04 | −7.0489E−04 | −2.8747E−05 | 1.7305E−05 |
| A16 = | −1.4947E−04 | 5.9427E−05 | 1.3659E−06 | −9.5046E−07 |
| A18 = | 1.2250E−05 | −2.7542E−06 | −3.4748E−08 | 3.0185E−08 |
| A20 = | −4.0122E−07 | 5.3797E−08 | 3.5340E−10 | −4.2455E−10 |

In the 4th embodiment, the equation of the aspheric surface profiles of the aforementioned lens elements is the same as the equation of the 1st embodiment. Also, the rest optical data of the optical imaging lens assembly are disclosed in Table 12 below. Moreover, the definitions of these parameters shown in Table 12 are the same as those stated in the 1st embodiment with corresponding values for the 4th embodiment, so an explanation in this regard will not be provided again.

TABLE 12

4th Embodiment

| | Mode 1 | Mode 2 | Mode 3 | | |
|---|---|---|---|---|---|
| f [mm] | 5.30 | 5.22 | 5.15 | fi [mm] | 5.30 |
| Fno | 1.44 | 1.44 | 1.44 | Nimax | 1.679 |
| HFOV [deg.] | 40.2 | 40.1 | 39.9 | Vimin | 18.4 |

TABLE 12-continued

4th Embodiment

| | Mode 1 | Mode 2 | Mode 3 | | |
|---|---|---|---|---|---|
| TOB [mm] | ∞ | 500.000 | 250.000 | ΣATi/ΣCTi | 0.49 |
| CTt [mm] | 0.295 | 0.295 | 0.295 | DLr1Lr2/CTLr1 | 1.48 |
| ft [mm] | ∞ | 500.00 | 250.00 | SDi/TDi | 0.85 |
| TDi/CTt | 18.96 | 18.96 | 18.96 | TLi/EPDi | 1.82 |
| TL [mm] | 7.13 | 7.13 | 7.13 | TLi/fi | 1.26 |
| TL/ImgH | 1.55 | 1.55 | 1.55 | |RLr2f/RLr2r| | 0.01 |
| RLr1r/ImgH | 0.53 | 0.53 | 0.53 | |fi/fLf7| | 1.28 |
| |f/ft| | 0.00E+00 | 1.04E−02 | 2.06E−02 | LNi | 7 |
| |f/TOB-f/ft| | 0.00E+00 | 2.25E−08 | 4.43E−08 | YCLr1r/TDi | 0.23 |
| |fi/ft| | 0.00E+00 | 1.06E−02 | 2.12E−02 | — | — |
| |ft| [mm] | ∞ | 500.00 | 250.00 | — | — |
| CRA [deg.] | 33.2 | 33.2 | 33.2 | — | — |
| YLf7r/ DLf1fLf7r | 0.66 | 0.65 | 0.65 | — | — |
| YLr1r/YLf1f | 1.99 | 1.99 | 1.98 | — | — |

5th Embodiment

Figure 15:
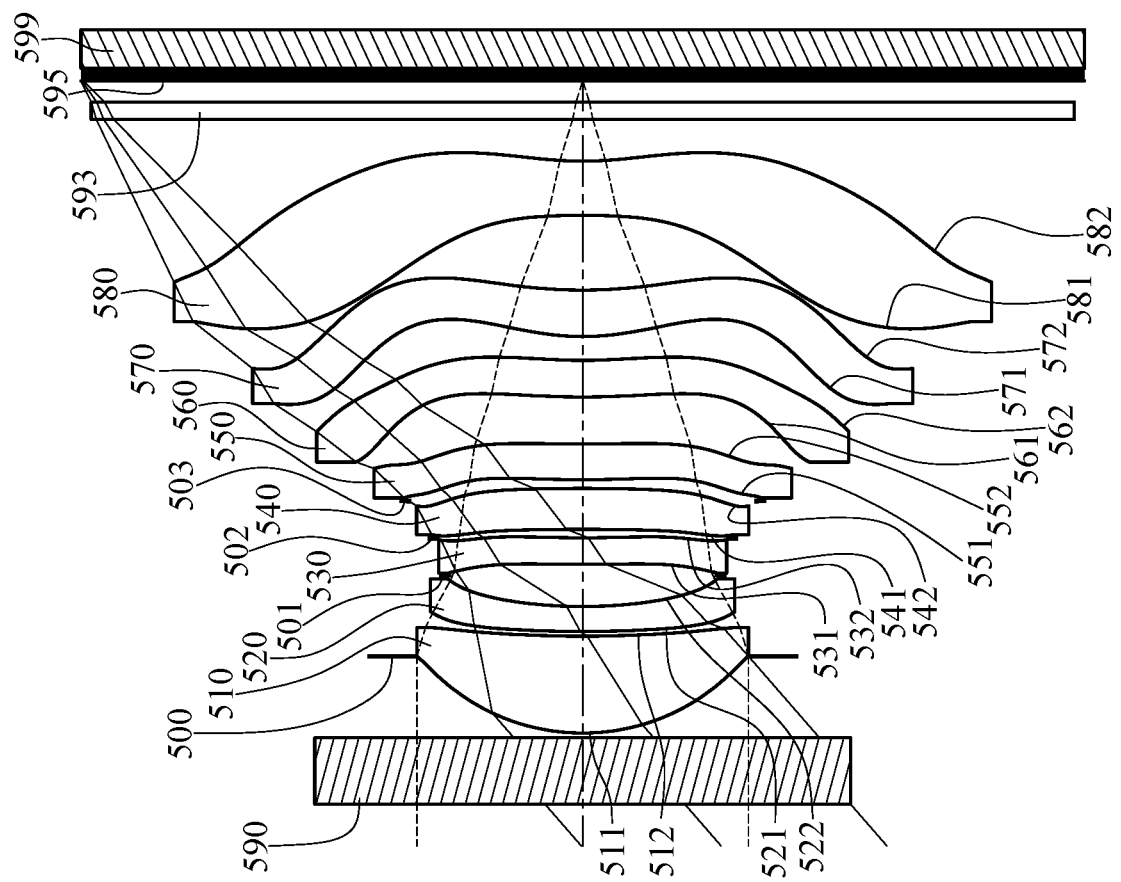
FIG. 15 is a schematic view of an image capturing unit in Mode 1 according to the 5th embodiment of the present disclosure.
Figure 16:
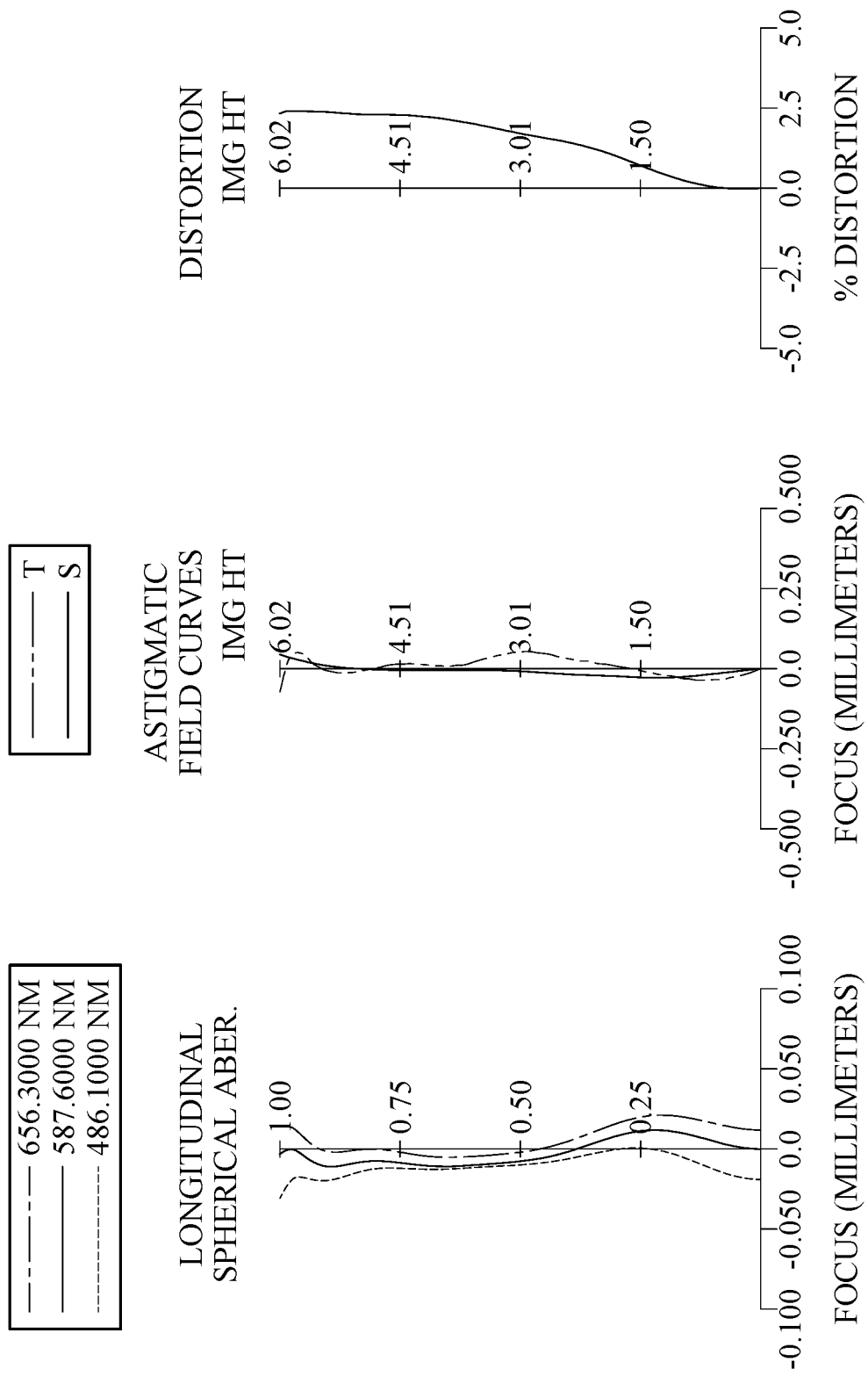
FIG. 16 shows spherical aberration curves, astigmatic field curves and a distortion curve of the image capturing unit in Mode 1 according to the 5th embodiment.
Figure 17:
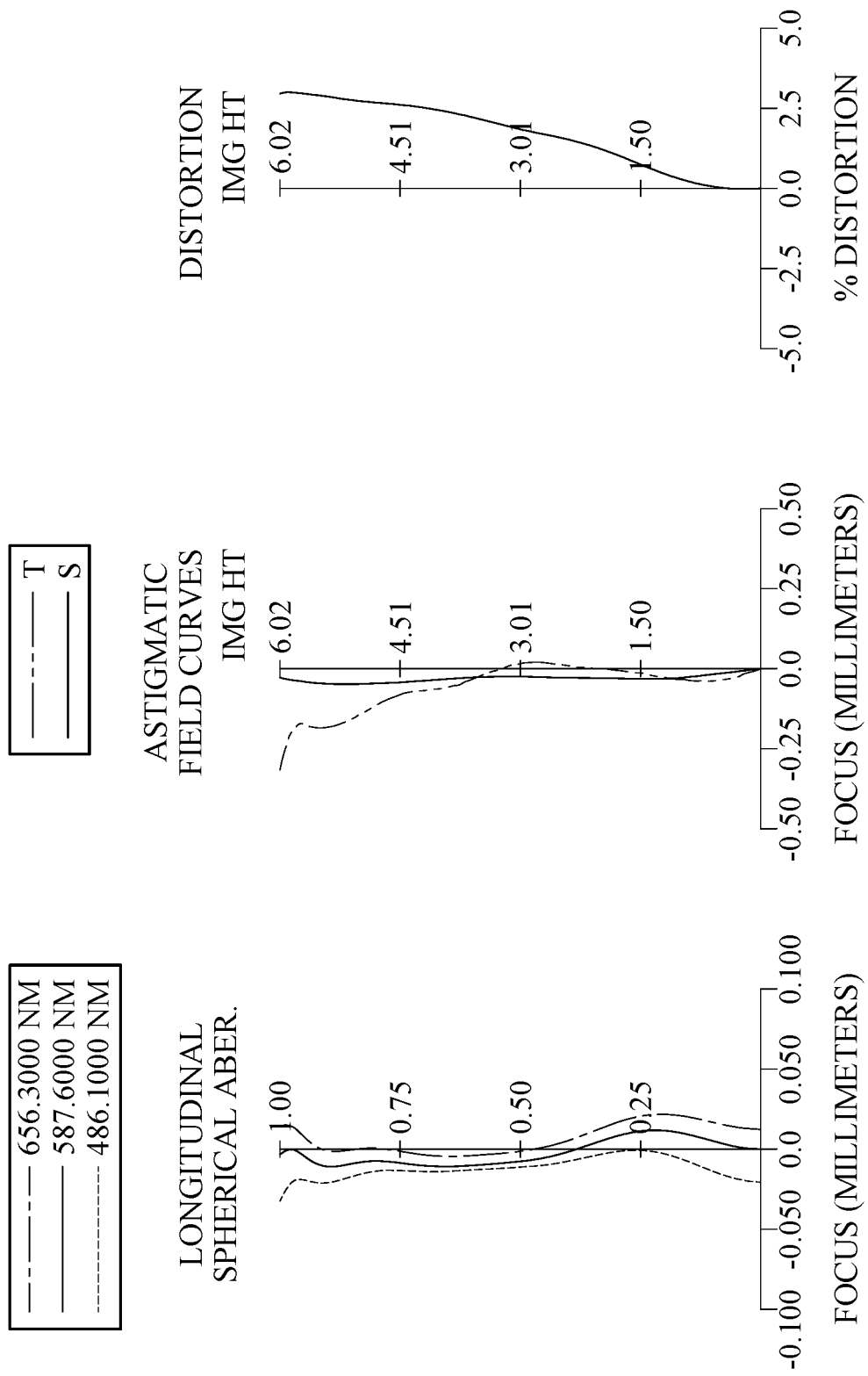
FIG. 17 shows spherical aberration curves, astigmatic field curves and a distortion curve of the image capturing unit in Mode 2 according to the 5th embodiment.
Figure 18:
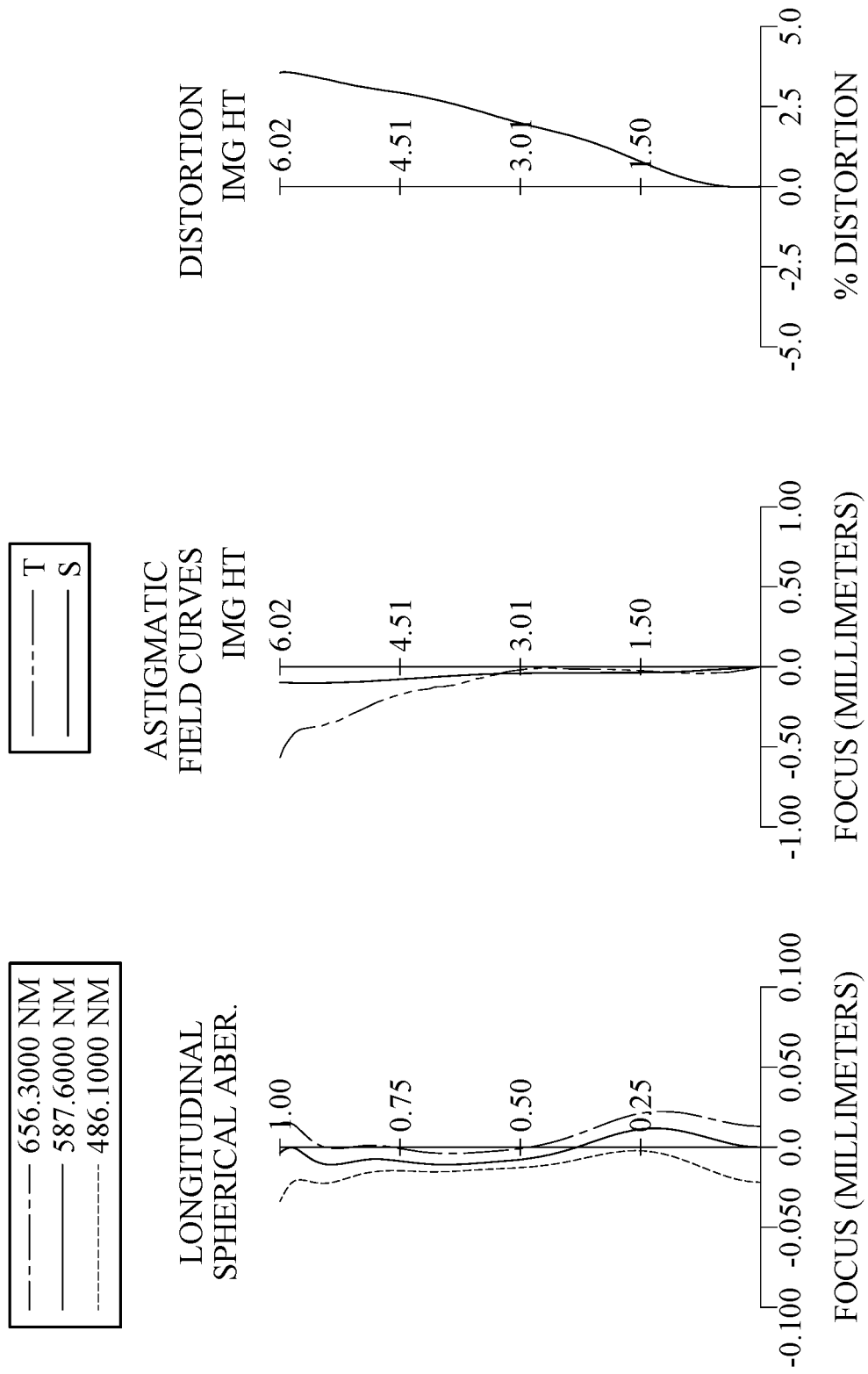
FIG. 18 shows spherical aberration curves, astigmatic field curves and a distortion curve of the image capturing unit in Mode 3 according to the 5th embodiment.

FIG. 15 is a schematic view of an image capturing unit in Mode 1 according to the 5th embodiment of the present disclosure. FIG. 16 shows spherical aberration curves, astigmatic field curves and a distortion curve of the image capturing unit in Mode 1 according to the 5th embodiment. FIG. 17 shows spherical aberration curves, astigmatic field curves and a distortion curve of the image capturing unit in Mode 2 according to the 5th embodiment. FIG. 18 shows spherical aberration curves, astigmatic field curves and a distortion curve of the image capturing unit in Mode 3 according to the 5th embodiment. In FIG. 15, the image capturing unit includes the optical imaging lens assembly (its reference numeral is omitted) of the present disclosure and an image sensor 599. The optical imaging lens assembly includes a focus tunable component 590, an aperture stop 500, an imaging lens system (its reference numeral is omitted), a stop 501, a stop 502, a stop 503, a filter 593 and an image surface 595. The imaging lens system includes a first lens element 510, a second lens element 520, a third lens element 530, a fourth lens element 540, a fifth lens element 550, a sixth lens element 560, a seventh lens element 570 and an eighth lens element 580. Further, the aforementioned components of the optical imaging lens assembly are arranged in order from an object side to an image side as follows: the focus tunable component 590, the aperture stop 500, the first lens element 510, the second lens element 520, the stop 501, the third lens element 530, the stop 502, the fourth lens element 540, the stop 503, the fifth lens element 550, the sixth lens element 560, the seventh lens element 570, the eighth lens element 580, the filter 593 and the image surface 595. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 510) and an object-side second lens element (the second lens element 520), and the second lens group includes, in order from the image side to the object side, an image-side first lens element (the eighth lens element 580) and an image-side second lens element (the seventh lens element 570). The optical imaging lens assembly includes eight lens elements (510, 520, 530, 540, 550, 560, 570 and 580) with no additional lens element disposed between each of the adjacent eight lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point. The image-side surface 512 of the first lens element 510 has at least one inflection point. The image-side surface 512 of the first lens element 510 has at least one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one inflection point. The image-side surface 532 of the third lens element 530 has at least one inflection point. The object-side surface 531 of the third lens element 530 has at least one critical point in an off-axis region thereof. The image-side surface 532 of the third lens element 530 has at least one critical point in an off-axis region thereof.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one inflection point. The object-side surface 541 of the fourth lens element 540 has at least one critical point in an off-axis region thereof. The image-side surface 542 of the fourth lens element 540 has at least one critical point in an off-axis region thereof.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point. The object-side surface 551 of the fifth lens element 550 has at least one critical point in an off-axis region thereof. The image-side surface 552 of the fifth lens element 550 has at least one critical point in an off-axis region thereof.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 562 of the sixth lens element 560 has at least one inflection point. The object-side surface 561 of the sixth lens element 560 has at least one critical point in an off-axis region thereof. The image-side surface 562 of the sixth lens element 560 has at least one critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has at least one inflection point. The image-side surface 572 of the seventh lens element 570 has at least one inflection point. The object-side surface 571 of the seventh lens element 570 has at least one critical point in an off-axis region thereof. The image-side surface 572 of the seventh lens element 570 has at least one critical point in an off-axis region thereof.

The eighth lens element 580 with negative refractive power has an object-side surface 581 being concave in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has at least one inflection point. The image-side surface 582 of the eighth lens element 580 has at least one inflection point. The object-side surface 581 of the eighth lens element 580 has at least one critical point in an off-axis region thereof. The image-side surface 582 of the eighth lens element 580 has at least one critical point in an off-axis region thereof.

The filter 593 is made of glass material and located between the eighth lens element 580 and the image surface 595, and will not affect the focal length of the optical imaging lens assembly. The image sensor 599 is disposed on or near the image surface 595 of the optical imaging lens assembly.

The focus tunable component 590 is disposed on the object side of the imaging lens system, and the focus tunable component 590 is configured for tuning its focal length in accordance with object distances or ambient temperatures of various conditions so as to adjust the focal length of the optical imaging lens assembly. In this embodiment, the focus tunable component 590 can be a liquid lens set, a liquid crystal lens set, a positive lens element, a negative lens element or other optical components featuring focus tuning function.

In this embodiment, three of various modes of the optical imaging lens assembly are provided according to different focusing conditions. The detailed optical data of the 5th embodiment are shown in Table 13 and the aspheric surface data are shown in Table 14 below.

TABLE 13

| | 5th Embodiment | | | | | | |
|---|---|---|---|---|---|---|---|
| Surface # | | Curvature Radius | | Thickness | Material | Index | Abbe # | Focal Length |
| 0 | Object | Plano | | TOB | | | | |
| 1 | Focus Tunable Component | | | CTt | | | | ft |
| 2 | | | | 0.980 | | | | |
| 3 | Ape. Stop | Plano | | −0.924 | | | | |
| 4 | Lens 1 | 2.562 | (ASP) | 1.165 | Plastic | 1.545 | 56.1 | 5.64 |
| 5 | | 12.938 | (ASP) | 0.057 | | | | |
| 6 | Lens 2 | 12.688 | (ASP) | 0.300 | Plastic | 1.686 | 18.4 | −15.57 |
| 7 | | 5.744 | (ASP) | 0.382 | | | | |
| 8 | Stop | Plano | | 0.125 | | | | |
| 9 | Lens 3 | 19.082 | (ASP) | 0.320 | Plastic | 1.686 | 18.4 | −147.36 |
| 10 | | 15.943 | (ASP) | −0.005 | | | | |
| 11 | Stop | Plano | | 0.107 | | | | |
| 12 | Lens 4 | −21.213 | (ASP) | 0.492 | Plastic | 1.544 | 56.0 | 134.34 |
| 13 | | −16.575 | (ASP) | −0.152 | | | | |
| 14 | Stop | Plano | | 0.257 | | | | |
| 15 | Lens 5 | 18.958 | (ASP) | 0.431 | Plastic | 1.544 | 56.0 | 61.73 |
| 16 | | 43.184 | (ASP) | 0.563 | | | | |
| 17 | Lens 6 | 9.633 | (ASP) | 0.440 | Plastic | 1.566 | 37.4 | −29.69 |
| 18 | | 6.022 | (ASP) | 0.286 | | | | |
| 19 | Lens 7 | 2.940 | (ASP) | 0.560 | Plastic | 1.544 | 56.0 | 9.52 |
| 20 | | 6.349 | (ASP) | 0.897 | | | | |
| 21 | Lens 8 | −11.753 | (ASP) | 0.653 | Plastic | 1.534 | 55.9 | −5.66 |
| 22 | | 4.144 | (ASP) | 0.500 | | | | |
| 23 | Filter | Plano | | 0.210 | Glass | 1.517 | 64.2 | — |
| 24 | | Plano | | 0.255 | | | | |
| 25 | Image | Plano | | — | | | | |

Note:
Reference wavelength is 587.6 nm (d-line).
An effective radius of the stop 501 (Surface 8) is 1.611 mm.
An effective radius of the stop 502 (Surface 11) is 1.750 mm.
An effective radius of the stop 503 (Surface 14) is 2.088 mm.

TABLE 14

Aspheric Coefficients

| Surface # | 4 | 5 | 6 | 7 | 9 | 10 |
|---|---|---|---|---|---|---|
| k= | −5.2914E−01 | −8.1499E+01 | 3.9814E+01 | 8.5608E+00 | 3.9022E+01 | 2.8545E+01 |
| A4= | 1.0975E−03 | −1.4552E−02 | −2.3808E−02 | −1.2257E−02 | −3.1520E−02 | −1.0079E−02 |
| A6= | 6.8351E−03 | 1.9301E−02 | 2.7378E−02 | 1.5751E−02 | 2.8775E−03 | −4.2561E−02 |
| A8= | −6.2083E−03 | −1.0666E−02 | −1.5920E−02 | −1.2047E−02 | −2.6380E−03 | 6.5098E−02 |
| A10= | 3.6134E−03 | 3.0744E−03 | 5.5457E−03 | 5.9669E−03 | 4.1979E−04 | −6.2597E−02 |
| A12= | −1.1990E−03 | −3.8492E−04 | −1.0329E−03 | −1.6280E−03 | 6.3729E−04 | 3.4962E−02 |
| A14= | 2.1521E−04 | −1.0936E−06 | 9.9657E−05 | 2.1848E−04 | −2.0502E−04 | −1.0581E−02 |
| A16= | −1.6664E−05 | 2.3892E−06 | −3.7118E−06 | — | 1.1223E−05 | 1.6190E−03 |
| A18= | — | — | — | — | — | −9.7554E−05 |

| Surface # | 12 | 13 | 15 | 16 | 17 | 18 |
|---|---|---|---|---|---|---|
| k= | 3.3169E+01 | 3.5369E+01 | −5.8849E+01 | 4.5690E+01 | 1.8911E−01 | −9.7805E+01 |
| A4= | 3.9444E−02 | 5.2912E−02 | 4.1422E−02 | 2.7484E−03 | −1.7338E−02 | −1.8475E−02 |
| A6= | −9.9605E−02 | −1.1151E−01 | −1.0648E−01 | −2.6434E−02 | 4.8928E−03 | 2.4970E−04 |
| A8= | 1.4610E−01 | 1.0866E−01 | 8.9509E−02 | 1.1649E−02 | −5.8920E−03 | 2.8610E−04 |
| A10= | −1.3707E−01 | −6.0063E−02 | −4.2263E−02 | −4.9911E−04 | 2.7860E−03 | −2.8136E−04 |
| A12= | 7.5998E−02 | 1.5904E−02 | 9.7071E−03 | −1.8131E−03 | −8.3656E−04 | 9.8818E−05 |
| A14= | −2.4058E−02 | −1.1546E−04 | −2.7313E−04 | 8.2314E−04 | 1.6689E−04 | −1.5108E−05 |
| A16= | 4.0491E−03 | −1.0350E−03 | −3.3363E−04 | −1.5912E−04 | −2.1619E−05 | 1.1235E−06 |
| A18= | −2.8185E−04 | 2.4252E−04 | 6.4294E−05 | 1.4531E−05 | 1.6504E−06 | −3.9344E−08 |
| A20= | — | −1.8203E−05 | −3.8520E−06 | −5.1214E−07 | −5.5248E−08 | 5.0401E−10 |

| Surface # | 19 | 20 | 21 | 22 |
|---|---|---|---|---|
| k= | −1.2341E+00 | −1.5865E+01 | 4.3468E+00 | −4.6823E−01 |
| A4= | −3.9679E−02 | 1.5191E−02 | −4.8163E−02 | −5.1406E−02 |
| A6= | 6.8271E−03 | −1.3526E−02 | 9.2935E−03 | 1.0778E−02 |
| A8= | −3.6643E−03 | 3.5535E−03 | −1.0304E−03 | −1.8229E−03 |
| A10= | 1.2388E−03 | −5.8429E−04 | 9.2370E−05 | 2.1032E−04 |
| A12= | −2.5551E−04 | 6.0613E−05 | −6.6193E−06 | −1.5598E−05 |
| A14= | 3.2158E−05 | −3.9256E−06 | 3.3568E−07 | 7.1908E−07 |
| A16= | −2.3565E−06 | 1.5691E−07 | −1.0819E−08 | −1.9703E−08 |
| A18= | 9.1844E−08 | −3.5964E−09 | 1.9659E−10 | 2.9141E−10 |
| A20= | −1.4708E−09 | 3.6136E−11 | −1.5318E−12 | −1.7796E−12 |

In the 5th embodiment, the equation of the aspheric surface profiles of the aforementioned lens elements is the same as the equation of the 1st embodiment. Also, the rest optical data of the optical imaging lens assembly are disclosed in Table 15 below. Moreover, the definitions of these parameters shown in Table 15 are the same as those stated in the 1st embodiment with corresponding values for the 5th embodiment. In particular, in this embodiment, the image-side first lens element is the eighth lens element 580, an image-side surface of the image-side first lens element is the image-side surface 582 of the eighth lens element 580, the image-side second lens element is the seventh lens element 570, an object-side surface of the image-side second lens element is the object-side surface 571 of the seventh lens element 570, and an image-side surface of the image-side second lens element is the image-side surface 572 of the seventh lens element 570, so TDi is an axial distance between the object-side surface 511 of the first lens element 510 and the image-side surface 582 of the eighth lens element 580, RLr1r is a curvature radius of the image-side surface 582 of the eighth lens element 580, YLr1r is a maximum effective radius of the image-side surface 582 of the eighth lens element 580, DLr1Lr2 is an axial distance between the seventh lens element 570 and the eighth lens element 580, CTLr1 is a central thickness of the eighth lens element 580, SDi is an axial distance between the aperture stop 500 and the image-side surface 582 of the eighth lens element 580, RLr2f is a curvature radius of the object-side surface 571 of the seventh lens element 570, RLr2r is a curvature radius of the image-side surface 572 of the seventh lens element 570, and YCLr1r is a vertical distance between the non-axial critical point on the image-side surface 582 of the eighth lens element 580 and an optical axis.

TABLE 15

5th Embodiment

| | Mode 1 | Mode 2 | Mode 3 | | |
|---|---|---|---|---|---|
| f [mm] | 6.76 | 6.58 | 6.41 | fi [mm] | 6.76 |
| Fno | 1.70 | 1.70 | 1.70 | Nimax | 1.686 |
| HFOV [deg.] | 41.0 | 40.7 | 40.5 | Vimin | 18.4 |
| TOB [mm] | ∞ | 400.000 | 200.000 | ΣATi/ΣCTi | 0.58 |
| CTt [mm] | 0.800 | 0.800 | 0.800 | DLr1Lr2/CTLr1 | 1.37 |
| ft [mm] | ∞ | 401.07 | 200.54 | SDi/TDi | 0.87 |
| TDi/CTt | 8.60 | 8.60 | 8.60 | TLi/EPDi | 1.97 |
| TL [mm] | 8.70 | 8.70 | 8.70 | TLi/fi | 1.16 |
| TL/ImgH | 1.45 | 1.45 | 1.45 | |RLr2f/RLr2r| | 0.46 |
| RLr1r/ImgH | 0.69 | 0.69 | 0.69 | |fi/fLf7| | 0.71 |
| |f/ft| | 0.00E+00 | 1.64E−02 | 3.20E−02 | LNi | 8 |
| |f/TOB-f/ft| | 0.00E+00 | 4.40E−05 | 8.58E−05 | YCLr1r/TDi | 0.21 |
| |fi/ft| | 0.00E+00 | 1.69E−02 | 3.37E−02 | — | — |
| |ft| [mm] | ∞ | 401.07 | 200.54 | — | — |
| CRA [deg.] | 34.7 | 34.7 | 34.7 | — | — |
| YLf7r/ DLf1fLf7r | 0.74 | 0.72 | 0.71 | — | — |
| YLr1r/YLf1f | 2.47 | 2.41 | 2.41 | — | — |

6th Embodiment

Figure 19:
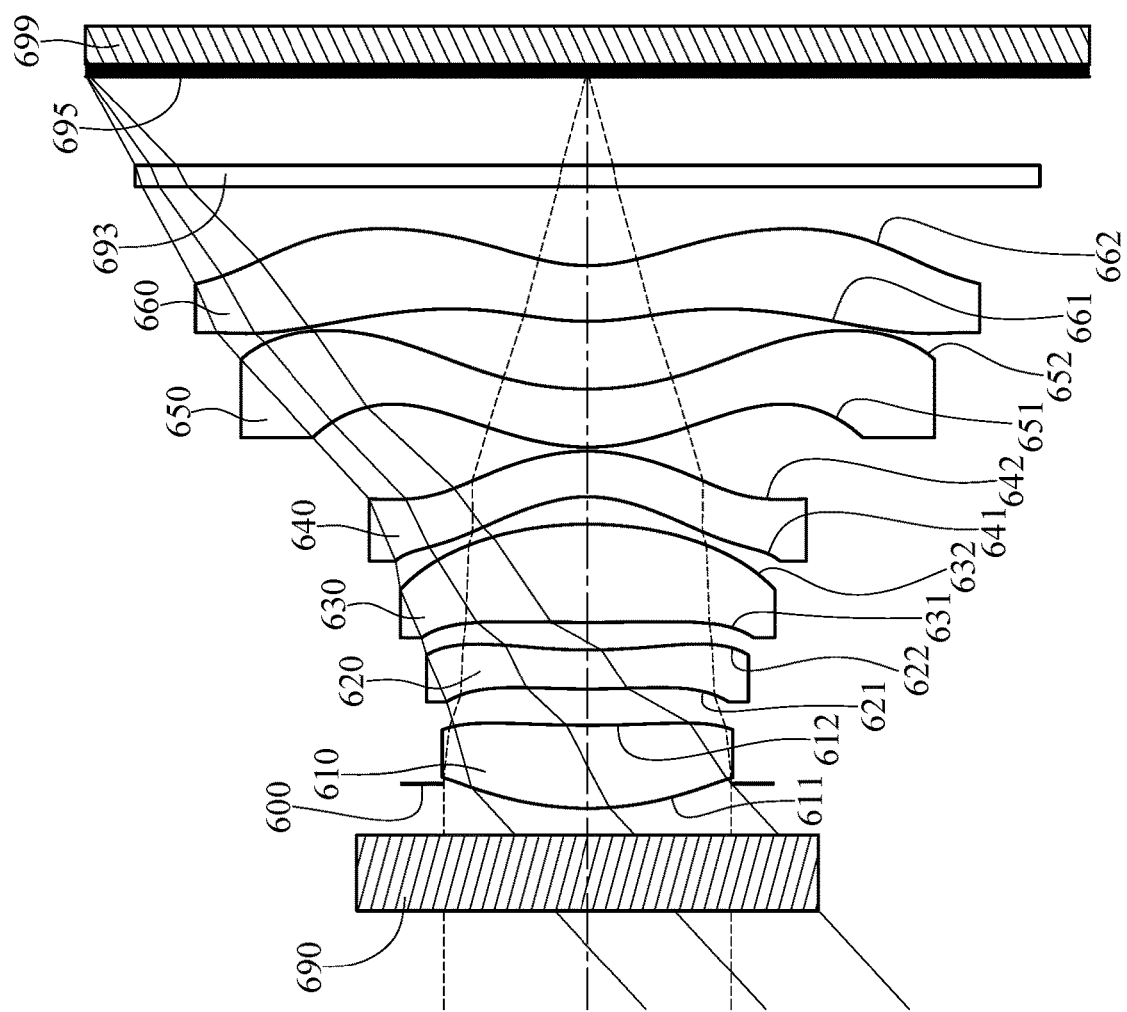
FIG. 19 is a schematic view of an image capturing unit in Mode 1 according to the 6th embodiment of the present disclosure.
Figure 20:
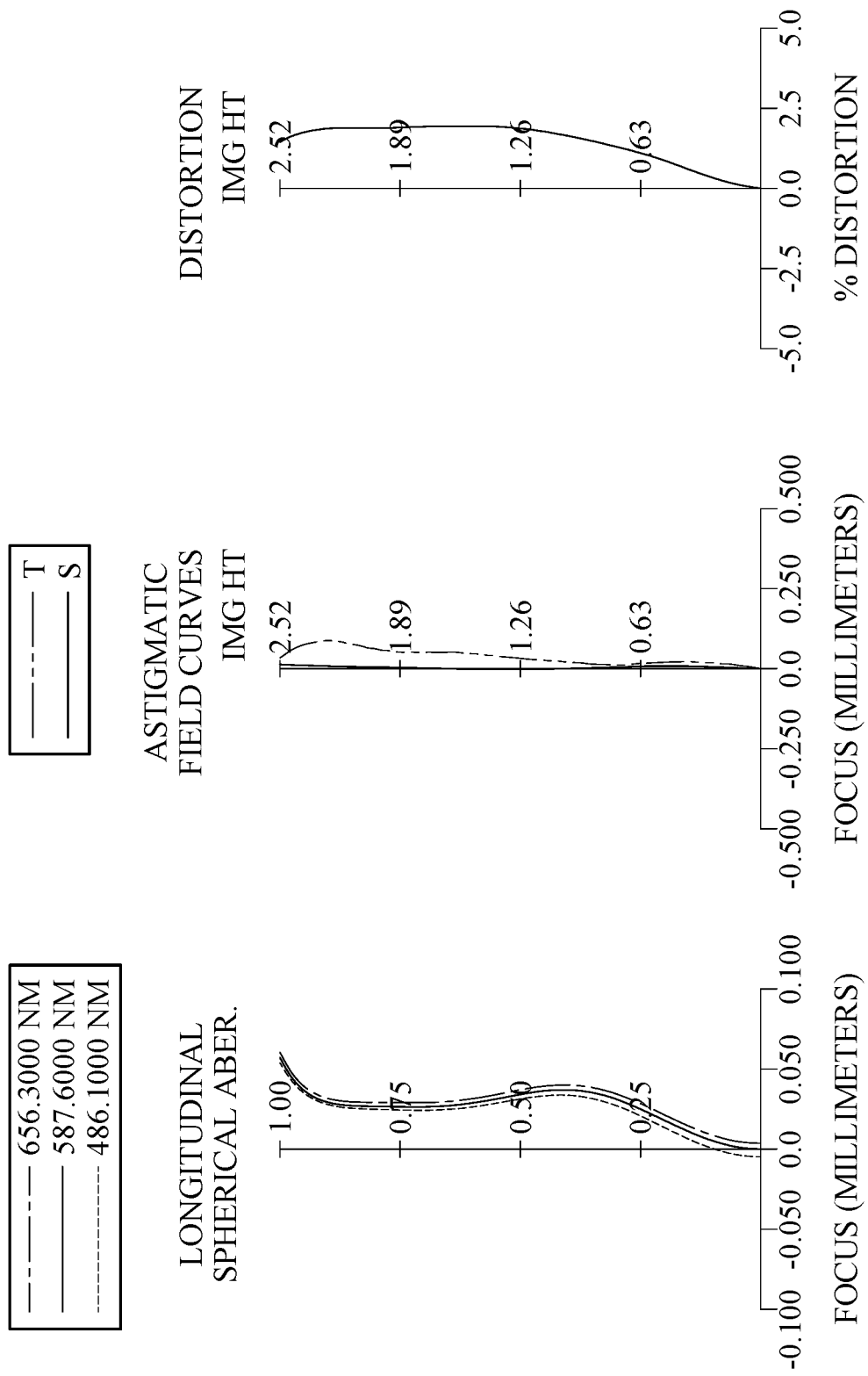
FIG. 20 shows spherical aberration curves, astigmatic field curves and a distortion curve of the image capturing unit in Mode 1 according to the 6th embodiment.

FIG. 19 is a schematic view of an image capturing unit in Mode 1 according to the 6th embodiment of the present disclosure. FIG. 20 shows spherical aberration curves, astigmatic field curves and a distortion curve of the image capturing unit in Mode 1 according to the 6th embodiment.

Figure 21:
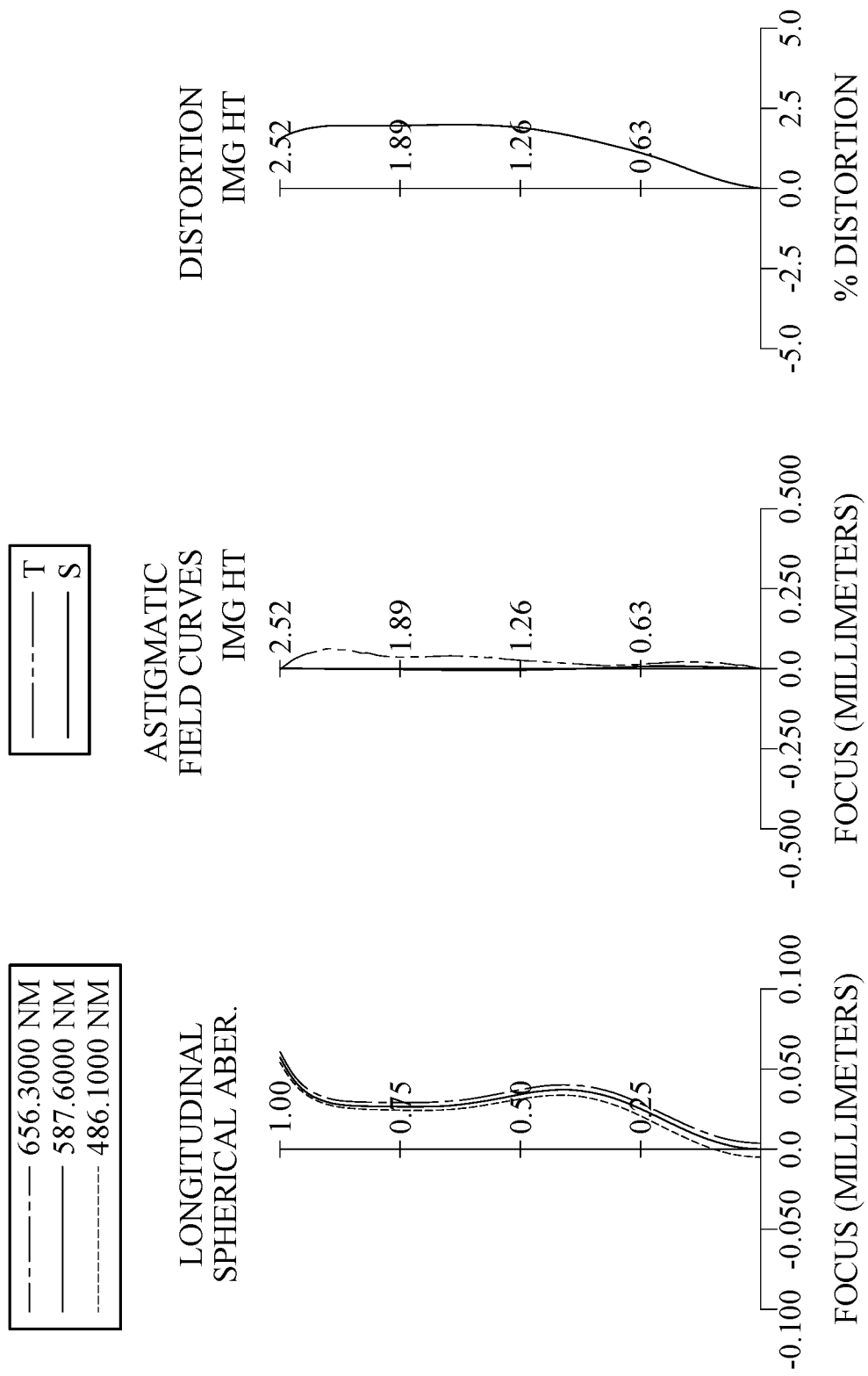
FIG. 21 shows spherical aberration curves, astigmatic field curves and a distortion curve of the image capturing unit in Mode 2 according to the 6th embodiment.
Figure 22:
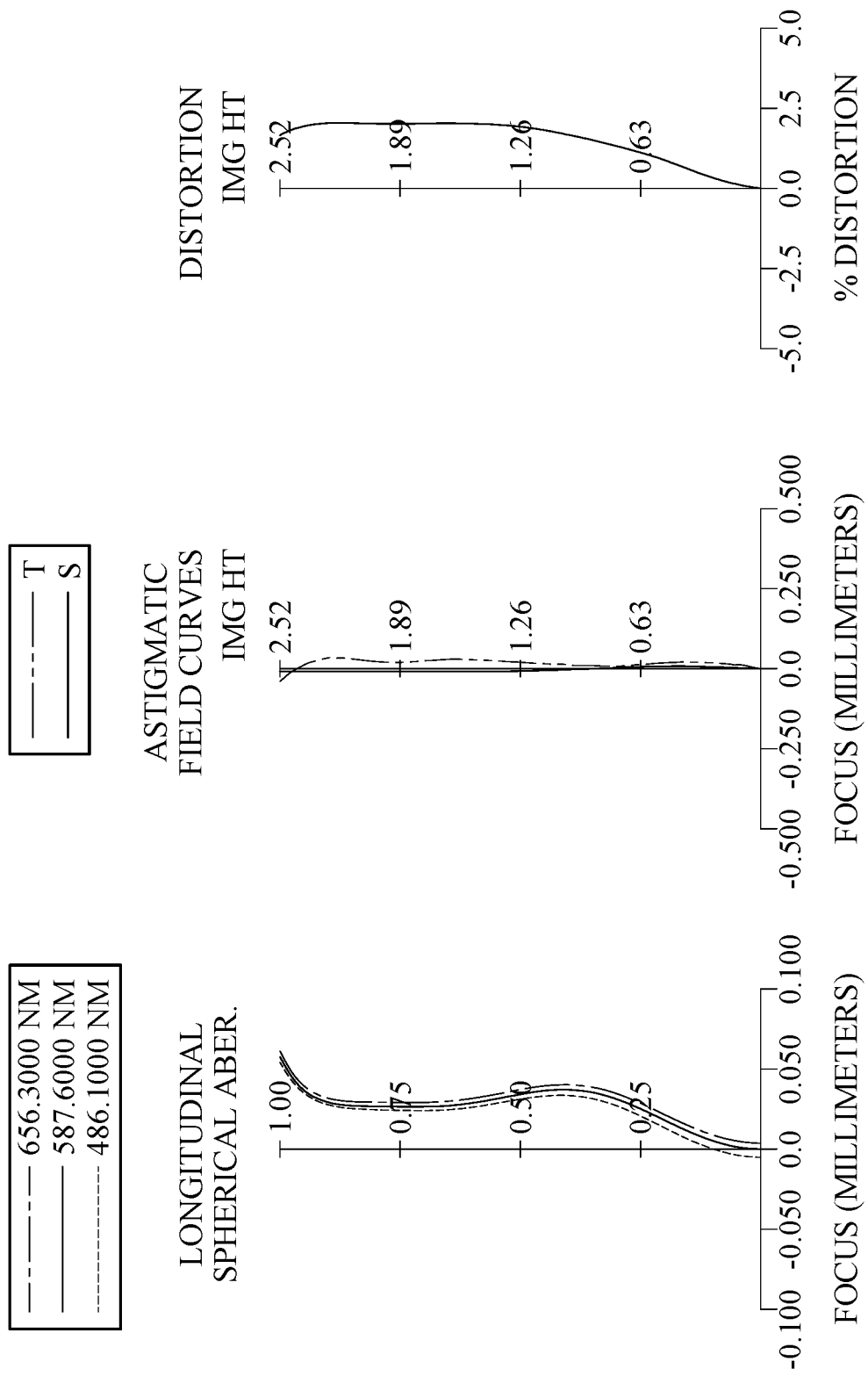
FIG. 22 shows spherical aberration curves, astigmatic field curves and a distortion curve of the image capturing unit in Mode 3 according to the 6th embodiment.

FIG. 21 shows spherical aberration curves, astigmatic field curves and a distortion curve of the image capturing unit in Mode 2 according to the 6th embodiment. FIG. 22 shows spherical aberration curves, astigmatic field curves and a distortion curve of the image capturing unit in Mode 3 according to the 6th embodiment. In FIG. 19, the image capturing unit includes the optical imaging lens assembly (its reference numeral is omitted) of the present disclosure and an image sensor 699. The optical imaging lens assembly includes a focus tunable component 690, an aperture stop 600, an imaging lens system (its reference numeral is omitted), a filter 693 and an image surface 695. The imaging lens system includes a first lens element 610, a second lens element 620, a third lens element 630, a fourth lens element 640, a fifth lens element 650 and a sixth lens element 660. Further, the aforementioned components of the optical imaging lens assembly are arranged in order from an object side to an image side as follows: the focus tunable component 690, the aperture stop 600, the first lens element 610, the second lens element 620, the third lens element 630, the fourth lens element 640, the fifth lens element 650, the sixth lens element 660, the filter 693 and the image surface 695. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 610) and an object-side second lens element (the second lens element 620), and the second lens group includes, in order from the image side to the object side, an image-side first lens element (the sixth lens element 660) and an image-side second lens element (the fifth lens element 650). The optical imaging lens assembly includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one inflection point. The image-side surface 612 of the first lens element 610 has at least one inflection point. The image-side surface 612 of the first lens element 610 has at least one critical point in an off-axis region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point. The image-side surface 622 of the second lens element 620 has at least one inflection point. The object-side surface 621 of the second lens element 620 has at least one critical point in an off-axis region thereof. The image-side surface 622 of the second lens element 620 has at least one critical point in an off-axis region thereof.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has at least one inflection point. The object-side surface 631 of the third lens element 630 has at least one critical point in an off-axis region thereof.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one inflection point. The image-side surface 642 of the fourth lens element 640 has at least one inflection point. The image-side surface 642 of the fourth lens element 640 has at least one critical point in an off-axis region thereof.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point. The object-side surface 651 of the fifth lens element 650 has at least one critical point in an off-axis region thereof. The image-side surface 652 of the fifth lens element 650 has at least one critical point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point. The object-side surface 661 of the sixth lens element 660 has at least one critical point in an off-axis region thereof. The image-side surface 662 of the sixth lens element 660 has at least one critical point in an off-axis region thereof.

The filter 693 is made of glass material and located between the sixth lens element 660 and the image surface 695, and will not affect the focal length of the optical imaging lens assembly. The image sensor 699 is disposed on or near the image surface 695 of the optical imaging lens assembly.

The focus tunable component 690 is disposed on the object side of the imaging lens system, and the focus tunable component 690 is configured for tuning its focal length in accordance with object distances or ambient temperatures of various conditions so as to adjust the focal length of the optical imaging lens assembly. In this embodiment, the focus tunable component 690 can be a liquid lens set, a liquid crystal lens set, a positive lens element, a negative lens element or other optical components featuring focus tuning function.

In this embodiment, three of various modes of the optical imaging lens assembly are provided according to different focusing conditions. The detailed optical data of the 6th embodiment are shown in Table 16 and the aspheric surface data are shown in Table 17 below.

TABLE 16

6th Embodiment

| Surface # | | Curvature Radius | | Thickness | Material | Index | Abbe # | Focal Length |
|---|---|---|---|---|---|---|---|---|
| 0 | Object | Plano | | TOB | | | | |
| 1 | Focus Tunable Component | | | CTt | | | | ft |
| 2 | | | | 0.260 | | | | |
| 3 | Ape. Stop | Plano | | −0.125 | | | | |
| 4 | Lens 1 | 1.598 | (ASP) | 0.418 | Plastic | 1.545 | 56.1 | 3.92 |
| 5 | | 5.763 | (ASP) | 0.182 | | | | |
| 6 | Lens 2 | 4.393 | (ASP) | 0.200 | Plastic | 1.639 | 23.5 | −9.69 |
| 7 | | 2.524 | (ASP) | 0.140 | | | | |
| 8 | Lens 3 | 12.948 | (ASP) | 0.493 | Plastic | 1.544 | 56.0 | 3.02 |
| 9 | | −1.853 | (ASP) | 0.138 | | | | |
| 10 | Lens 4 | −0.674 | (ASP) | 0.230 | Plastic | 1.669 | 19.5 | −5.24 |
| 11 | | −0.948 | (ASP) | 0.020 | | | | |
| 12 | Lens 5 | 1.068 | (ASP) | 0.295 | Plastic | 1.544 | 56.0 | 4.70 |
| 13 | | 1.655 | (ASP) | 0.342 | | | | |
| 14 | Lens 6 | 1.402 | (ASP) | 0.279 | Plastic | 1.566 | 37.4 | −4.79 |
| 15 | | 0.858 | (ASP) | 0.400 | | | | |
| 16 | Filter | Plano | | 0.106 | Glass | 1.517 | 64.2 | — |
| 17 | | Plano | | 0.449 | | | | |
| 18 | Image | Plano | | — | | | | |

Note:
Reference wavelength is 587.6 nm (d-line).
An effective radius of the object-side surface 621 (Surface 6) is 0.710 mm.

TABLE 17

Aspheric Coefficients

| Surface # | 4 | 5 | 6 | 7 | 8 |
|---|---|---|---|---|---|
| k = | −1.9373E+01 | −2.8817E+01 | −1.0000E+00 | −9.9000E+01 | 4.1448E+01 |
| A4 = | 5.0646E−01 | −1.1222E−01 | −4.7528E−01 | 2.3525E−01 | −2.0012E−01 |
| A6 = | −1.1682E+00 | −2.7621E−01 | 6.5712E−01 | −1.8128E+00 | 1.0516E+00 |
| A8 = | 1.9152E+00 | 6.9580E−01 | −4.4646E+00 | 3.9556E+00 | −5.0792E+00 |
| A10 = | −1.9109E+00 | −1.2217E+00 | 1.4988E+01 | −4.3231E+00 | 1.0510E+01 |
| A12 = | 6.6195E−01 | −4.6435E−01 | −2.5709E+01 | 1.1374E+00 | −1.0538E+01 |
| A14 = | −2.5106E−01 | 1.3703E+00 | 1.6571E+01 | 5.1671E−01 | 3.9194E+00 |

| Surface # | 9 | 10 | 11 | 12 | 13 |
|---|---|---|---|---|---|
| k = | −1.0349E+00 | −1.9682E+00 | −4.8598E+00 | −1.0000E+00 | −3.1625E+00 |
| A4 = | −6.1946E−02 | 8.5803E−01 | −6.8977E−02 | −3.5583E−01 | 1.7690E−01 |
| A6 = | −2.2921E−02 | −3.6475E+00 | −6.6696E−01 | 3.3049E−01 | −3.0471E−01 |
| A8 = | −5.1230E−03 | 1.0212E+01 | 2.6465E+00 | −4.2844E−01 | 9.0479E−02 |
| A10 = | −3.9722E−02 | −1.4747E+01 | −3.0522E+00 | 2.3283E−01 | 1.1852E−01 |
| A12 = | — | 1.0728E+01 | 1.4811E+00 | 1.5273E−02 | −1.4403E−01 |
| A14 = | — | −3.2298E+00 | −2.6264E−01 | −7.5002E−02 | 7.4816E−02 |
| A16 = | — | — | — | 3.3929E−02 | −2.1781E−02 |
| A18 = | — | — | — | −6.3226E−03 | 3.4697E−03 |
| A20 = | — | — | — | 4.3114E−04 | −2.3687E−04 |

| Surface # | 14 | 15 |
|---|---|---|
| k = | −1.0000E+00 | −3.8304E+00 |
| A4 = | −7.3345E−01 | −4.0125E−01 |
| A6 = | 7.3085E−01 | 4.4041E−01 |
| A8 = | −4.6254E−01 | −3.5817E−01 |
| A10 = | 1.8947E−01 | 2.0437E−01 |
| A12 = | −4.9893E−02 | −8.1338E−02 |
| A14 = | 8.3531E−03 | 2.1789E−02 |
| A16 = | −8.5783E−04 | −3.6600E−03 |
| A18 = | 4.8981E−05 | 3.4277E−04 |
| A20 = | −1.1843E−06 | −1.3537E−05 |

In the 6th embodiment, the equation of the aspheric surface profiles of the aforementioned lens elements is the same as the equation of the 1st embodiment. Also, the rest optical data of the optical imaging lens assembly are disclosed in Table 18 below. Moreover, the definitions of these parameters shown in Table 18 are the same as those stated in the 1st embodiment with corresponding values for the 6th embodiment. In particular, in this embodiment, the image-side first lens element is the sixth lens element 660, an image-side surface of the image-side first lens element is the image-side surface 662 of the sixth lens element 660, the image-side second lens element is the fifth lens element 650, an object-side surface of the image-side second lens element is the object-side surface 651 of the fifth lens element 650, and an image-side surface of the image-side second lens element is the image-side surface 652 of the fifth lens element 650, so TDi is an axial distance between the object-side surface 611 of the first lens element 610 and the image-side surface 662 of the sixth lens element 660, RLr1r is a curvature radius of the image-side surface 662 of the sixth lens element 660, YLr1r is a maximum effective radius of the image-side surface 662 of the sixth lens element 660, DLr1Lr2 is an axial distance between the fifth lens element 650 and the sixth lens element 660, CTLr1 is a central thickness of the sixth lens element 660, SDi is an axial distance between the aperture stop 600 and the image-side surface 662 of the sixth lens element 660, RLr2f is a curvature radius of the object-side surface 651 of the fifth lens element 650, RLr2r is a curvature radius of the image-side surface 652 of the fifth lens element 650, and YCLr1r is a vertical distance between the non-axial critical point on the image-side surface 662 of the sixth lens element 660 and an optical axis.

TABLE 18

6th Embodiment

| | Mode 1 | Mode 2 | Mode 3 | | |
|---|---|---|---|---|---|
| f [mm] | 2.68 | 2.66 | 2.65 | fi [mm] | 2.68 |
| Fno | 1.85 | 1.85 | 1.85 | Nimax | 1.669 |
| HFOV [deg.] | 42.6 | 42.5 | 42.5 | Vimin | 19.5 |
| TOB [mm] | ∞ | 450.000 | 230.000 | ΣATi/ΣCTi | 0.43 |
| CTt [mm] | 0.380 | 0.380 | 0.380 | DLr1Lr2/CTLr1 | 1.23 |
| ft [mm] | ∞ | 493.33 | 246.67 | SDi/TDi | 0.95 |
| TDi/CTt | 7.20 | 7.20 | 7.20 | TLi/EPDi | 2.55 |
| TL [mm] | 4.21 | 4.21 | 4.21 | TLi/fi | 1.38 |
| TL/ImgH | 1.67 | 1.67 | 1.67 | |RLr2f/RLr2r| | 0.65 |
| RLr1r/ImgH | 0.34 | 0.34 | 0.34 | LNi | 6 |
| |f/ft| | 0.00E+00 | 5.40E−03 | 1.07E−02 | YCLr1r/TDi | 0.38 |
| |f/TOB−f/ft| | 0.00E+00 | 5.20E−04 | 7.78E−04 | — | — |
| |fi/ft| | 0.00E+00 | 5.43E−03 | 1.09E−02 | — | — |
| |ft| [mm] | ∞ | 493.33 | 246.67 | — | — |
| CRA [deg.] | 35.3 | 35.3 | 35.3 | — | — |
| YLr1r/YLf1f | 2.71 | 2.70 | 2.69 | — | — |

7th Embodiment

Figure 23:
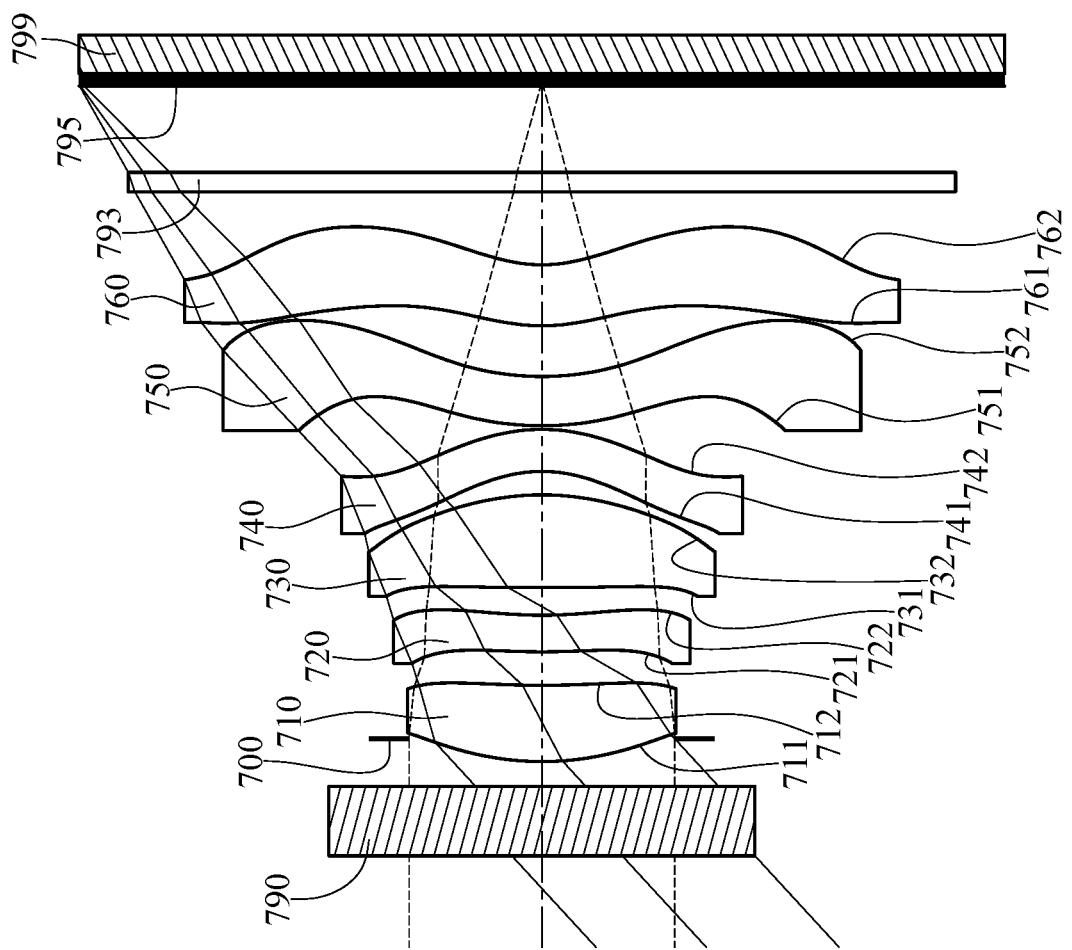
FIG. 23 is a schematic view of an image capturing unit in Mode 1 according to the 7th embodiment of the present disclosure.
Figure 24:
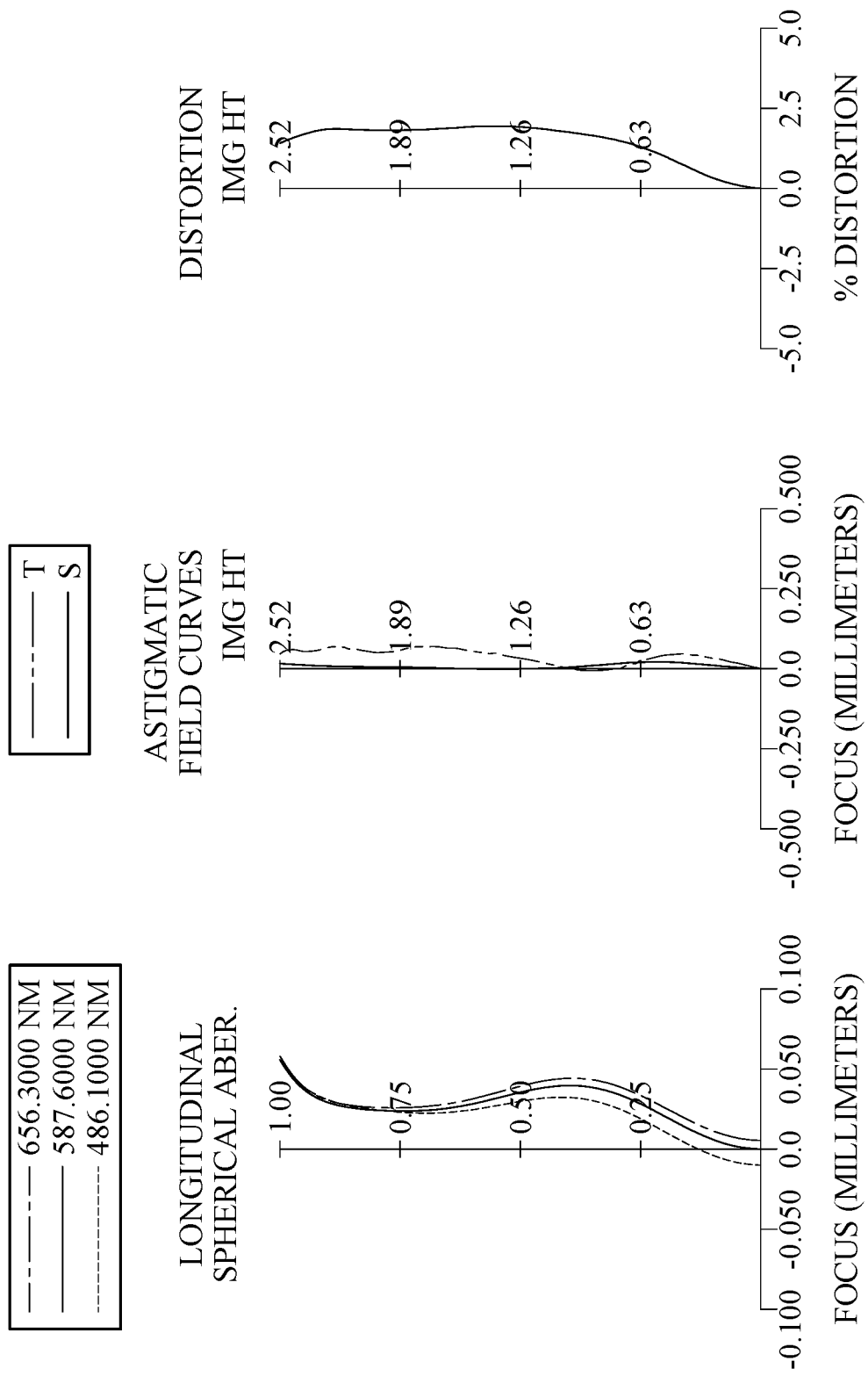
FIG. 24 shows spherical aberration curves, astigmatic field curves and a distortion curve of the image capturing unit in Mode 1 according to the 7th embodiment.
Figure 25:
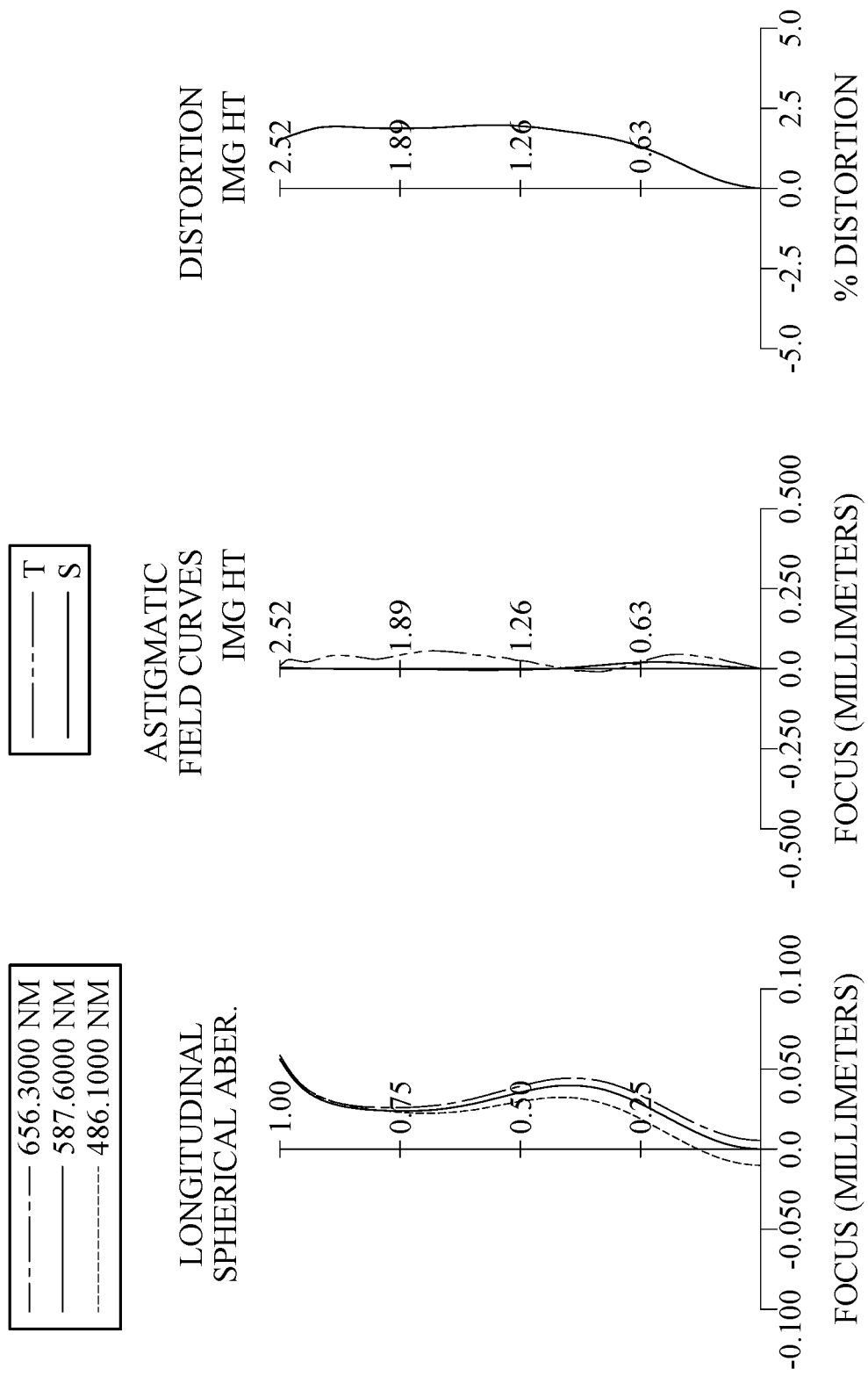
FIG. 25 shows spherical aberration curves, astigmatic field curves and a distortion curve of the image capturing unit in Mode 2 according to the 7th embodiment.

FIG. 23 is a schematic view of an image capturing unit in Mode 1 according to the 7th embodiment of the present disclosure. FIG. 24 shows spherical aberration curves, astigmatic field curves and a distortion curve of the image capturing unit in Mode 1 according to the 7th embodiment. FIG. 25 shows spherical aberration curves, astigmatic field curves and a distortion curve of the image capturing unit in Mode 2 according to the 7th embodiment. In FIG. 23, the image capturing unit includes the optical imaging lens assembly (its reference numeral is omitted) of the present disclosure and an image sensor 799. The optical imaging lens assembly includes a focus tunable component 790, an aperture stop 700, an imaging lens system (its reference numeral is omitted), a filter 793 and an image surface 795. The imaging lens system includes a first lens element 710, a second lens element 720, a third lens element 730, a fourth lens element 740, a fifth lens element 750 and a sixth lens element 760. Further, the aforementioned components of the optical imaging lens assembly are arranged in order from an object side to an image side as follows: the focus tunable component 790, the aperture stop 700, the first lens element 710, the second lens element 720, the third lens element 730, the fourth lens element 740, the fifth lens element 750, the sixth lens element 760, the filter 793 and the image surface 795. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 710) and an object-side second lens element (the second lens element 720), and the second lens group includes, in order from the image side to the object side, an image-side first lens element (the sixth lens element 760) and an image-side second lens element (the fifth lens element 750). The optical imaging lens assembly includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point. The image-side surface 712 of the first lens element 710 has at least one inflection point. The image-side surface 712 of the first lens element 710 has at least one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one inflection point. The image-side surface 722 of the second lens element 720 has at least one inflection point. The object-side surface 721 of the second lens element 720 has at least one critical point in an off-axis region thereof. The image-side surface 722 of the second lens element 720 has at least one critical point in an off-axis region thereof.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The object-side surface 731 of the third lens element 730 has at least one inflection point. The image-side surface 732 of the third lens element 730 has at least one inflection point. The object-side surface 731 of the third lens element 730 has at least one critical point in an off-axis region thereof.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one inflection point. The image-side surface 742 of the fourth lens element 740 has at least one inflection point. The image-side surface 742 of the fourth lens element 740 has at least one critical point in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point. The object-side surface 751 of the fifth lens element 750 has at least one critical point in an off-axis region thereof. The image-side surface 752 of the fifth lens element 750 has at least one critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 762 of the sixth lens element 760 has at least one inflection point. The object-side surface 761 of the sixth lens element 760 has at least one critical point in an off-axis region thereof. The image-side surface 762 of the sixth lens element 760 has at least one critical point in an off-axis region thereof.

The filter 793 is made of glass material and located between the sixth lens element 760 and the image surface 795, and will not affect the focal length of the optical imaging lens assembly. The image sensor 799 is disposed on or near the image surface 795 of the optical imaging lens assembly.

The focus tunable component 790 is disposed on the object side of the imaging lens system, and the focus tunable component 790 is configured for tuning its focal length in accordance with object distances or ambient temperatures of various conditions so as to adjust the focal length of the optical imaging lens assembly. In this embodiment, the focus tunable component 790 can be a liquid lens set, a liquid crystal lens set, a positive lens element, a negative lens element or other optical components featuring focus tuning function.

In this embodiment, two of various modes of the optical imaging lens assembly are provided according to different focusing conditions. The detailed optical data of the 7th embodiment are shown in Table 19 and the aspheric surface data are shown in Table 20 below.

TABLE 19

7th Embodiment

| Surface # | | Curvature Radius | | Thickness | Material | Index | Abbe # | Focal Length |
|---|---|---|---|---|---|---|---|---|
| 0 | Object | Plano | | TOB | | | | |
| 1 | Focus Tunable Component | | | CTt | | | | ft |
| 2 | | | | 0.260 | | | | |
| 3 | Ape. Stop | Plano | | −0.125 | | | | |
| 4 | Lens 1 | 1.590 | (ASP) | 0.417 | Plastic | 1.545 | 56.1 | 4.08 |
| 5 | | 5.051 | (ASP) | 0.183 | | | | |
| 6 | Lens 2 | 3.868 | (ASP) | 0.200 | Plastic | 1.639 | 23.5 | −11.67 |
| 7 | | 2.495 | (ASP) | 0.151 | | | | |
| 8 | Lens 3 | 19.957 | (ASP) | 0.507 | Plastic | 1.544 | 56.0 | 2.42 |
| 9 | | −1.399 | (ASP) | 0.128 | | | | |
| 10 | Lens 4 | −0.749 | (ASP) | 0.230 | Plastic | 1.669 | 19.5 | −8.02 |
| 11 | | −0.978 | (ASP) | 0.020 | | | | |
| 12 | Lens 5 | 1.797 | (ASP) | 0.269 | Plastic | 1.544 | 56.0 | −53.08 |
| 13 | | 1.602 | (ASP) | 0.277 | | | | |
| 14 | Lens 6 | 1.032 | (ASP) | 0.333 | Plastic | 1.566 | 37.4 | −10.47 |
| 15 | | 0.776 | (ASP) | 0.400 | | | | |
| 16 | Filter | Plano | | 0.106 | Glass | 1.517 | 64.2 | — |
| 17 | | Plano | | 0.471 | | | | |
| 18 | Image | Plano | | — | | | | |

Note:
Reference wavelength is 587.6 nm (d-line).
An effective radius of the object-side surface 721 (Surface 6) is 0.710 mm

TABLE 20

Aspheric Coefficients

| Surface # | 4 | 5 | 6 | 7 | 8 |
|---|---|---|---|---|---|
| k = | −1.9134E+01 | −2.7937E+01 | −1.0000E+00 | −9.9000E+01 | 6.1599E+01 |
| A4 = | 5.1167E−01 | −1.1929E−01 | −4.6977E−01 | 2.9565E−01 | 1.3580E−02 |
| A6 = | −1.2328E+00 | −3.1195E−01 | 1.7977E−01 | −2.3305E+00 | 1.9757E−01 |
| A8 = | 2.1315E+00 | 8.9003E−01 | −2.0748E+00 | 5.6452E+00 | −1.9300E+00 |
| A10 = | −2.3088E+00 | −1.8607E+00 | 8.0850E+00 | −7.5938E+00 | 4.3703E+00 |
| A12 = | 9.9315E−01 | 7.6487E−01 | −1.4274E+01 | 4.8838E+00 | −4.7283E+00 |
| A14 = | −3.2900E−01 | 4.6445E−01 | 8.8622E+00 | −1.3216E+00 | 1.8508E+00 |

| Surface # | 9 | 10 | 11 | 12 | 13 |
|---|---|---|---|---|---|
| k = | −2.6931E+01 | −1.4840E+00 | −2.5891E+00 | −1.0000E+00 | −2.0268E+01 |
| A4 = | −6.7020E−01 | 4.3743E−01 | 9.4246E−02 | 2.4009E−01 | 6.3801E−01 |
| A6 = | 1.6047E+00 | −1.4396E+00 | −5.3160E−01 | −9.3057E−01 | −1.2071E+00 |

TABLE 20-continued

| | | | | |
|---|---|---|---|---|
| A8 = | −2.0212E+00 | 5.2662E+00 | 1.5866E+00 | 1.1898E+00 | 1.1312E+00 |
| A10 = | 8.8692E−01 | −9.0897E+00 | −1.6117E+00 | −1.1622E+00 | −6.3375E−01 |
| A12 = | — | 7.3865E+00 | 7.0430E−01 | 8.3322E−01 | 2.0116E−01 |
| A14 = | — | −2.3646E+00 | −1.1353E−01 | −3.9382E−01 | −2.2790E−02 |
| A16 = | — | — | — | 1.1239E−01 | −6.3842E−03 |
| A18 = | — | — | — | −1.7244E−02 | 2.4769E−03 |
| A20 = | — | — | — | 1.0776E−03 | −2.4746E−04 |

| Surface # | 14 | 15 |
|---|---|---|
| k = | −1.0000E+00 | −2.9425E+00 |
| A4 = | −8.2293E−01 | −4.7560E−01 |
| A6 = | 7.2300E−01 | 5.1635E−01 |
| A8 = | −3.8440E−01 | −4.2574E−01 |
| A10 = | 1.1912E−01 | 2.5248E−01 |
| A12 = | −1.8835E−02 | −1.0563E−01 |
| A14 = | 6.8711E−04 | 2.9664E−02 |
| A16 = | 2.0393E−04 | −5.1755E−03 |
| A18 = | −2.7100E−05 | −4.9889E−04 |
| A20 = | 9.8073E−07 | −2.0144E−05 |

In the 7th embodiment, the equation of the aspheric surface profiles of the aforementioned lens elements is the same as the equation of the 1st embodiment. Also, the rest optical data of the optical imaging lens assembly are disclosed in Table 21 below. Moreover, the definitions of these parameters shown in Table 21 are the same as those stated in the 1st and 6th embodiments with corresponding values for the 7th embodiment, so an explanation in this regard will not be provided again.

TABLE 21

7th Embodiment

| | Mode 1 | Mode 2 | | |
|---|---|---|---|---|
| f [mm] | 2.68 | 2.67 | fi [mm] | 2.68 |
| Fno | 1.85 | 1.85 | Nimax | 1.669 |
| HFOV [deg.] | 42.6 | 42.5 | Vimin | 19.5 |
| TOB [mm] | ∞ | 450.000 | ΣATi/ΣCTi | 0.39 |
| CTt [mm] | 0.380 | 0.380 | DLr1Lr2/CTLr1 | 0.83 |
| ft [mm] | ∞ | 493.33 | SDi/TDi | 0.95 |
| TDi/CTt | 7.14 | 7.14 | TLi/EPDi | 2.55 |
| TL [mm] | 4.21 | 4.21 | TLi/fi | 1.38 |
| TL/ImgH | 1.67 | 1.67 | |RLr2f/RLr2r| | 1.12 |
| RLr1r/ImgH | 0.31 | 0.31 | LNi | 6 |
| |f/ft| | 0.00E+00 | 5.41E−03 | YCLr1r/TDi | 0.37 |
| |f/TOB-f/ft| | 0.00E+00 | 5.21E−04 | — | — |
| |fi/ft| | 0.00E+00 | 5.44E−03 | — | — |
| |ft| [mm] | ∞ | 493.33 | — | — |
| CRA [deg.] | 36.1 | 36.1 | — | — |
| YLr1r/YLf1f | 2.67 | 2.66 | — | — |

8th Embodiment

Figure 26:
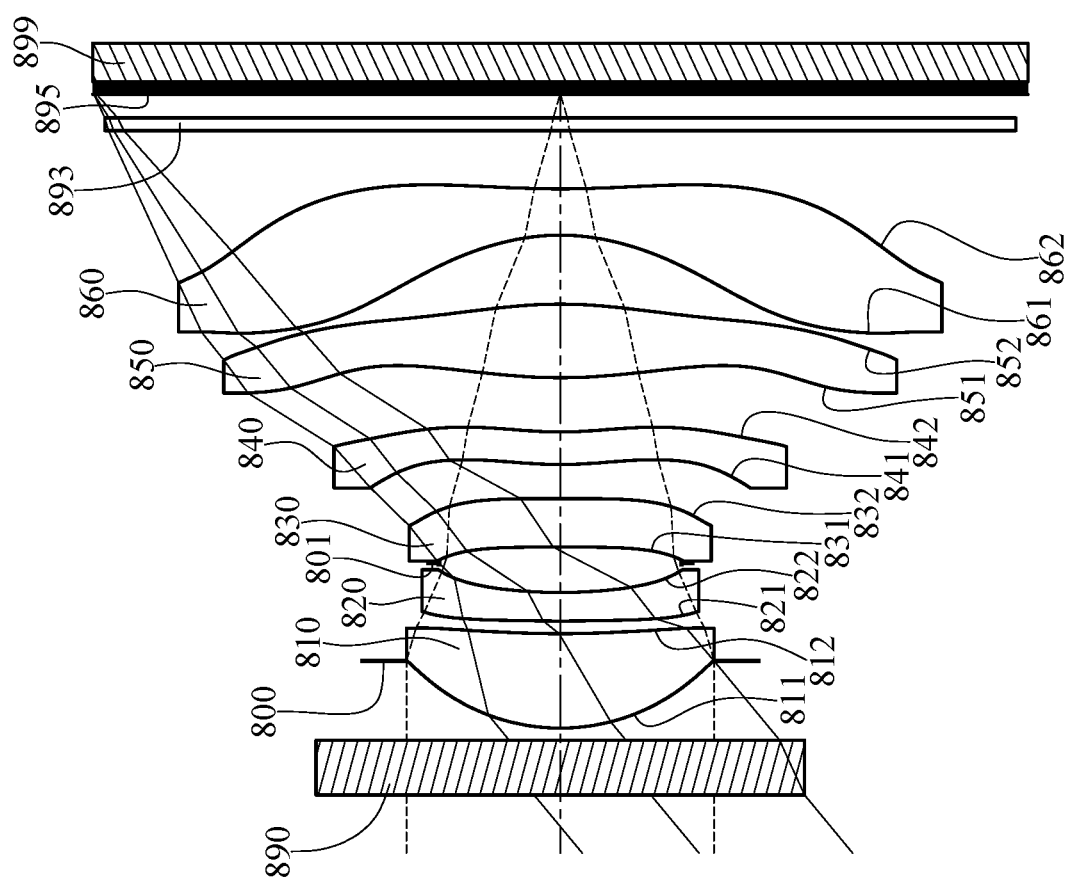
FIG. 26 is a schematic view of an image capturing unit in Mode 1 according to the 8th embodiment of the present disclosure.
Figure 27:
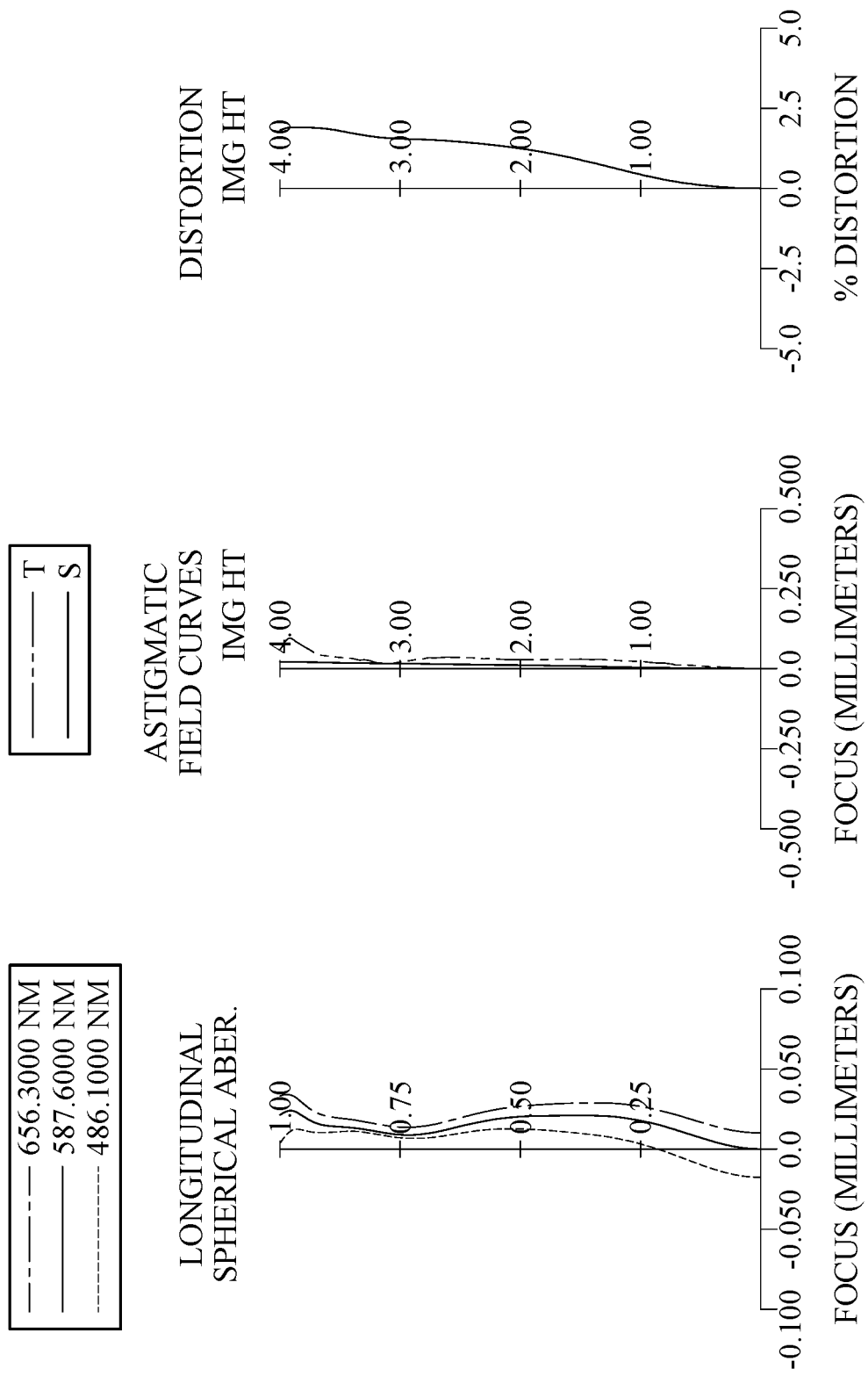
FIG. 27 shows spherical aberration curves, astigmatic field curves and a distortion curve of the image capturing unit in Mode 1 according to the 8th embodiment.
Figure 28:
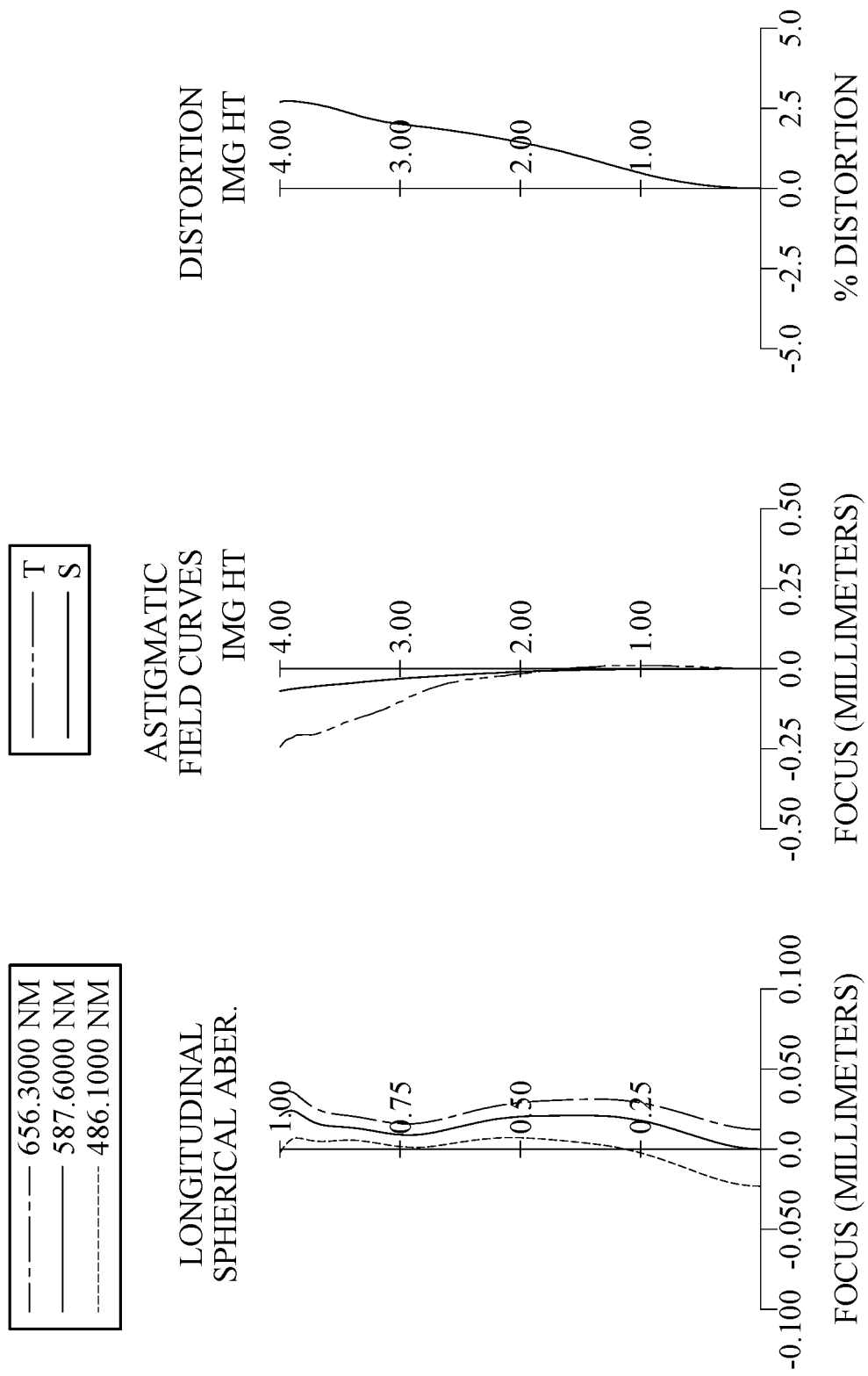
FIG. 28 shows spherical aberration curves, astigmatic field curves and a distortion curve of the image capturing unit in Mode 2 according to the 8th embodiment.

FIG. 26 is a schematic view of an image capturing unit in Mode 1 according to the 8th embodiment of the present disclosure. FIG. 27 shows spherical aberration curves, astigmatic field curves and a distortion curve of the image capturing unit in Mode 1 according to the 8th embodiment. FIG. 28 shows spherical aberration curves, astigmatic field curves and a distortion curve of the image capturing unit in Mode 2 according to the 8th embodiment. In FIG. 26, the image capturing unit includes the optical imaging lens assembly (its reference numeral is omitted) of the present disclosure and an image sensor 899. The optical imaging lens assembly includes a focus tunable component 890, an aperture stop 800, an imaging lens system (its reference numeral is omitted), a stop 801, a filter 893 and an image surface 895. The imaging lens system includes a first lens element 810, a second lens element 820, a third lens element 830, a fourth lens element 840, a fifth lens element 850 and a sixth lens element 860. Further, the aforementioned components of the optical imaging lens assembly are arranged in order from an object side to an image side as follows: the focus tunable component 890, the aperture stop 800, the first lens element 810, the second lens element 820, the stop 801, the third lens element 830, the fourth lens element 840, the fifth lens element 850, the sixth lens element 860, the filter 893 and the image surface 895. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 810) and an object-side second lens element (the second lens element 820), and the second lens group includes, in order from the image side to the object side, an image-side first lens element (the sixth lens element 860) and an image-side second lens element (the fifth lens element 850). The optical imaging lens assembly includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one inflection point. The image-side surface 812 of the first lens element 810 has at least one inflection point. The image-side surface 812 of the first lens element 810 has at least one critical point in an off-axis region thereof.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one inflection point. The image-side surface 832 of the third lens element 830 has at least one critical point in an off-axis region thereof.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one inflection point. The image-side surface 842 of the fourth lens element 840 has at least one inflection point. The object-side surface 841 of the fourth lens element 840 has at least one critical point in an off-axis region thereof. The image-side surface 842 of the fourth lens element 840 has at least one critical point in an off-axis region thereof.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point. The object-side surface 851 of the fifth lens element 850 has at least one critical point in an off-axis region thereof.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point. The object-side surface 861 of the sixth lens element 860 has at least one critical point in an off-axis region thereof. The image-side surface 862 of the sixth lens element 860 has at least one critical point in an off-axis region thereof.

The filter 893 is made of glass material and located between the sixth lens element 860 and the image surface 895, and will not affect the focal length of the optical imaging lens assembly. The image sensor 899 is disposed on or near the image surface 895 of the optical imaging lens assembly.

The focus tunable component 890 is disposed on the object side of the imaging lens system, and the focus tunable component 890 is configured for tuning its focal length in accordance with object distances or ambient temperatures of various conditions so as to adjust the focal length of the optical imaging lens assembly. In this embodiment, the focus tunable component 890 can be a liquid lens set, a liquid crystal lens set, a positive lens element, a negative lens element or other optical components featuring focus tuning function.

In this embodiment, two of various modes of the optical imaging lens assembly are provided according to different focusing conditions. The detailed optical data of the 8th embodiment are shown in Table 22 and the aspheric surface data are shown in Table 23 below.

TABLE 22

| 8th Embodiment | | | | | | | |
|---|---|---|---|---|---|---|---|
| Surface # | | Curvature Radius | | Thickness | Material | Index | Abbe # | Focal Length |
| 0 | Object | Plano | | TOB | | | | |
| 1 | Focus Tunable Component | | | CTt | | | | ft |
| 2 | | | | 0.682 | | | | |
| 3 | Ape. Stop | Plano | | −0.578 | | | | |
| 4 | Lens 1 | 1.752 | (ASP) | 0.811 | Plastic | 1.545 | 56.1 | 3.95 |
| 5 | | 7.901 | (ASP) | 0.109 | | | | |
| 6 | Lens 2 | 13.805 | (ASP) | 0.245 | Plastic | 1.669 | 19.5 | −9.29 |
| 7 | | 4.255 | (ASP) | 0.254 | | | | |
| 8 | Stop | Plano | | 0.136 | | | | |
| 9 | Lens 3 | −187.617 | (ASP) | 0.416 | Plastic | 1.587 | 28.3 | −72.48 |
| 10 | | 55.091 | (ASP) | 0.293 | | | | |
| 11 | Lens 4 | 3.234 | (ASP) | 0.280 | Plastic | 1.587 | 28.3 | 159.40 |
| 12 | | 3.242 | (ASP) | 0.466 | | | | |
| 13 | Lens 5 | 4.632 | (ASP) | 0.632 | Plastic | 1.544 | 56.0 | 3.96 |
| 14 | | −3.830 | (ASP) | 0.592 | | | | |
| 15 | Lens 6 | −1.881 | (ASP) | 0.398 | Plastic | 1.534 | 55.9 | −2.84 |
| 16 | | 8.387 | (ASP) | 0.500 | | | | |
| 17 | Filter | Plano | | 0.110 | Glass | 1.517 | 64.2 | — |
| 18 | | Plano | | 0.202 | | | | |
| 19 | Image | Plano | | — | | | | |

Note:
Reference wavelength is 587.6 nm (d-line).
An effective radius of the stop 801 (Surface 8) is 1.040 mm.

TABLE 23

Aspheric Coefficients

| Surface # | 4 | 5 | 6 | 7 | 9 |
|---|---|---|---|---|---|
| k = | −3.7179E−03 | 3.0294E+01 | 8.0191E+01 | 3.0652E+00 | −9.9000E+01 |
| A4 = | −3.2807E−03 | −5.6489E−02 | −6.9507E−02 | −2.4639E−02 | −8.8460E−02 |
| A6 = | 1.9433E−02 | 5.0085E−02 | 1.2835E−01 | 9.7847E−02 | 3.8530E−02 |
| A8 = | −5.0801E−02 | −3.5518E−02 | −9.9359E−02 | −5.1391E−02 | −6.5181E−02 |
| A10 = | 7.6969E−02 | 1.0821E−02 | 4.6951E−02 | 7.2621E−03 | 3.1601E−02 |
| A12 = | −6.5888E−02 | 3.9473E−04 | −9.0020E−03 | 1.1461E−02 | −6.8756E−03 |
| A14 = | 2.9340E−02 | −1.5762E−03 | — | — | — |
| A16 = | −5.4713E−03 | — | — | — | — |

| Surface # | 10 | 11 | 12 | 13 | 14 |
|---|---|---|---|---|---|
| k = | −7.5549E+01 | −1.0393E+01 | −2.2083E+01 | −9.4716E+00 | −1.9152E+00 |
| A4 = | −1.2818E−01 | −1.9234E−01 | −1.4116E−01 | −1.8991E−02 | 5.5488E−02 |
| A6 = | 1.1288E−01 | 2.0162E−01 | 1.0765E−01 | −4.6302E−03 | −2.4191E−02 |
| A8 = | −1.5523E−01 | −1.7698E−01 | −6.4468E−02 | 7.5195E−03 | 1.2275E−02 |
| A10 = | 1.1937E−01 | 1.0233E−01 | 2.6237E−02 | −5.3337E−03 | −5.4772E−03 |
| A12 = | −5.4601E−02 | −3.9427E−02 | −6.3707E−03 | 1.8645E−03 | 1.5434E−03 |
| A14 = | 1.1743E−02 | 9.0696E−03 | 8.3537E−04 | −3.5409E−04 | −2.5978E−04 |
| A16 = | — | −9.0618E−04 | −4.6423E−05 | 3.7972E−05 | 2.5388E−05 |
| A18 = | — | — | — | −2.1785E−06 | −1.3199E−06 |
| A20 = | — | — | — | 5.2120E−08 | 2.7897E−08 |

| Surface # | 15 | 16 |
|---|---|---|
| k = | −2.9418E+00 | −5.5390E+01 |
| A4 = | 5.0875E−04 | −1.6515E−02 |
| A6 = | −2.1111E−02 | −2.2671E−03 |
| A8 = | 1.4801E−02 | 2.0280E−03 |
| A10 = | −4.1492E−03 | −6.6841E−04 |
| A12 = | 6.2702E−04 | 1.3184E−04 |
| A14 = | −5.4297E−05 | −1.7160E−05 |
| A16 = | 2.5611E−06 | 1.4366E−06 |
| A18 = | −5.1539E−08 | −6.7921E−08 |
| A20 = | — | 1.3438E−09 |

In the 8th embodiment, the equation of the aspheric surface profiles of the aforementioned lens elements is the same as the equation of the 1st embodiment. Also, the rest optical data of the optical imaging lens assembly are disclosed in Table 24 below. Moreover, the definitions of these parameters shown in Table 24 are the same as those stated in the 1st and 6th embodiments with corresponding values for the 8th embodiment, so an explanation in this regard will not be provided again.

TABLE 24

8th Embodiment

| | Mode 1 | Mode 2 | | |
|---|---|---|---|---|
| f [mm] | 4.74 | 4.51 | fi [mm] | 4.74 |
| Fno | 1.80 | 1.80 | Nimax | 1.669 |
| HFOV [deg.] | 39.6 | 39.2 | Vimin | 19.5 |
| TOB [mm] | ∞ | 140.000 | ΣATi/ΣCTi | 0.67 |
| CTt [mm] | 0.470 | 0.470 | DLr1Lr2/CTLr1 | 1.49 |
| ft [mm] | ∞ | 141.40 | SDi/TDi | 0.88 |
| TDi/CTt | 9.86 | 9.86 | TLi/EPDi | 2.06 |
| TL [mm] | 6.02 | 6.02 | TLi/fi | 1.15 |
| TL/ImgH | 1.50 | 1.50 | |RLr2f/RLr2r| | 1.21 |
| RLr1r/ImgH | 2.10 | 2.10 | LNi | 6 |
| |f/ft| | 0.00E+00 | 3.19E−02 | YCLr1r/TDi | 0.24 |
| |f/TOB-f/ft| | 0.00E+00 | 3.20E−04 | — | — |
| |fi/ft| | 0.00E+00 | 3.35E−02 | — | — |
| |ft| [mm] | ∞ | 141.40 | — | — |
| CRA [deg.] | 32.0 | 32.0 | — | — |
| YLr1r/YLf1f | 2.48 | 2.44 | — | — |

9th Embodiment

Figure 29:
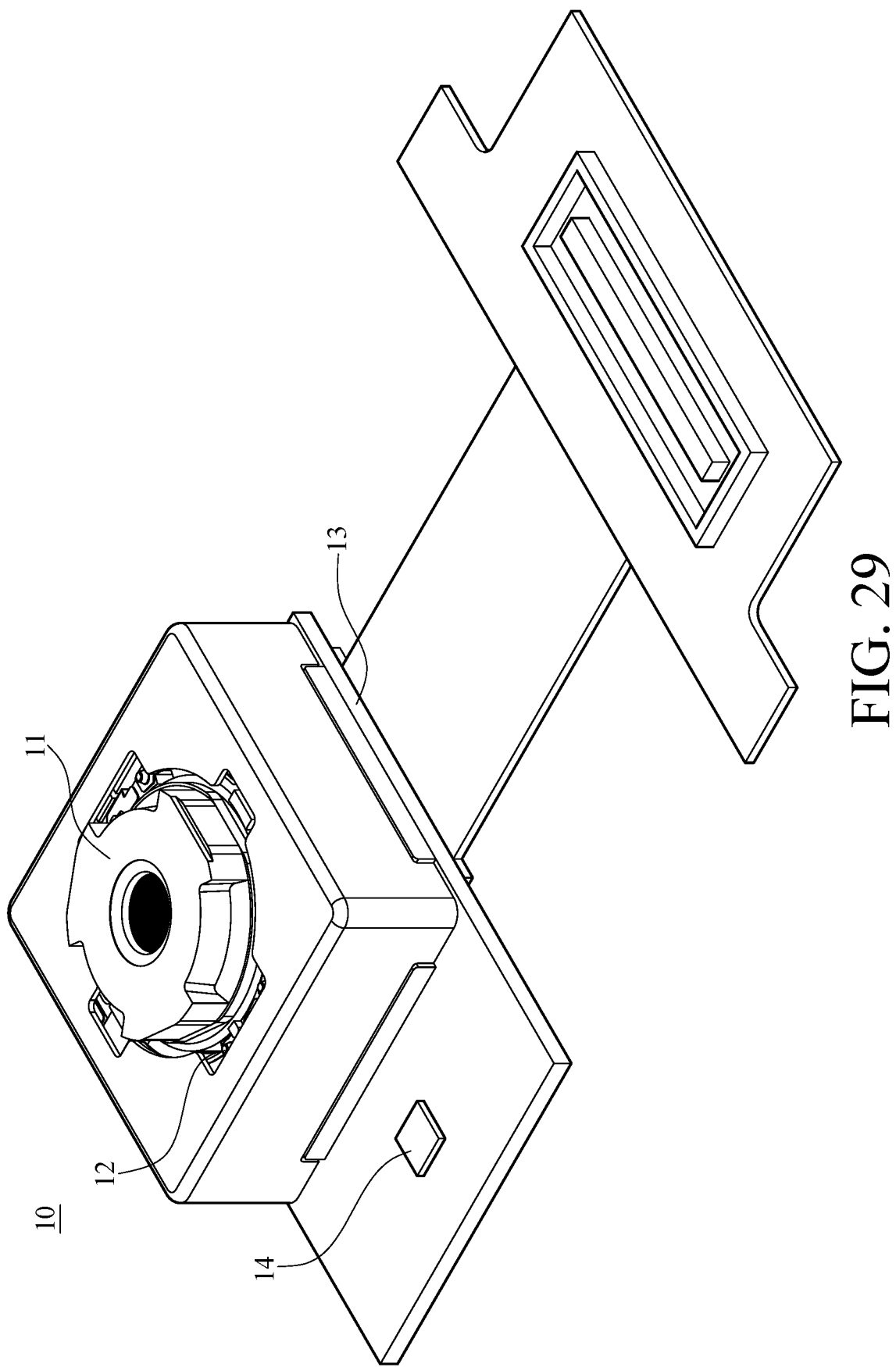
FIG. 29 is a perspective view of an image capturing unit according to the 9th embodiment of the present disclosure.

FIG. 29 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 30:
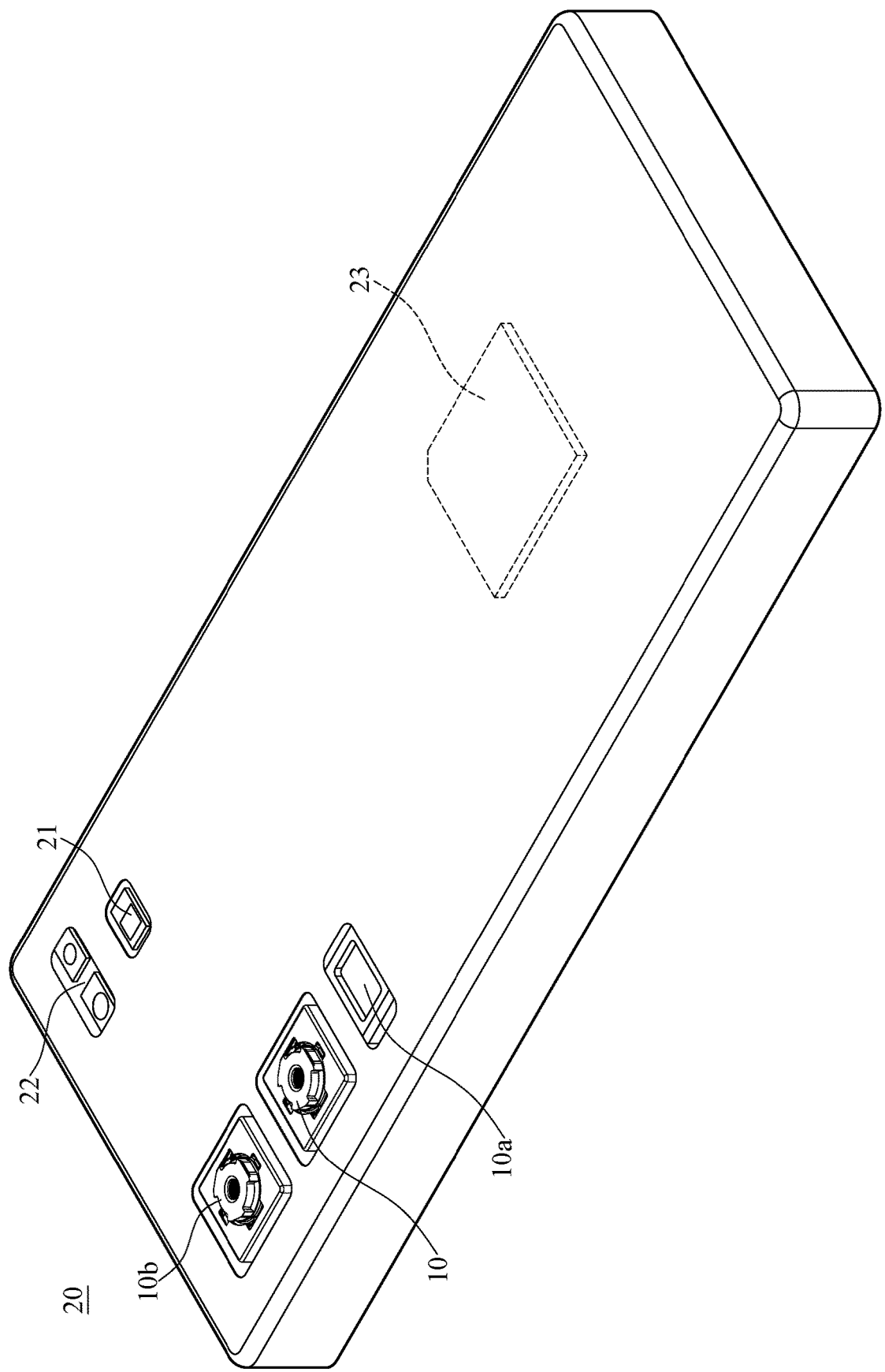
FIG. 30 is one perspective view of an electronic device according to the 10th embodiment of the present disclosure.
Figure 31:
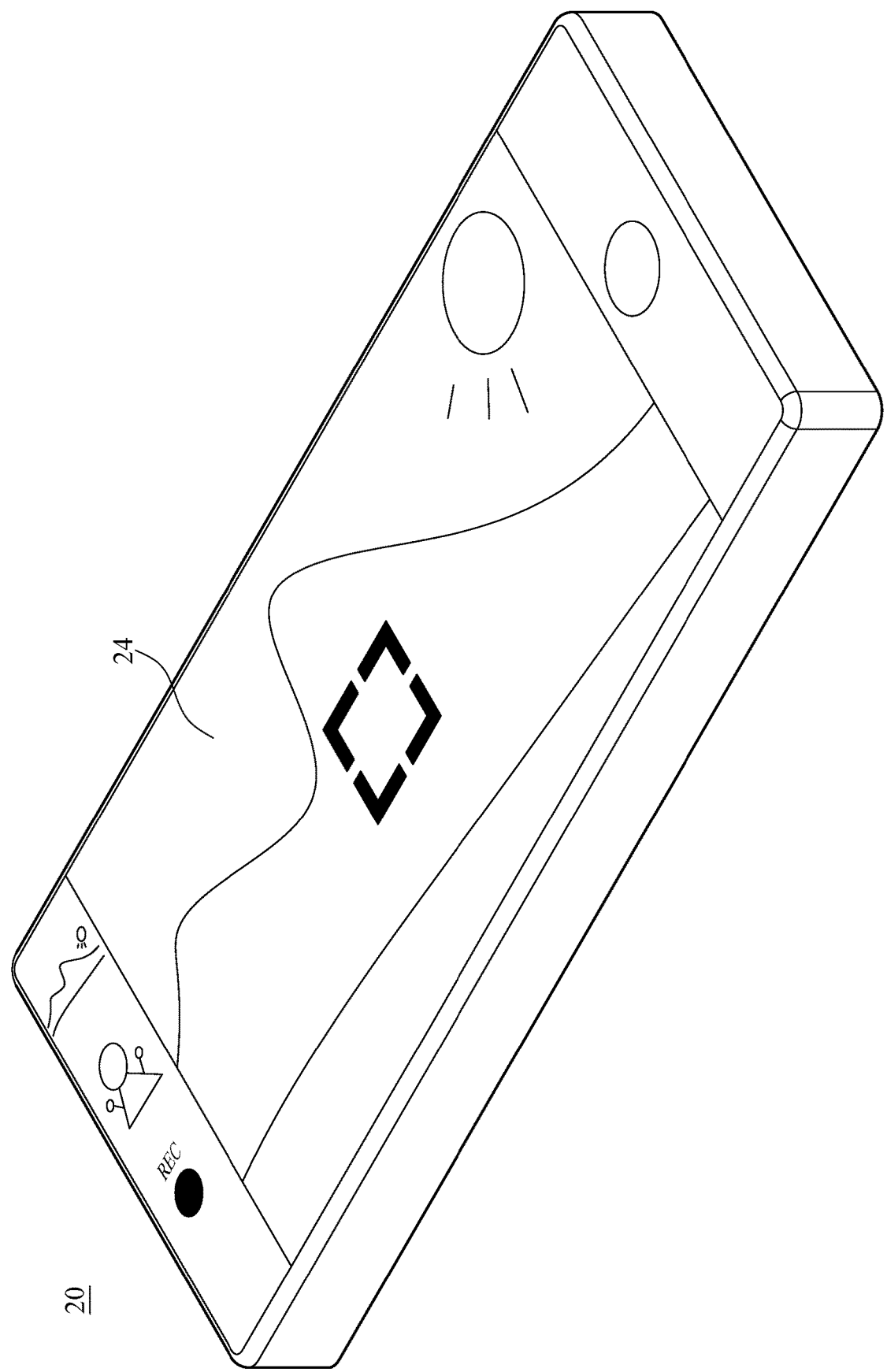
FIG. 31 is another perspective view of the electronic device in FIG. 30.
Figure 32:
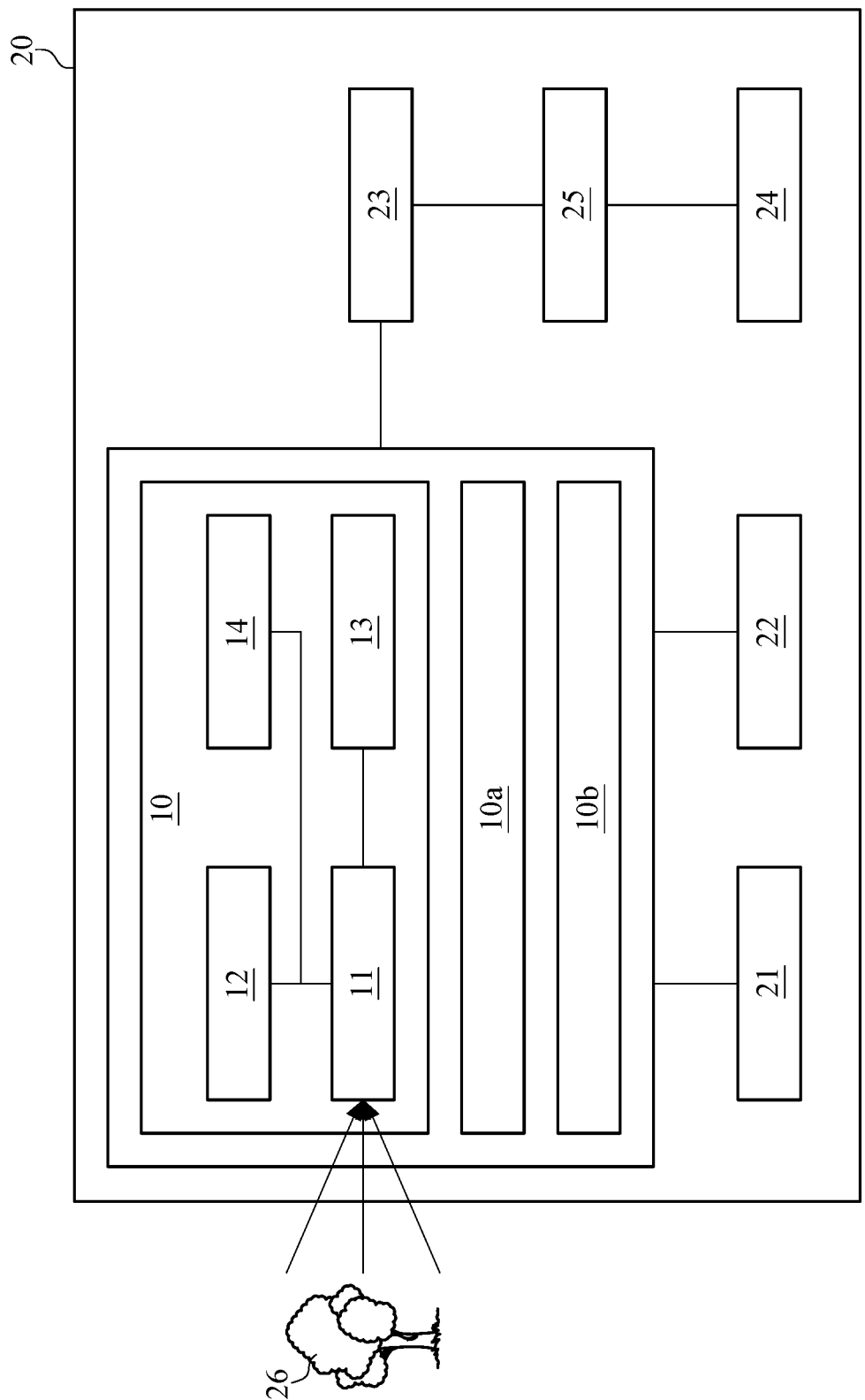
FIG. 32 is a block diagram of the electronic device in FIG. 30.

FIG. 30 is one perspective view of an electronic device according to the 10th embodiment of the present disclosure. FIG. 31 is another perspective view of the electronic device in FIG. 30. FIG. 32 is a block diagram of the electronic device in FIG. 30.

In this embodiment, an electronic device 20 is a smartphone including the image capturing unit 10 disclosed in the 9th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10a is a telephoto image capturing unit, the image capturing unit 10b is a wide-angle image capturing unit and the image capturing unit 10 has a maximum field of view ranging between that of the image capturing unit 10a and that of the image capturing unit 10b), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly, comprising:
a focus tunable component; and
an imaging lens system comprising, in order from an object side to an image side, a first lens group and a second lens group, wherein the first lens group comprises, in order from the object side to the image side, an object-side first lens element and an object-side second lens element, the second lens group comprises, in order from the image side to the object side, an image-side first lens element and an image-side second lens element, and each of all lens elements in the imaging lens system has an object-side surface facing toward the object side and an image-side surface facing toward the image side;
wherein at least one lens surface of at least one lens element in the imaging lens system is aspheric and has at least one inflection point, the imaging lens system has a total of at least four lens elements, the lens elements of the first lens group are closer to the object side than other lens elements in the imaging lens system, and the lens elements of the second lens group are closer to the image side than other lens elements in the imaging lens system;
wherein an axial distance between the image-side first lens element and the image-side second lens element is DLr1Lr2, a central thickness of the image-side first lens element is CTLr1, a curvature radius of the object-side surface of the image-side second lens element is RLr2f, a curvature radius of the image-side surface of the image-side second lens element is RLr2r, an f-number of the optical imaging lens assembly is Fno, a minimum value among Abbe numbers of all lens elements in the imaging lens system is Vimin, and the following conditions are satisfied:

$0.70 < DLr1Lr2/CTLr5.0$;

$|RLr2f/RLr2r| < 4.5$; and $0.80 < Fno < 3.0$; and $10.0 < Vimin < 20.0$.

2. The optical imaging lens assembly of claim 1, wherein the axial distance between the image-side first lens element and the image-side second lens element is DLr1Lr2, the central thickness of the image-side first lens element is CTLr1, the curvature radius of the object-side surface of the image-side second lens element is RLr2f, the curvature radius of the image-side surface of the image-side second lens element is RLr2r, and the following conditions are satisfied:

$0.80 < DLr1Lr2/CTLr1 < 3.0$; and $|RLr2f/RLr2r| < 3.0$

3. The optical imaging lens assembly of claim 1, wherein the f-number of the optical imaging lens assembly is Fno, half of a maximum field of view of the optical imaging lens assembly is HFOV, and the following conditions are satisfied:

$1.2 < Fno < 2.0$; and $35.0[\text{deg.}] < HFOV < 45.0[\text{deg.}]$.

4. The optical imaging lens assembly of claim 1, wherein a focal length of the optical imaging lens assembly is f, a focal length of the focus tunable component is ft, a central thickness of the focus tunable component is CTt, and the following conditions are satisfied:

$|f/ft| < 0.10$; and $0.10[\text{mm}] < CTt < 1.00[\text{mm}]$.

5. The optical imaging lens assembly of claim 1, wherein the object-side first lens element has positive refractive power, the object-side surface of the object-side first lens element is convex in a paraxial region thereof, the object-side second lens element has negative refractive power, and the image-side surface of the object-side second lens element is concave in a paraxial region thereof.

6. The optical imaging lens assembly of claim 5, wherein the image-side first lens element has negative refractive power, the image-side surface of the image-side first lens element is concave in a paraxial region thereof, a curvature radius of the image-side surface of the image-side first lens element is RLr1r, a maximum image height of the optical imaging lens assembly is ImgH, and the following condition is satisfied:

$RLr1r/ImgH < 1.0$.

7. The optical imaging lens assembly of claim 5, wherein the image-side surface of the object-side first lens element is concave in a paraxial region thereof, the image-side second lens element has positive refractive power, and at least one lens surface of the image-side second lens element has at least one critical point in an off-axis region thereof.

8. The optical imaging lens assembly of claim 1, wherein at least one lens surface of at least one lens element of the second lens group is aspheric and has at least one inflection point, a chief ray angle at a maximum image height position of the optical imaging lens assembly is CRA, and the following condition is satisfied:

$30.0[\text{deg.}] < CRA < 45.0[\text{deg.}]$.

9. The optical imaging lens assembly of claim 1, wherein at least one lens surface of at least one lens element in the imaging lens system has at least one critical point in an off-axis region thereof, an axial distance between an object-side surface of the focus tunable component and an image surface is TL, and the following condition is satisfied:

$3.50[\text{mm}] < TL < 10.00[\text{mm}]$.

10. The optical imaging lens assembly of claim 1, wherein the focus tunable component is located on the object side of the imaging lens system, the optical imaging lens assembly further comprises an aperture stop, the aperture stop is disposed between the object-side first lens element and an imaged object, an axial distance between the aperture stop and the image-side surface of the image-side first lens element is SDi, an axial distance between the object-side surface of the object-side first lens element and the image-side surface of the image-side first lens element is TDi, and the following condition is satisfied:

$0.80 < SDi/TDi < 1.0$.

* * * * *